(12) United States Patent
Campbell

(10) Patent No.: US 12,428,795 B1
(45) Date of Patent: Sep. 30, 2025

(54) OIL SPILL CLEAN-UP AND RECOVERY SYSTEMS FOR MARINE VESSELS

(71) Applicant: Robert Marshall Campbell, Miami, FL (US)

(72) Inventor: Robert Marshall Campbell, Miami, FL (US)

(*) Notice: Subject to any disclaimer, the term of this patent is extended or adjusted under 35 U.S.C. 154(b) by 549 days.

(21) Appl. No.: 17/862,376

(22) Filed: Jul. 11, 2022

Related U.S. Application Data

(63) Continuation of application No. 17/010,813, filed on Sep. 2, 2020, now Pat. No. 11,384,500, which is a continuation of application No. 15/728,198, filed on Oct. 9, 2017, now Pat. No. 10,808,370, which is a continuation of application No. 15/473,192, filed on Mar. 29, 2017, now abandoned.

(60) Provisional application No. 62/318,716, filed on Apr. 5, 2016.

(51) Int. Cl.

| | |
|---|---|
| *E02B 15/04* | (2006.01) |
| *C02F 1/40* | (2023.01) |
| *E02B 15/06* | (2006.01) |
| *E02B 15/08* | (2006.01) |
| *E02B 15/10* | (2006.01) |
| *C02F 101/32* | (2006.01) |
| *C02F 103/00* | (2006.01) |

(52) U.S. Cl.
CPC .............. *E02B 15/047* (2013.01); *C02F 1/40* (2013.01); *E02B 15/048* (2013.01); *E02B 15/06* (2013.01); *E02B 15/0807* (2013.01); *E02B 15/10* (2013.01); *E02B 15/106* (2013.01); *C02F 2101/32* (2013.01); *C02F 2103/007* (2013.01); *C02F 2201/008* (2013.01)

(58) Field of Classification Search
CPC ...... E02B 15/047; E02B 15/048; E02B 15/06; E02B 15/0807; E02B 15/10; E02B 15/106; C02F 1/40; C02F 2101/32; C02F 2103/007; C02F 2201/008
USPC ........................................................ 210/242.3
See application file for complete search history.

(56) References Cited

U.S. PATENT DOCUMENTS 2,876,903 A * 3/1959 Lee .................... B01D 17/0214
  210/523
3,532,219 A * 10/1970 Valdespino ............. E02B 15/06
  210/776

(Continued)

*Primary Examiner* — Liam Royce
(74) *Attorney, Agent, or Firm* — Javier Sobrado; The Brickell IP Group, PLLC

(57) ABSTRACT

An oil spill clean-up and recovery system for marine vessels, which includes a pivoting and height adjustable boom extending from the vessels, which has upper and lower frameworks that are generally parallel. This includes an oil containment panel which is vertically oriented, movable, and generally laterally secured between the frameworks. A plurality of floats are secured to the oil containment panel and maintain it about the surface of a body of water for containing oil or other undesirable liquids or debris. A plurality of floating oil evacuation tubes are height adjustable and attached to separate floats, each tube having an inlet for receiving oil around the water line. The floating oil evacuation tubes are laterally positioned in proximity of one-another, and in front of the oil containment panel. The oil containment panel collects, contains, and deflects oil to the floating evacuation tubes, which then receive and delivery oil to the tanker.

18 Claims, 46 Drawing Sheets

(56) References Cited

U.S. PATENT DOCUMENTS

| | | | | | |
|---|---|---|---|---|---|
| 3,662,891 | A | * | 5/1972 | Headrick | E02B 15/0842 405/63 |
| 4,014,795 | A | * | 3/1977 | in'tVeld | E02B 15/047 210/776 |
| 4,209,400 | A | * | 6/1980 | Mayes | E02B 15/047 210/776 |
| 5,094,744 | A | * | 3/1992 | Scovell | E02B 15/047 210/923 |
| 5,601,705 | A | * | 2/1997 | Glasgow | B01D 21/0012 210/104 |

* cited by examiner

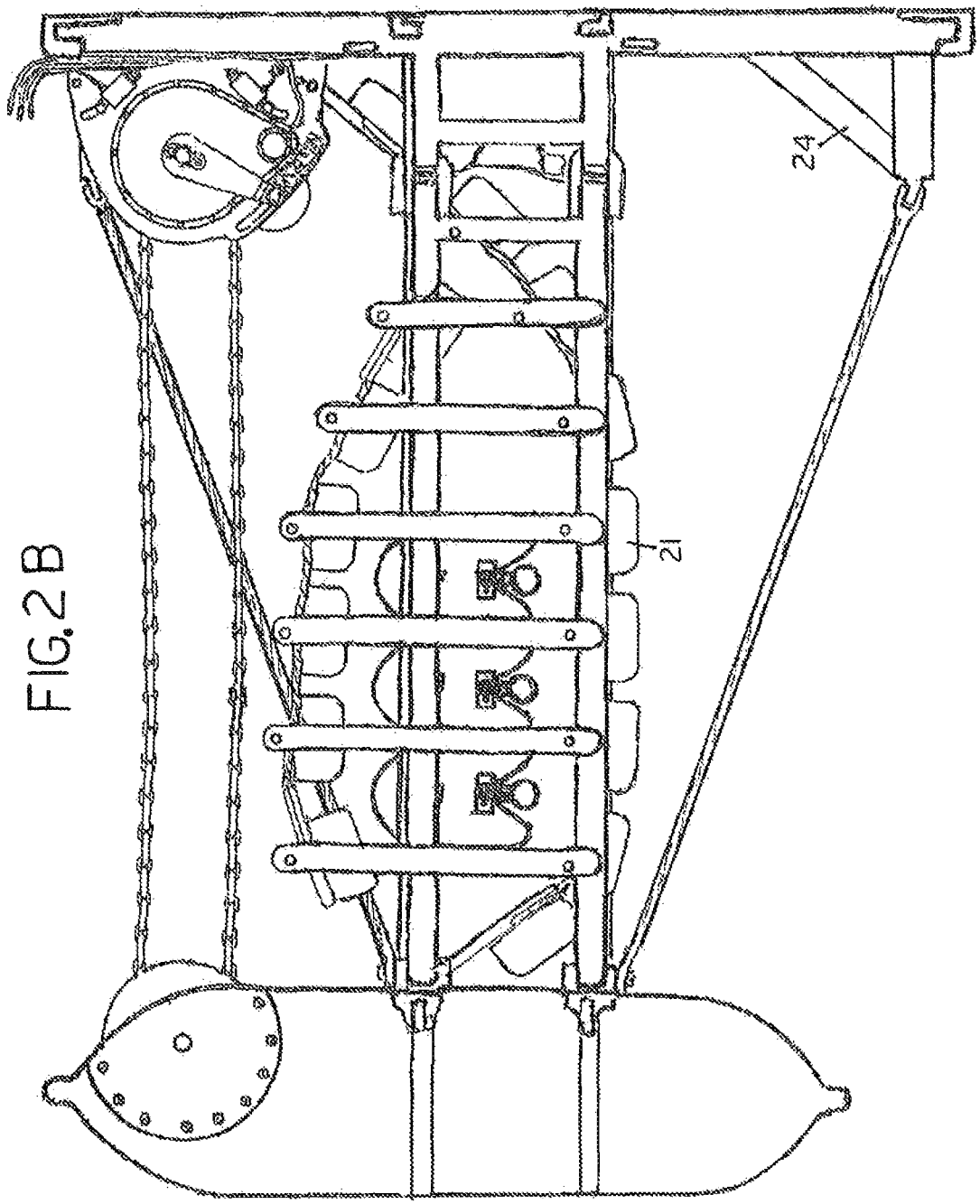

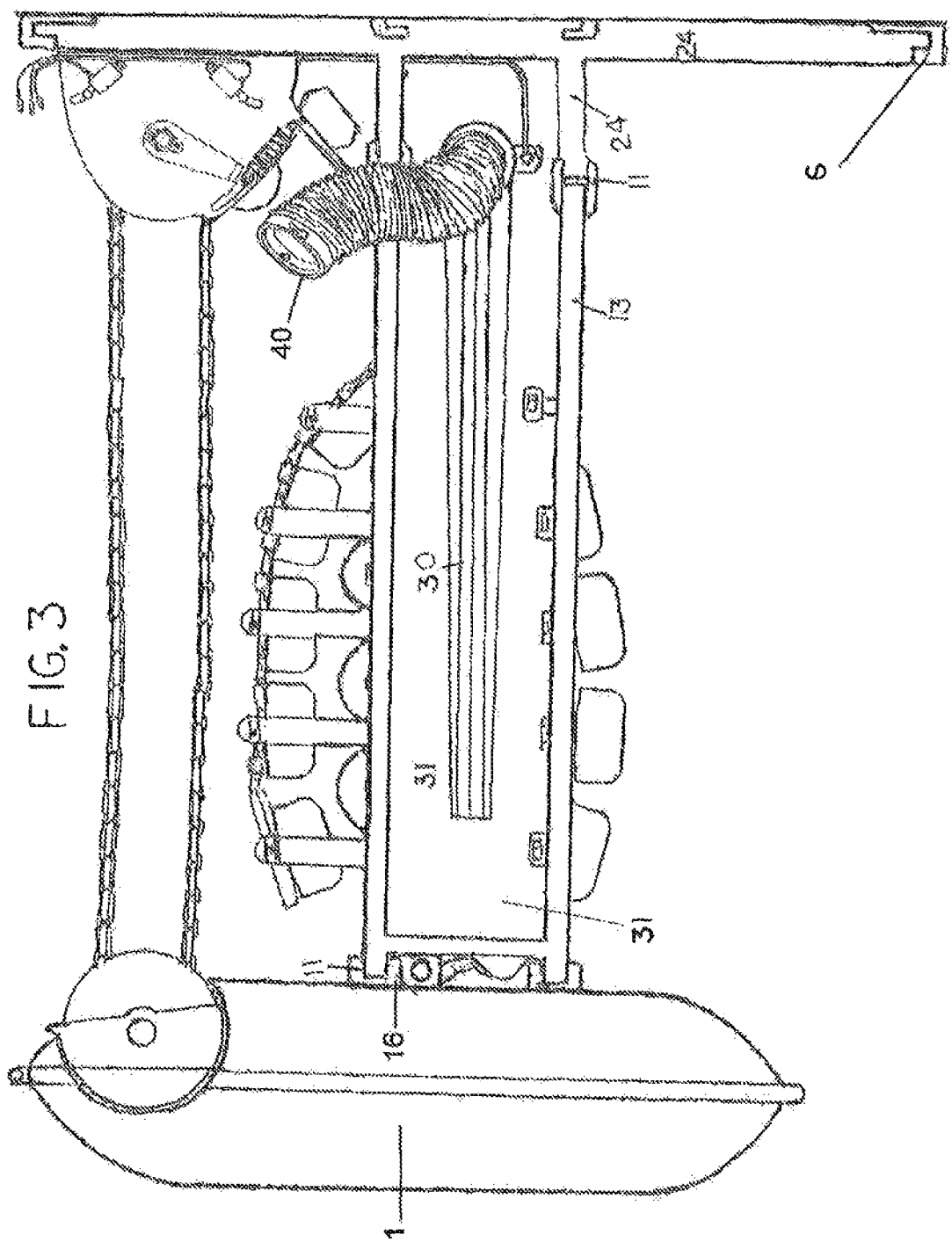

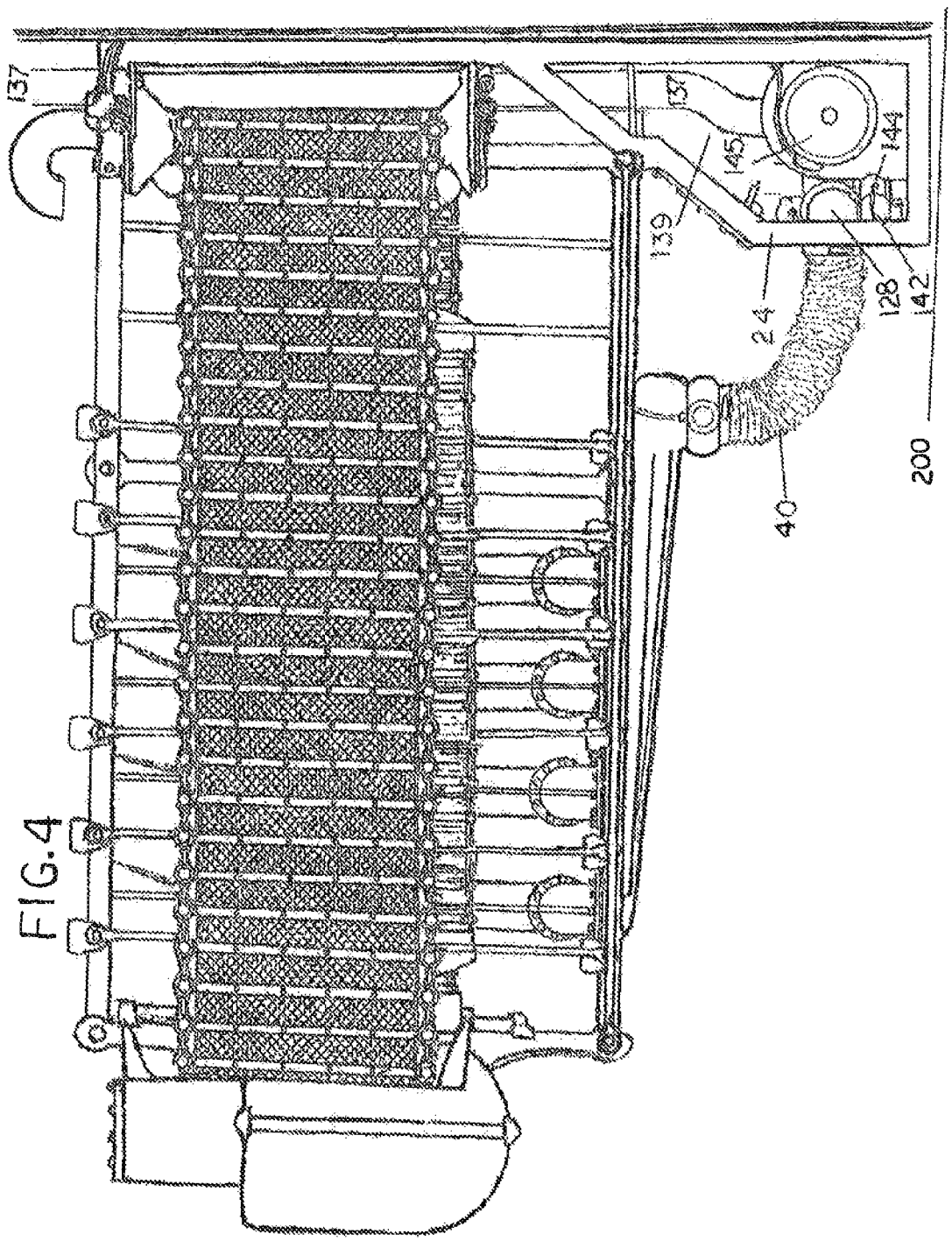

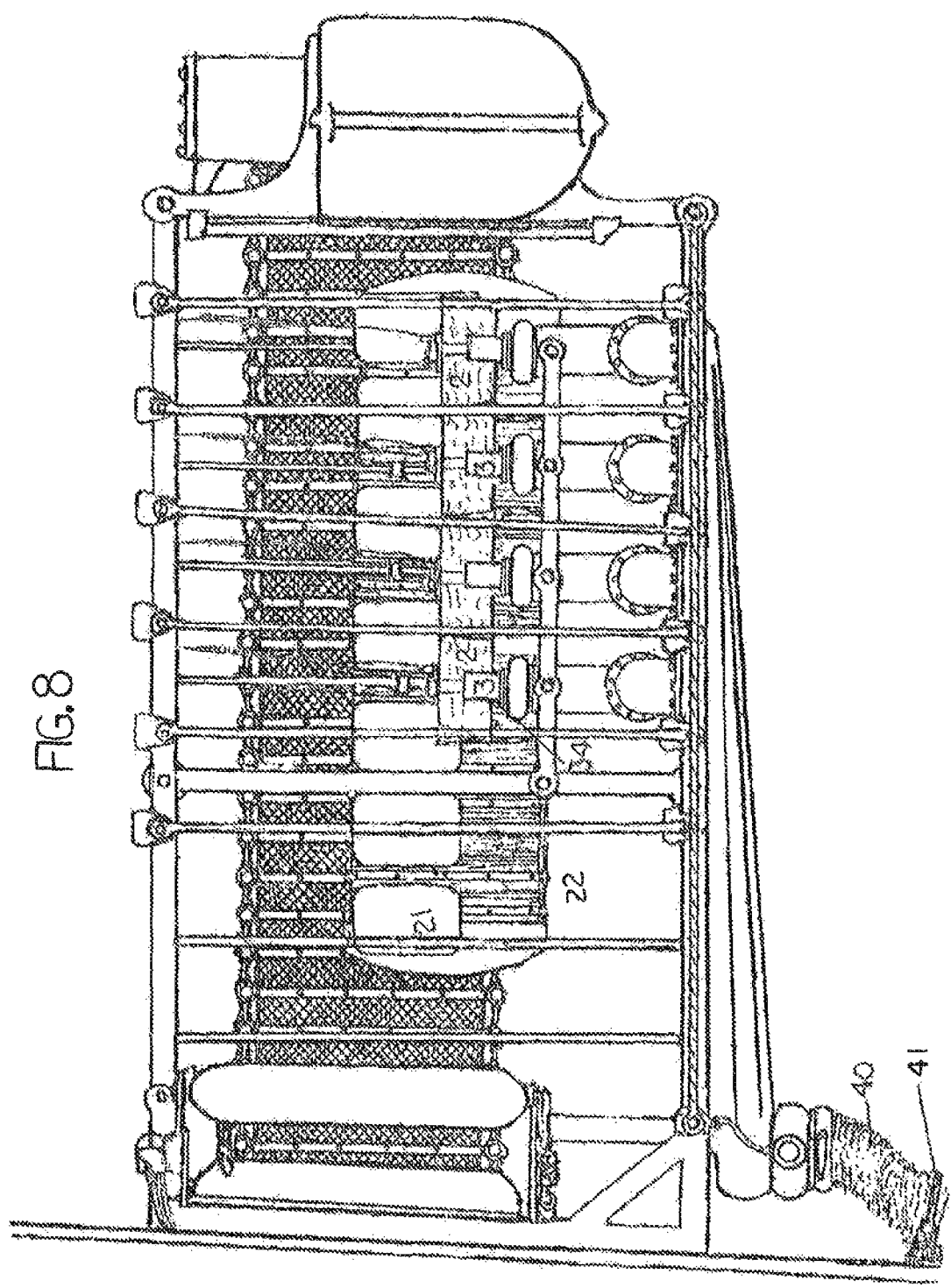

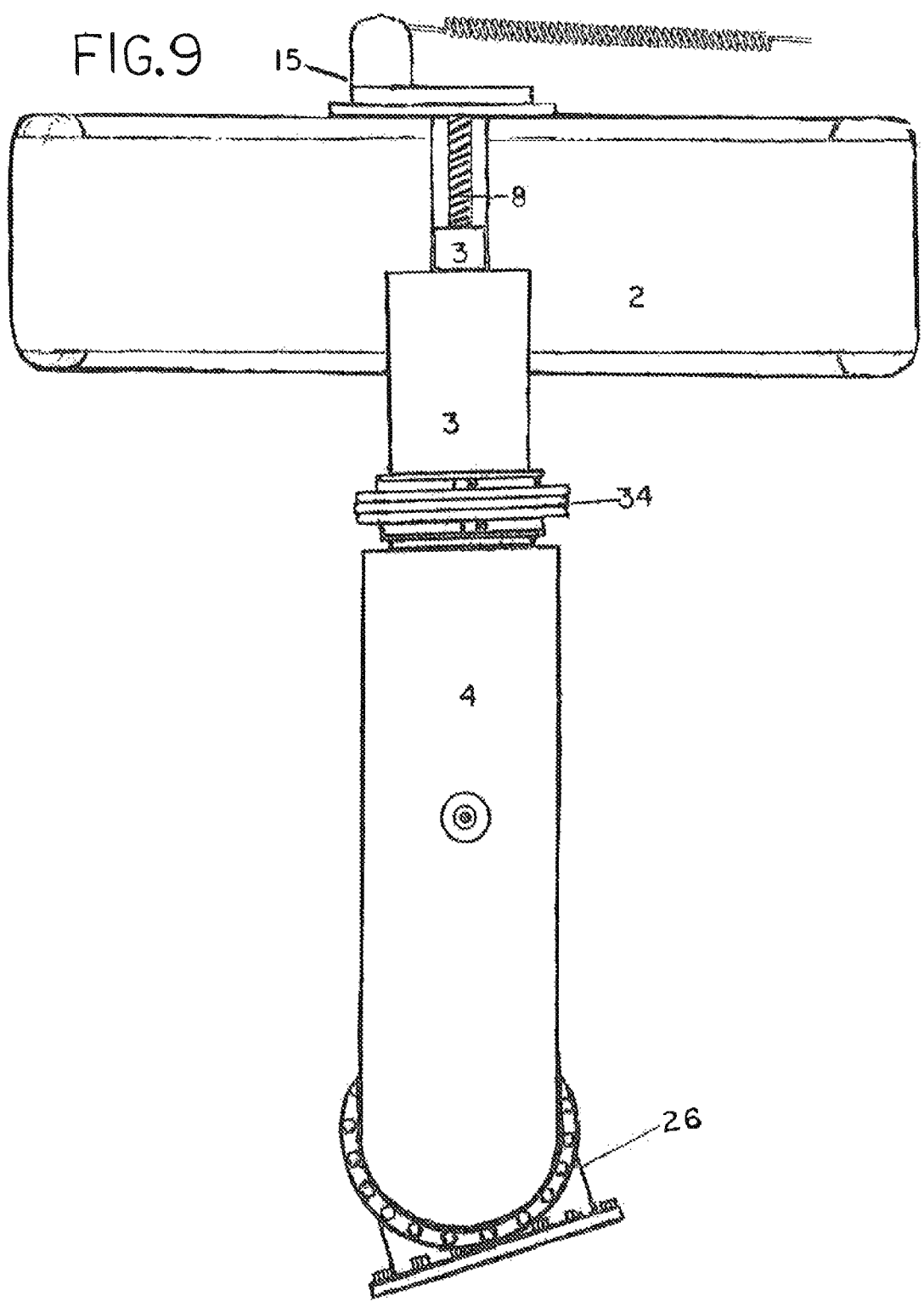

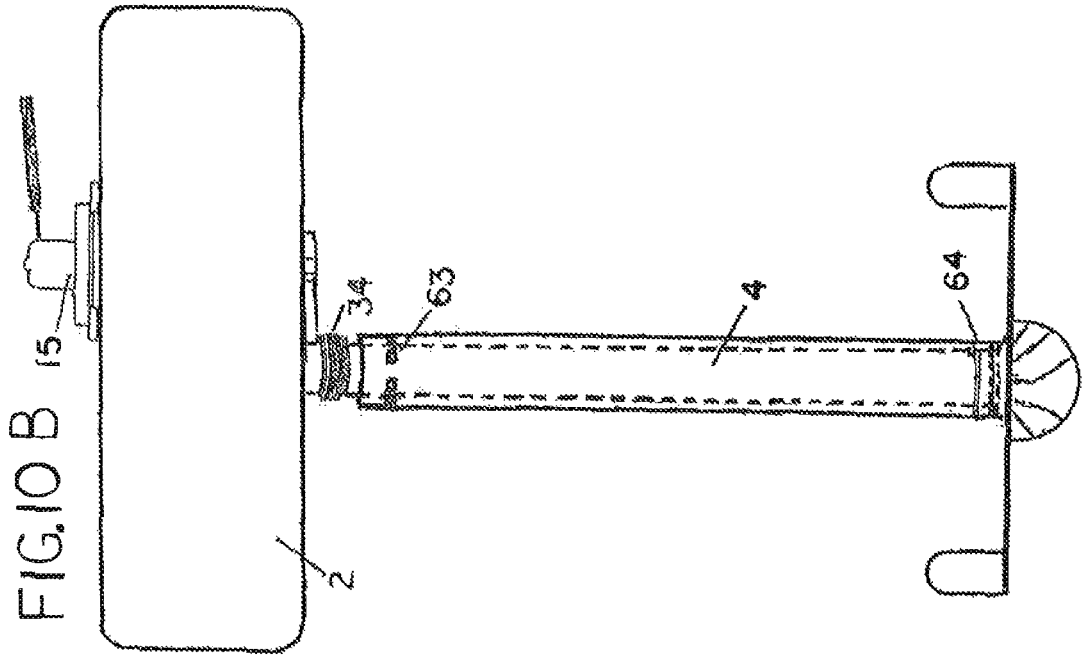
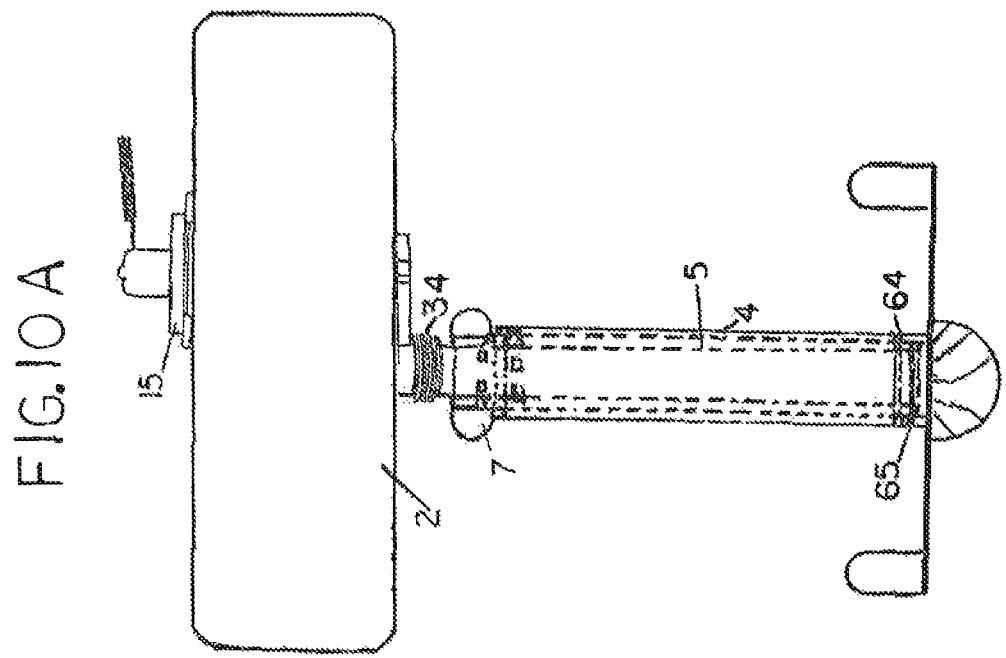

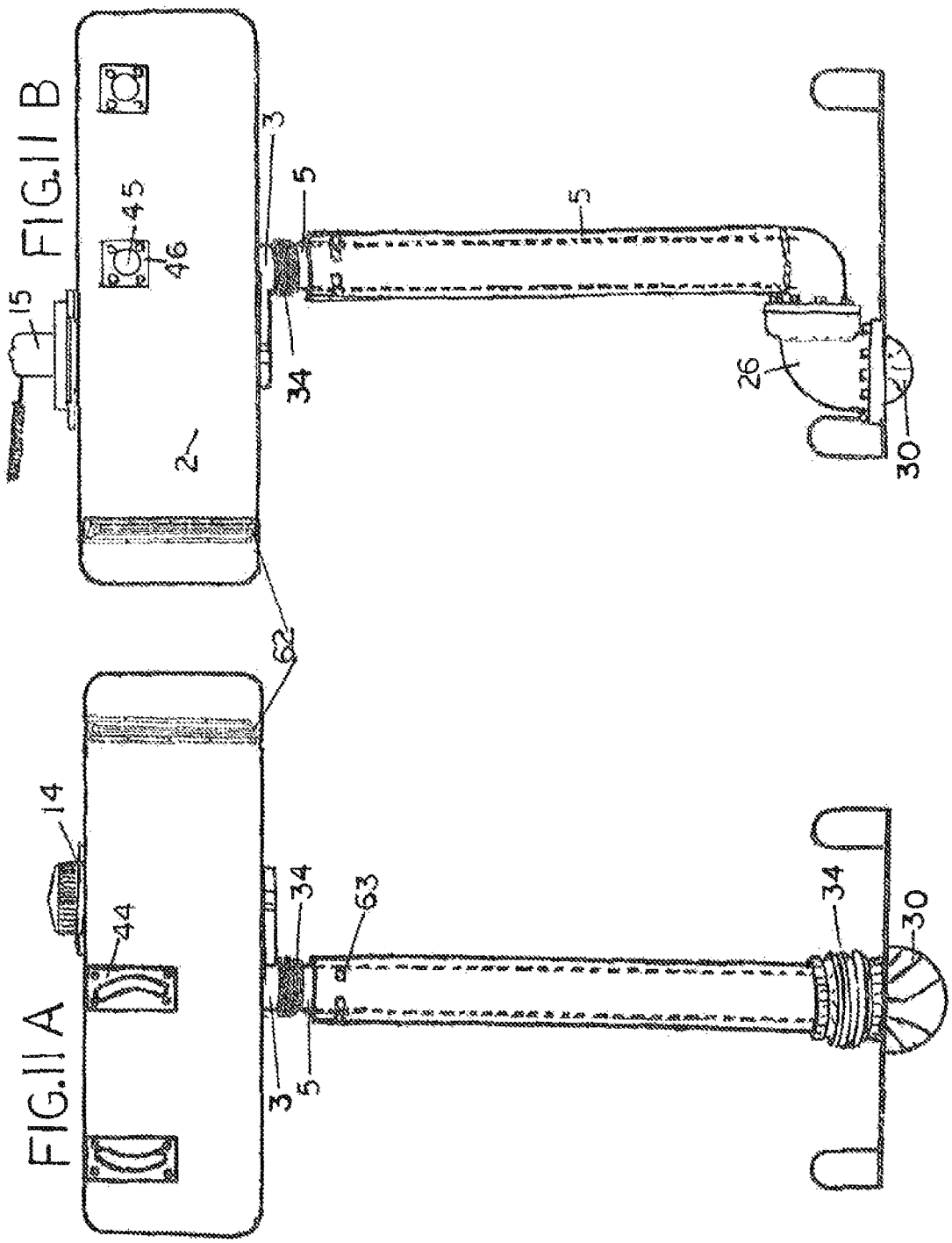

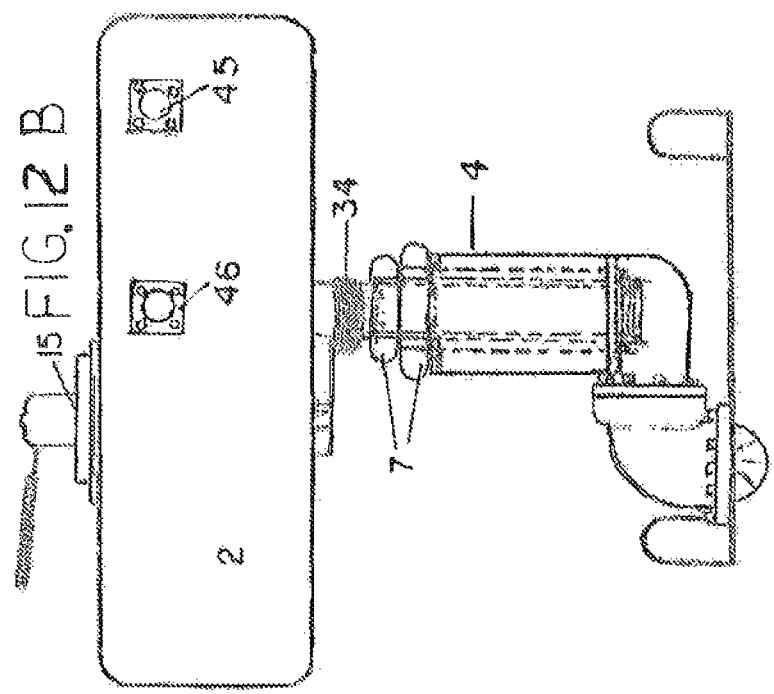
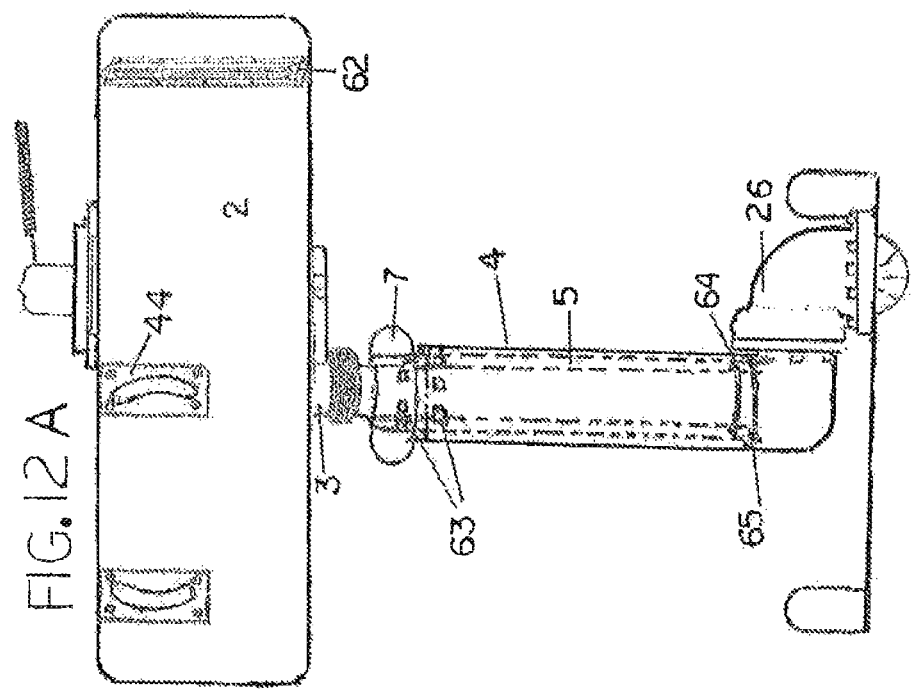

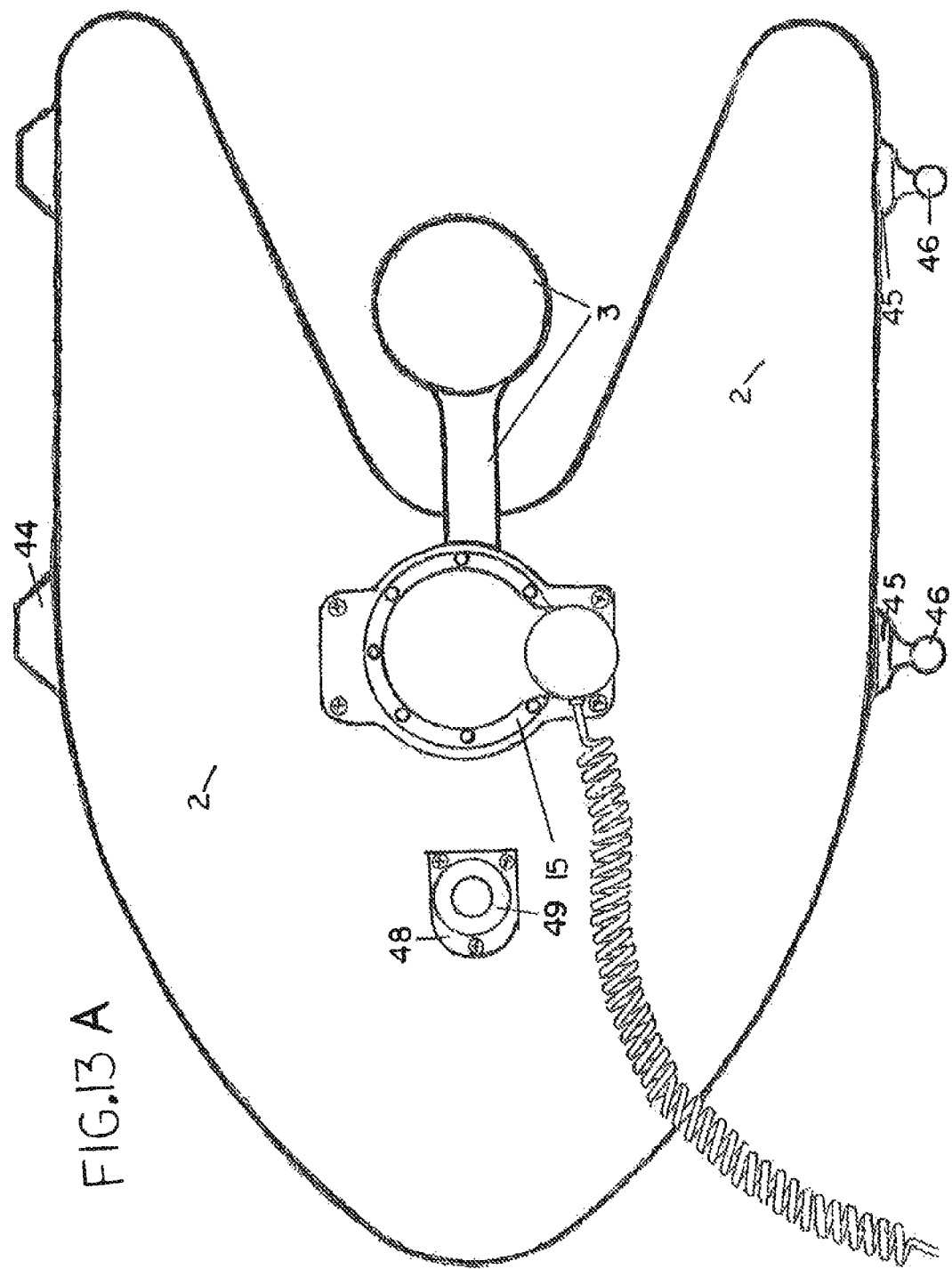

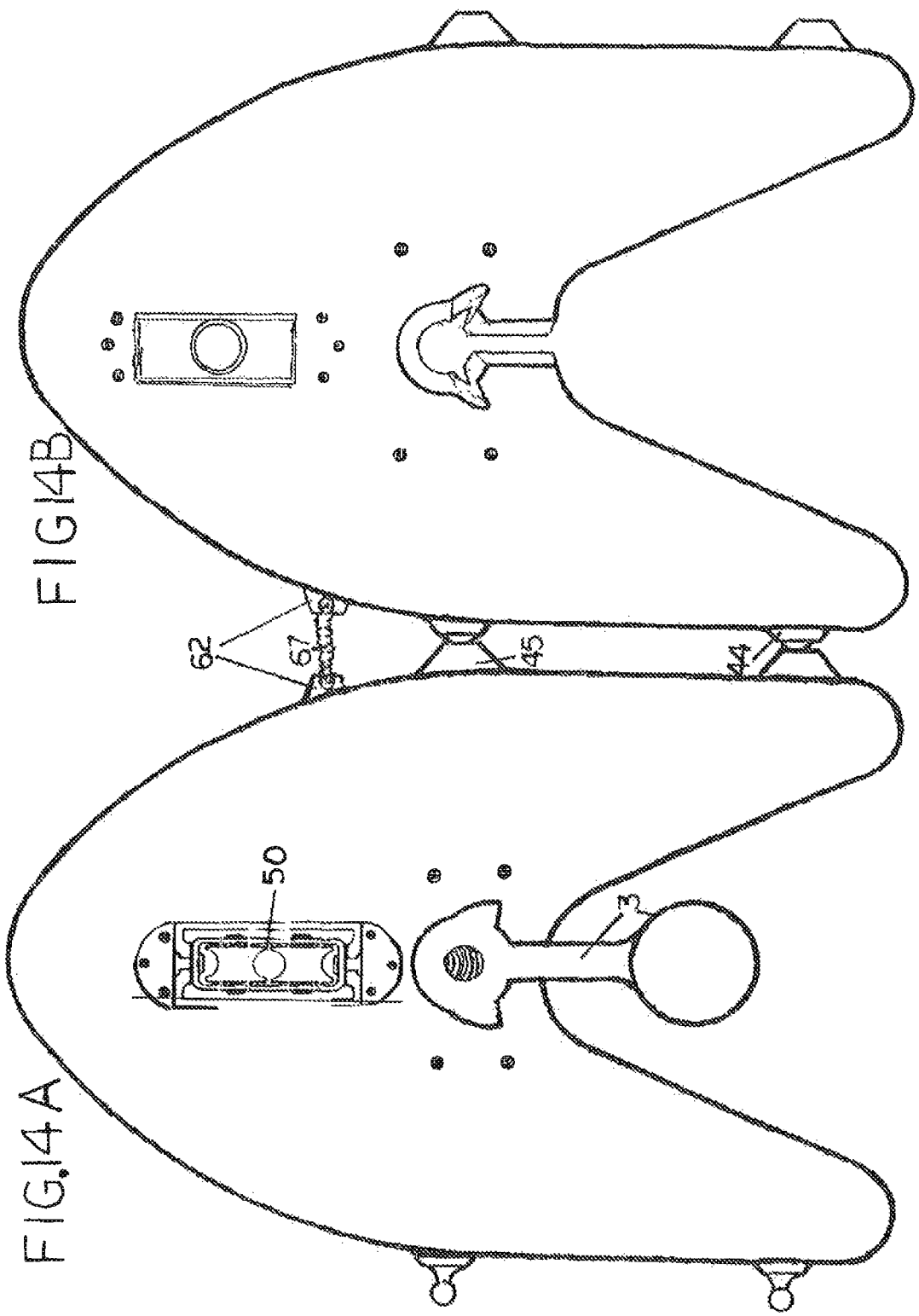

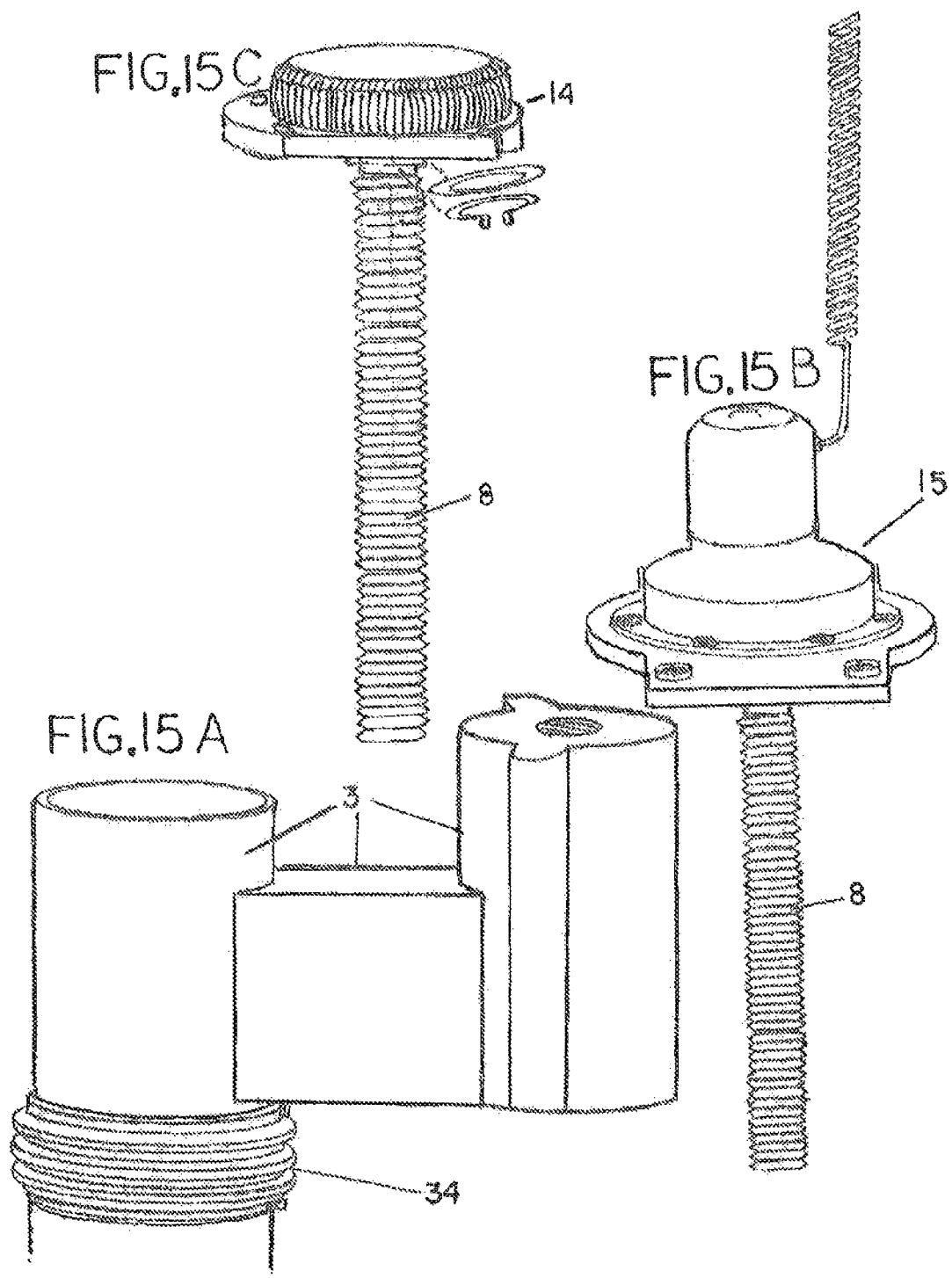

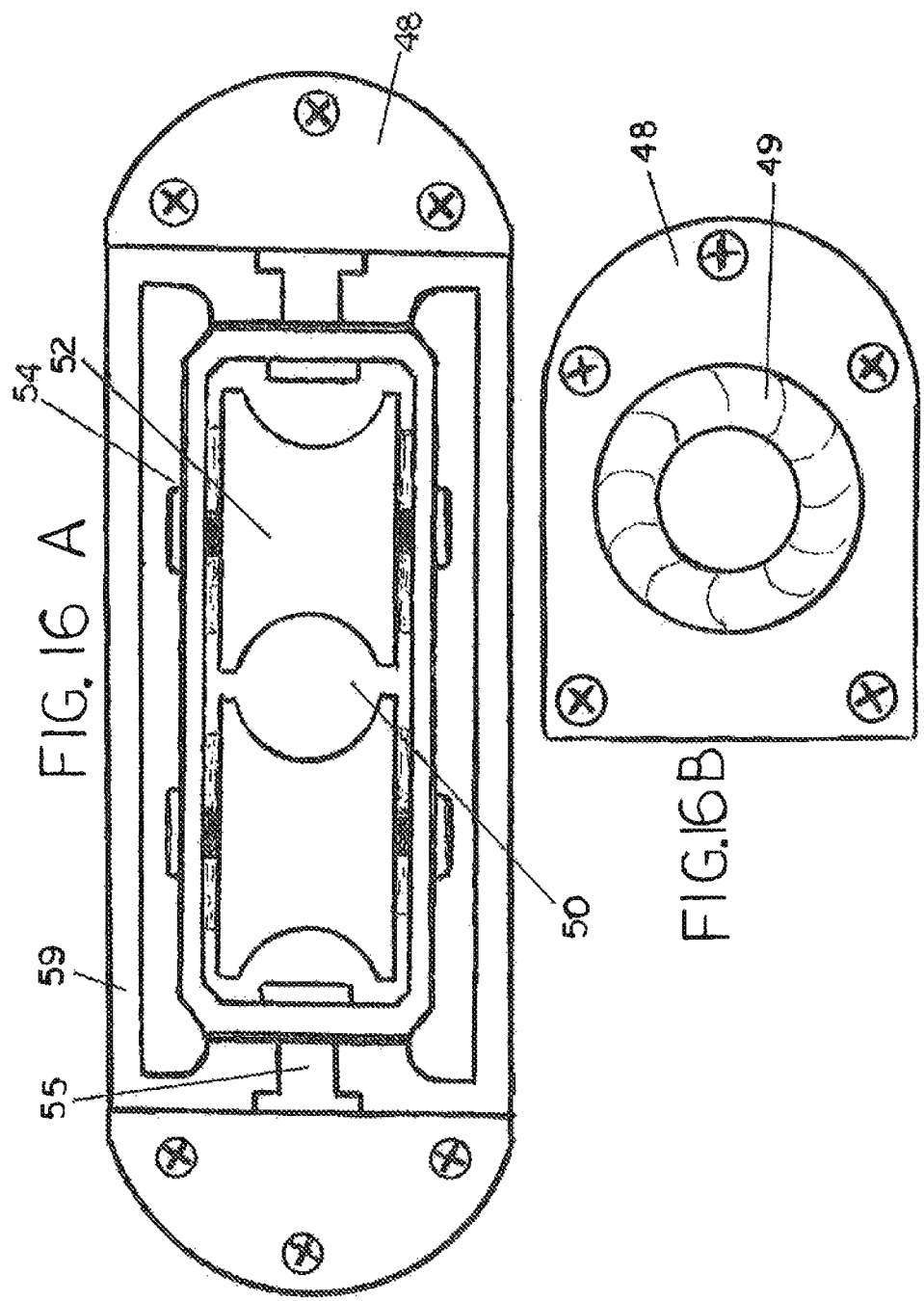

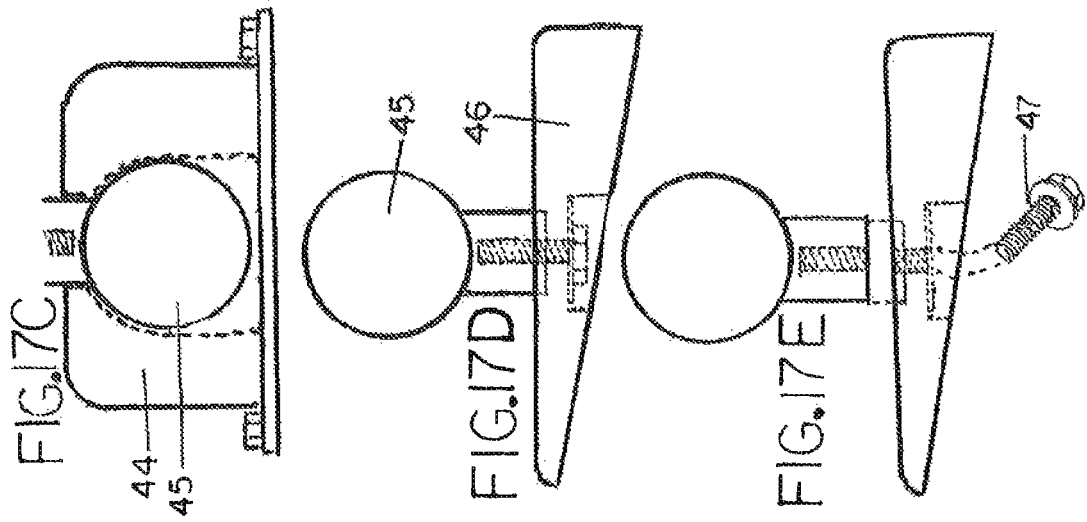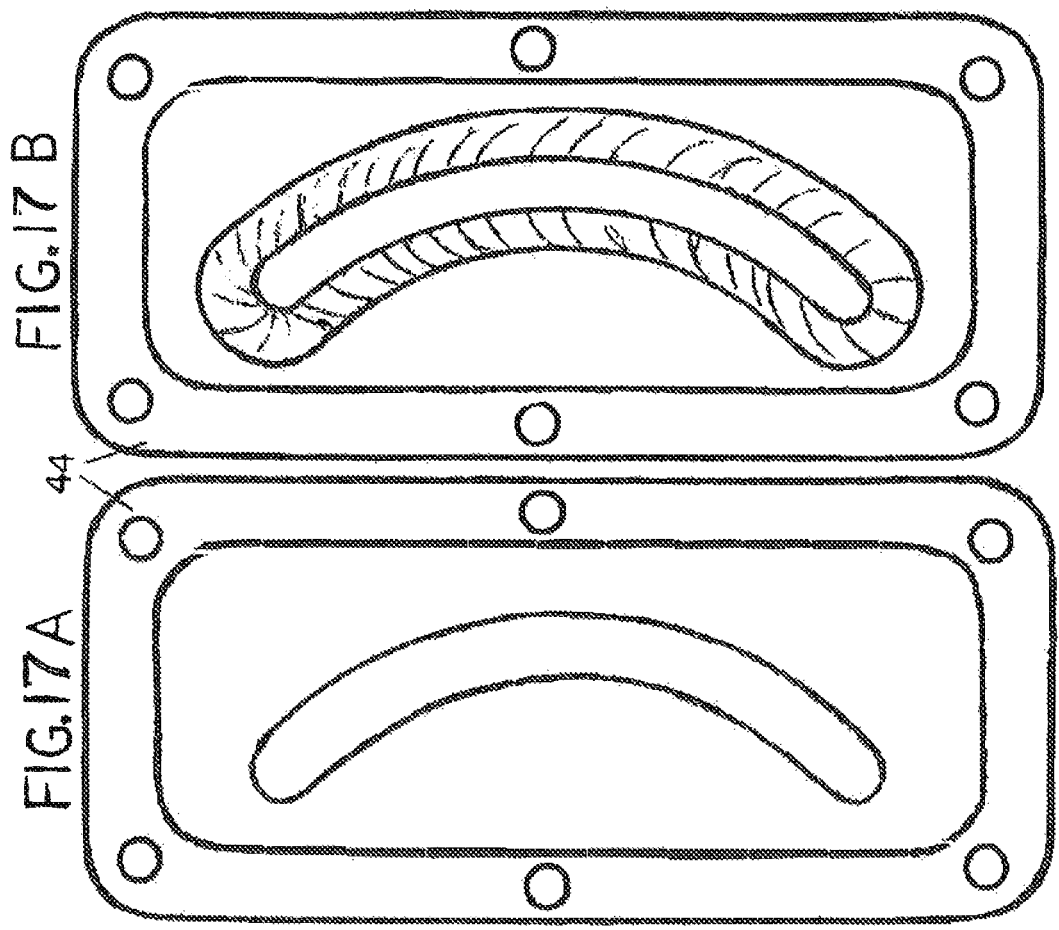

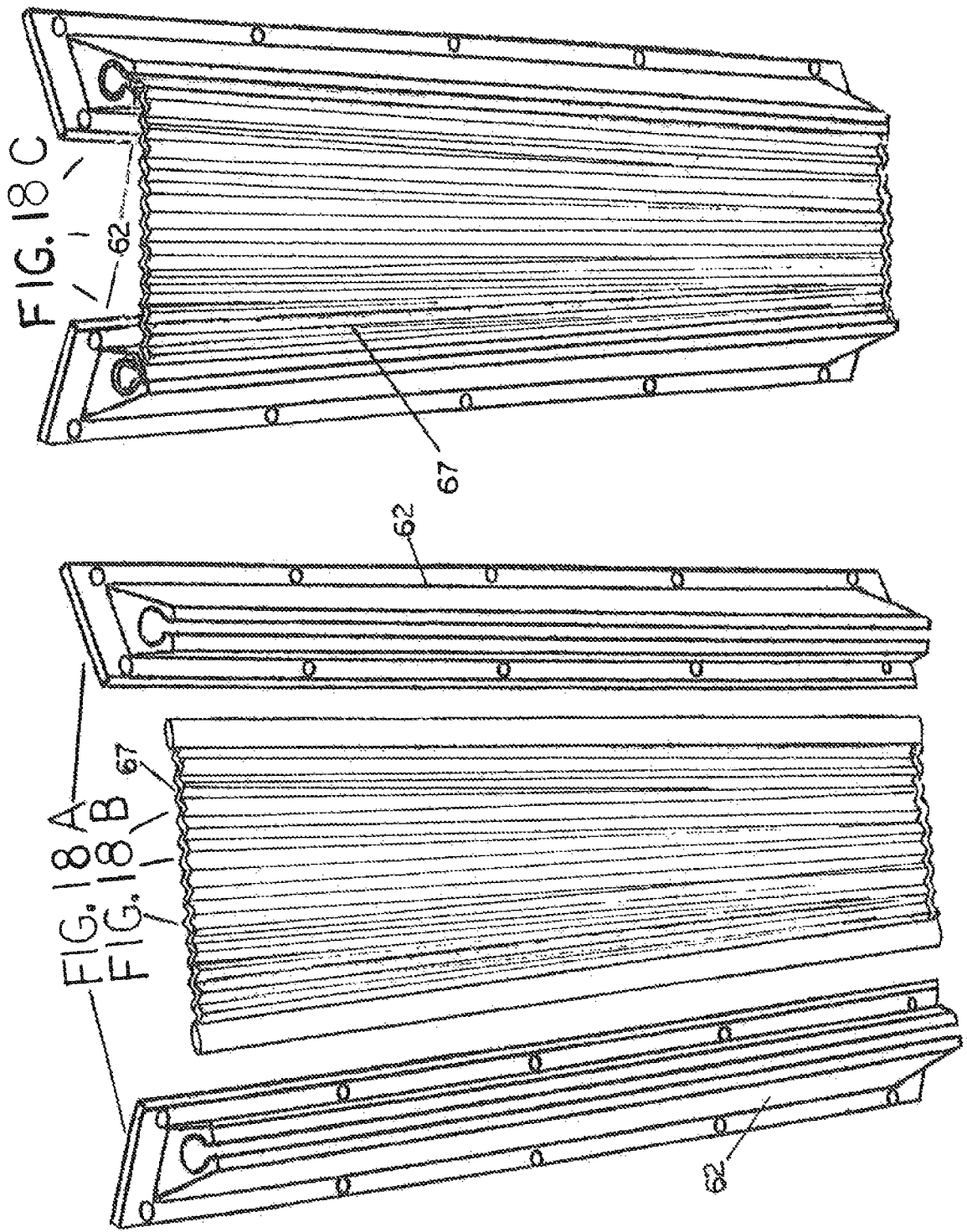

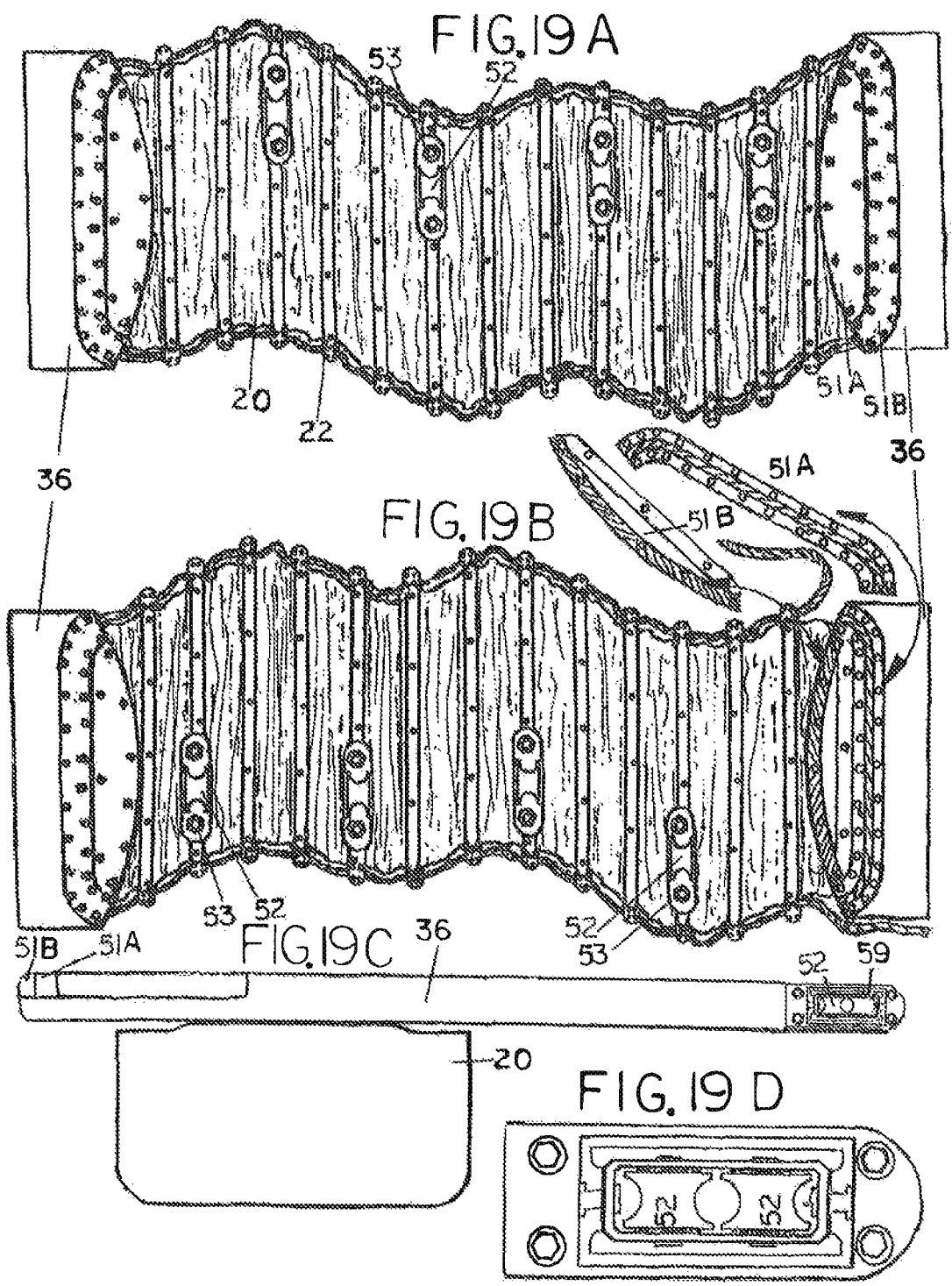

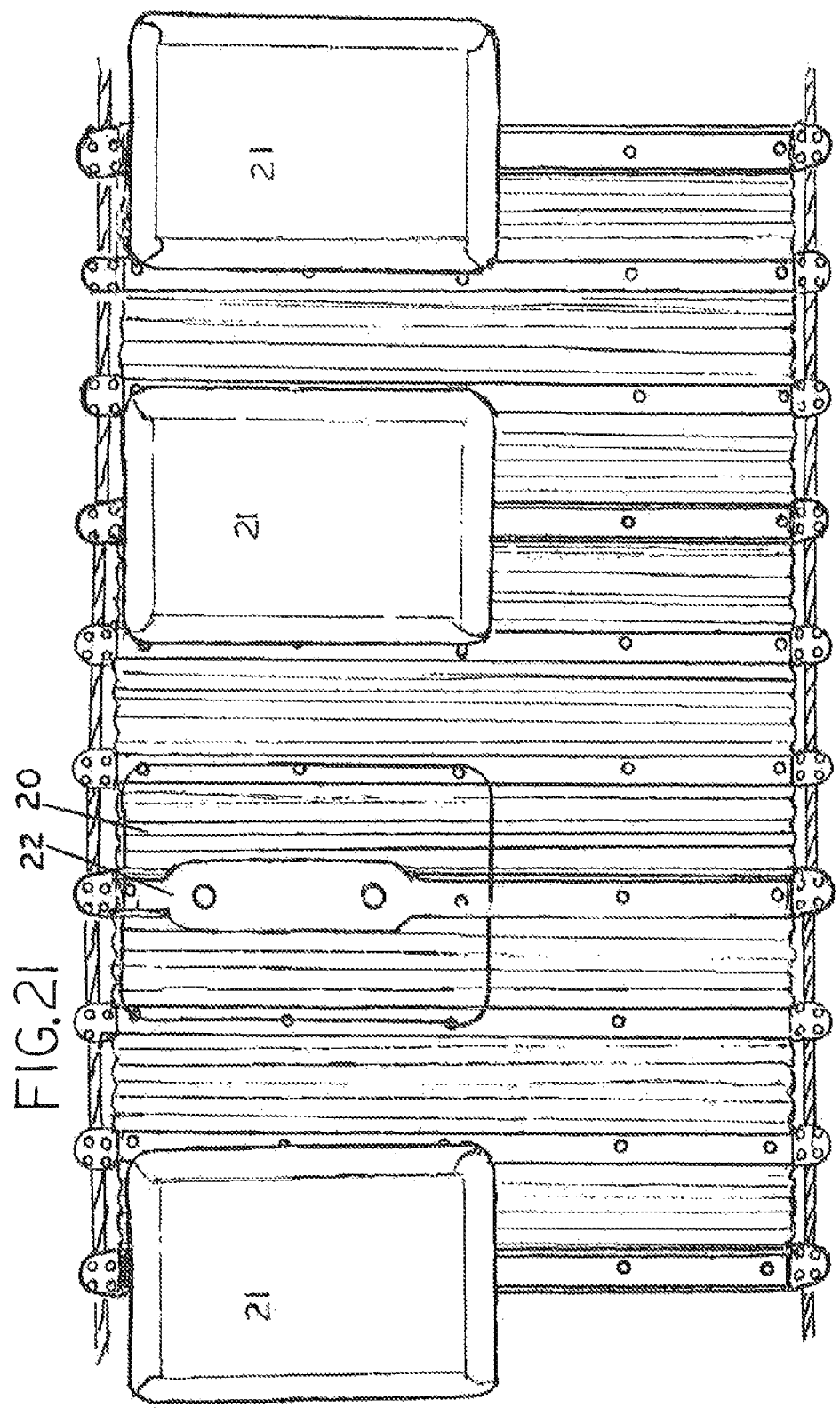

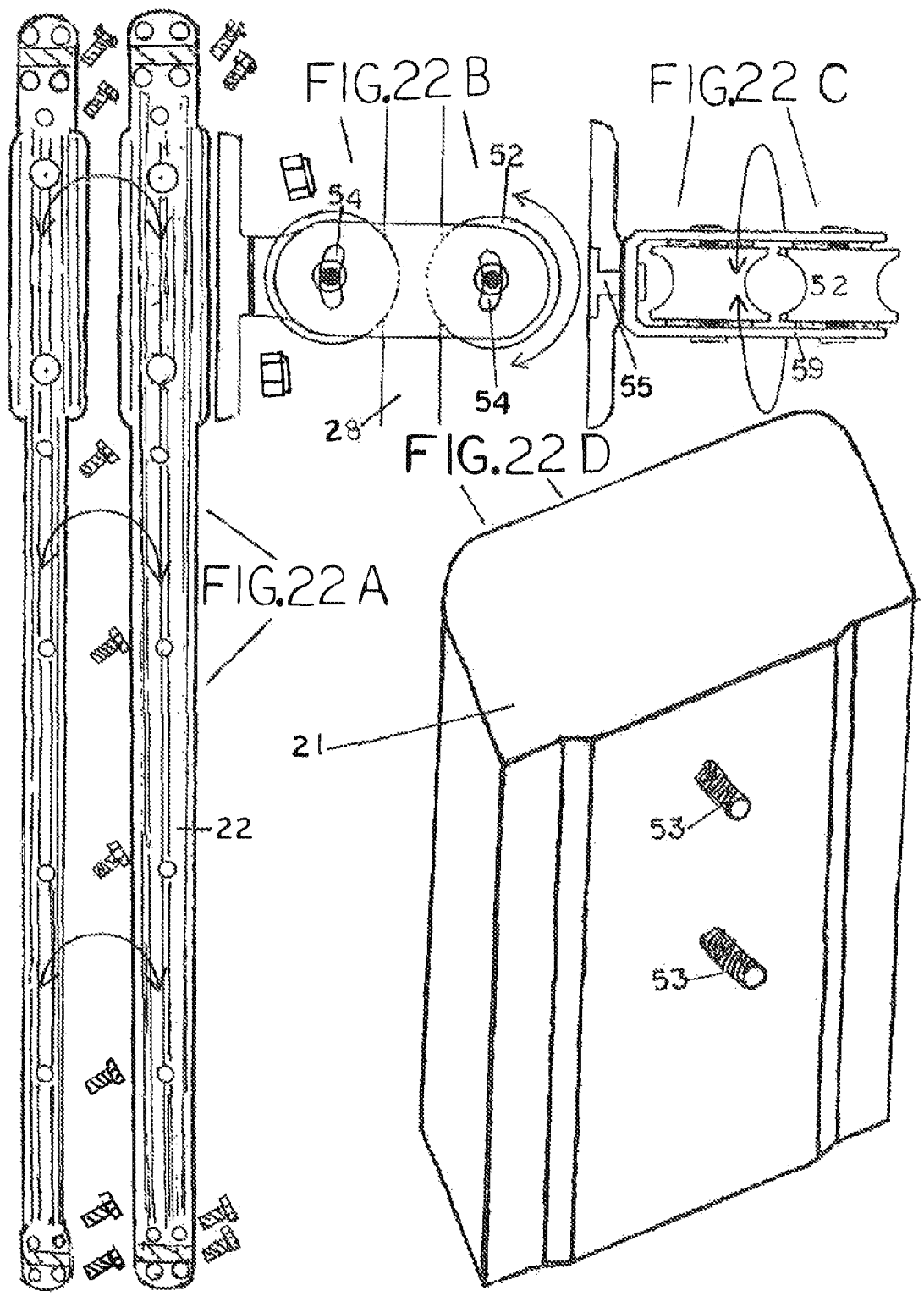

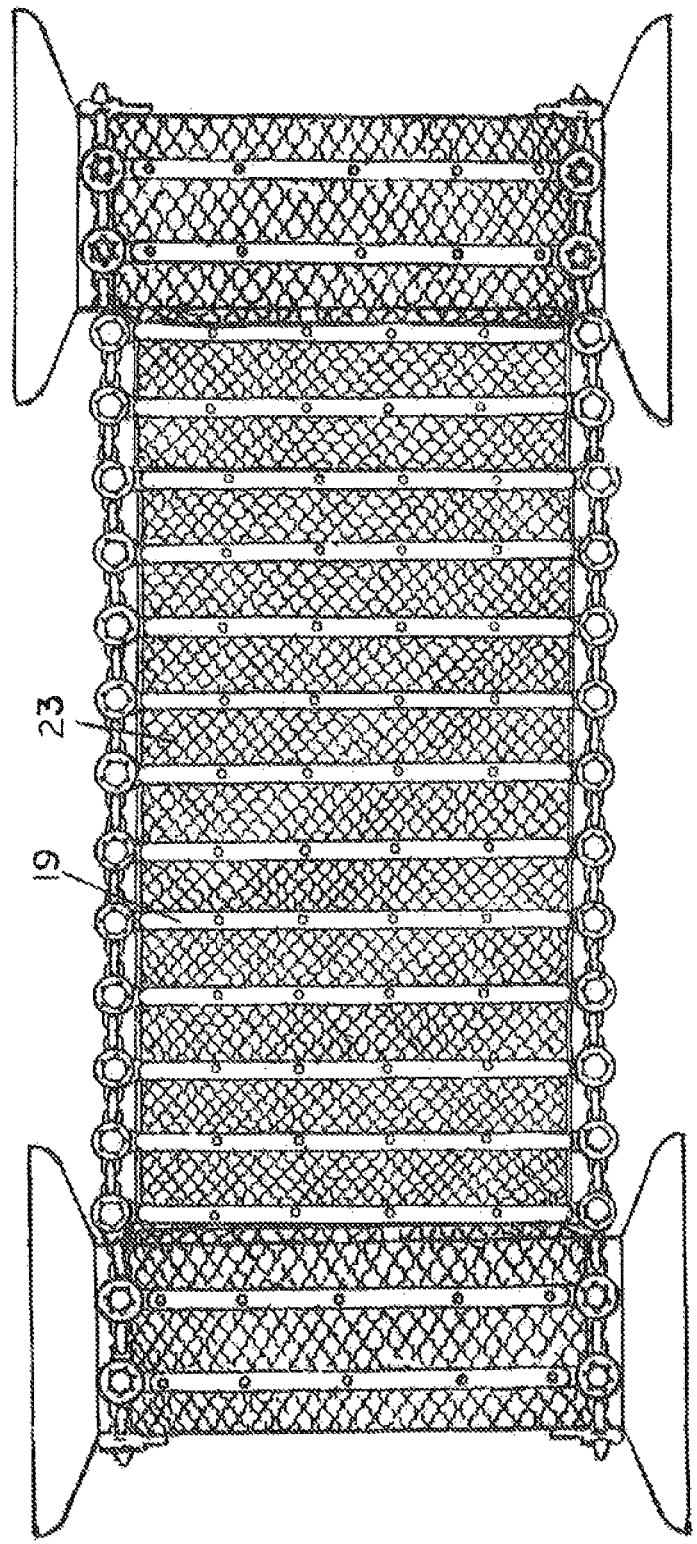

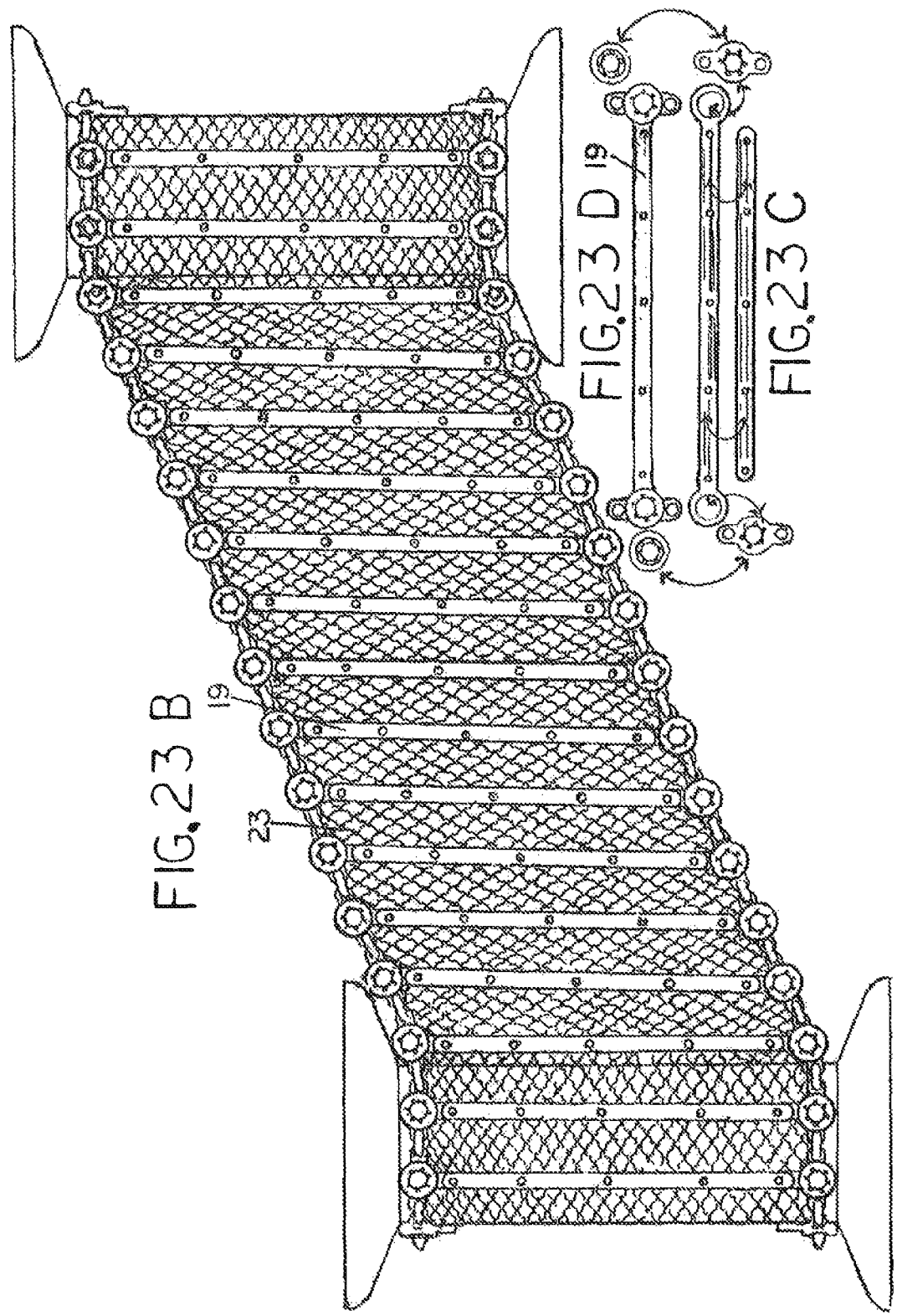

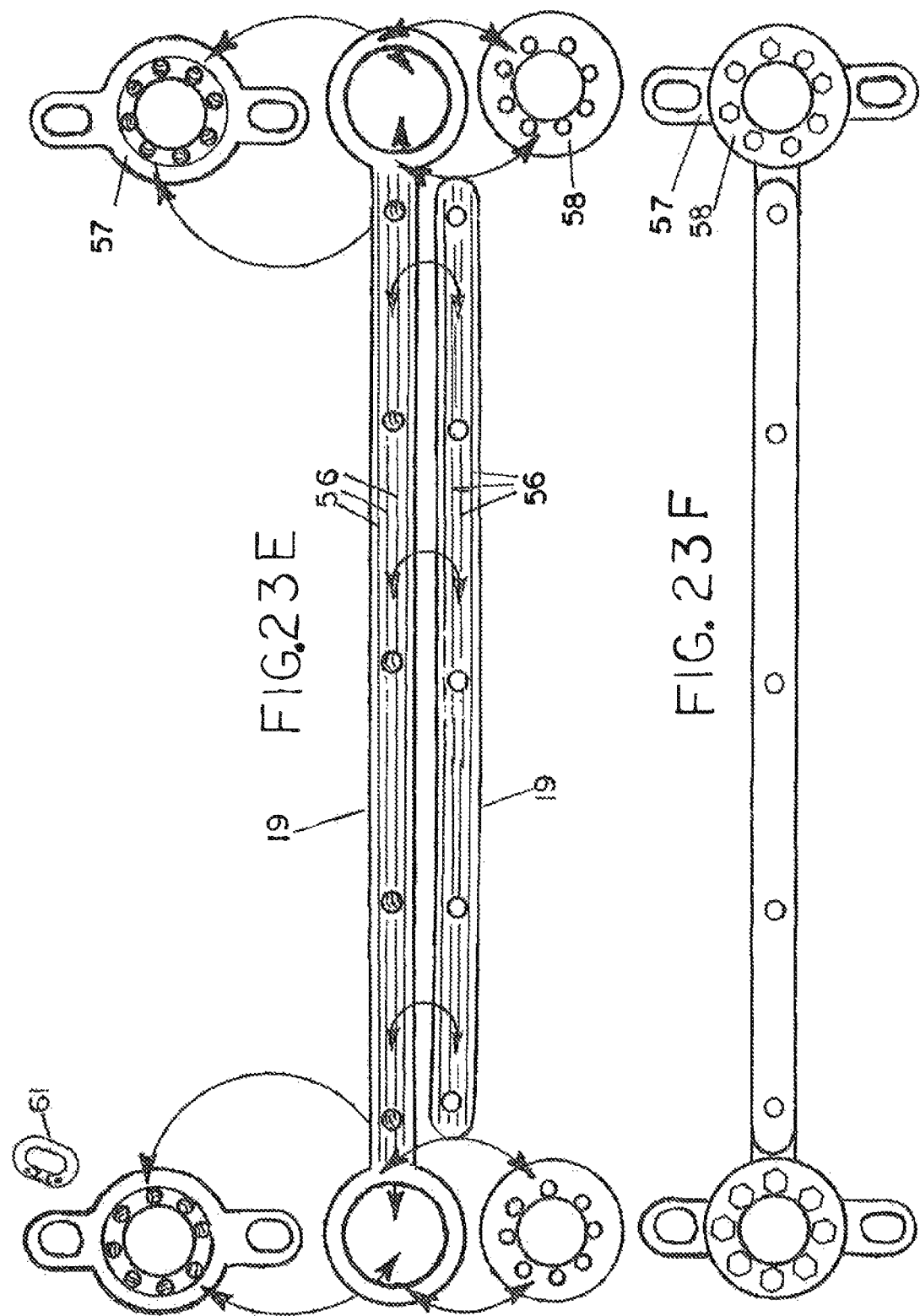

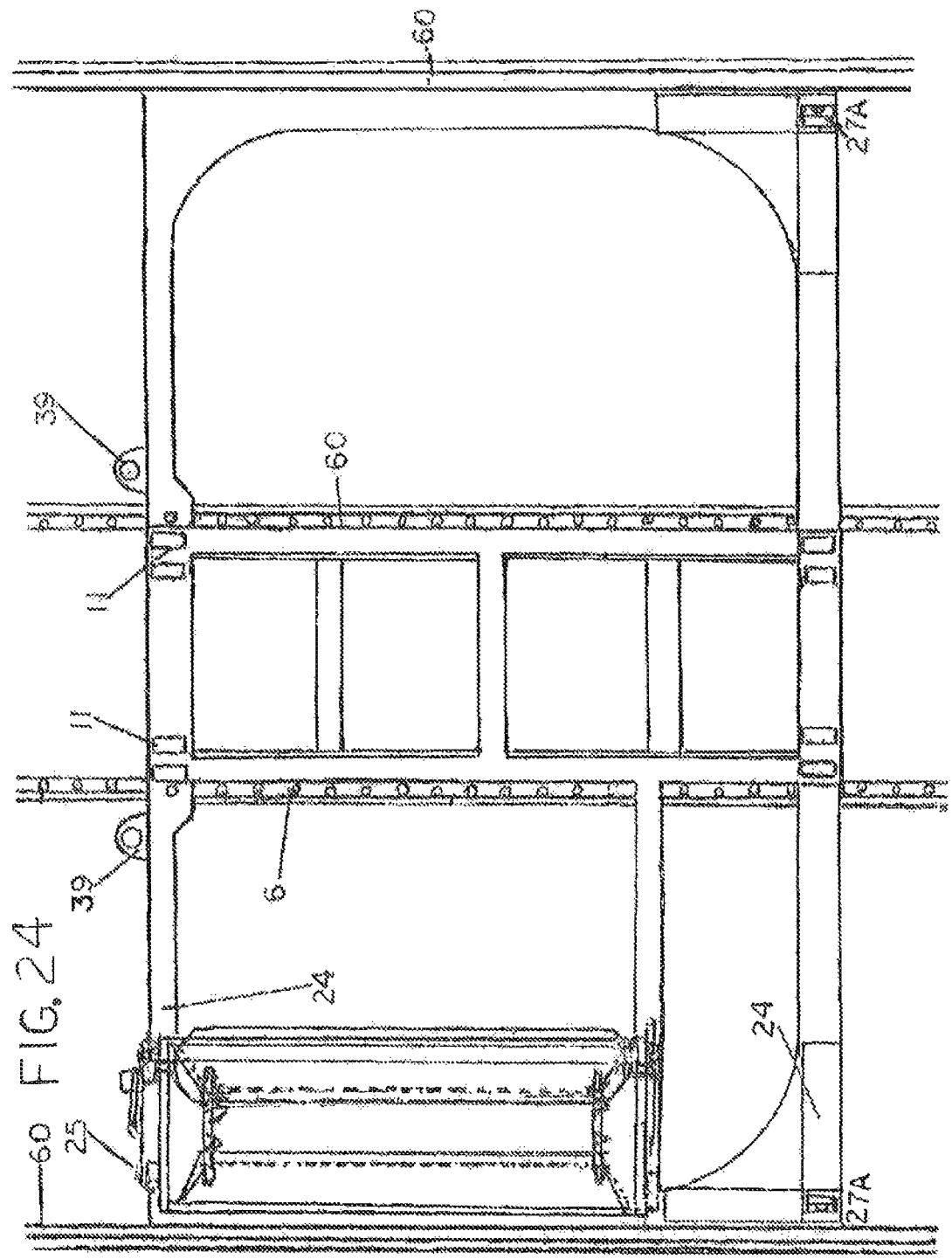

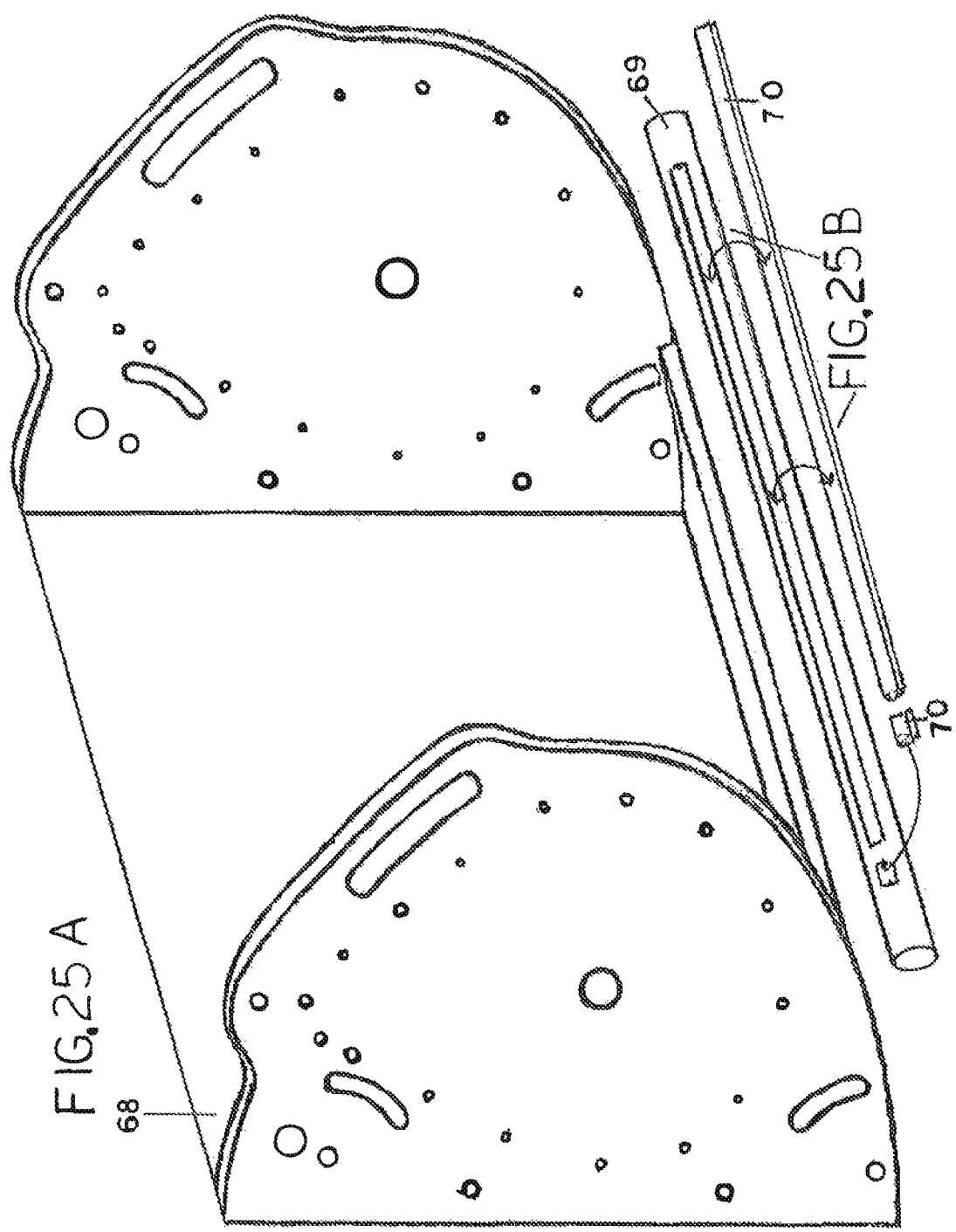

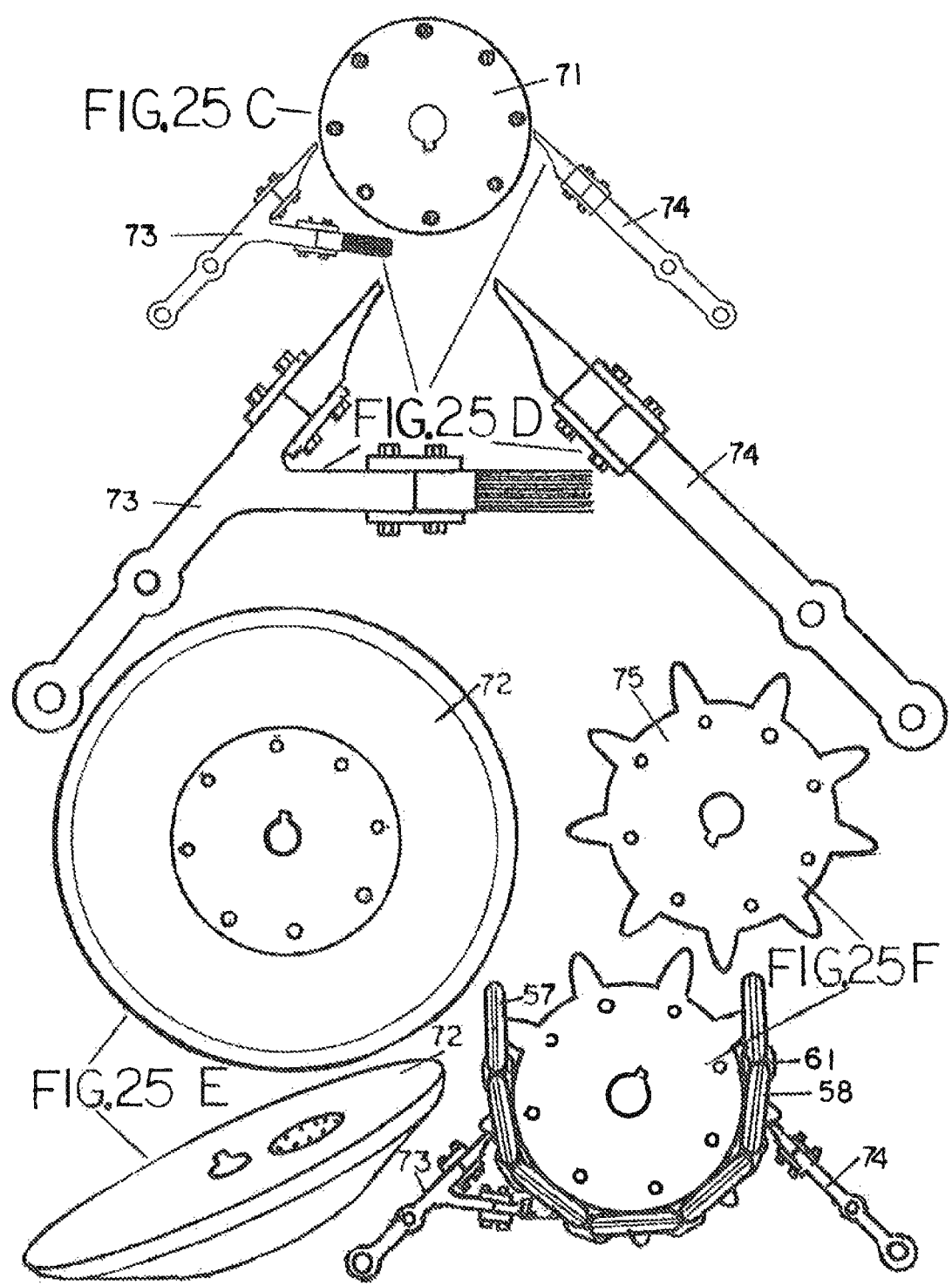

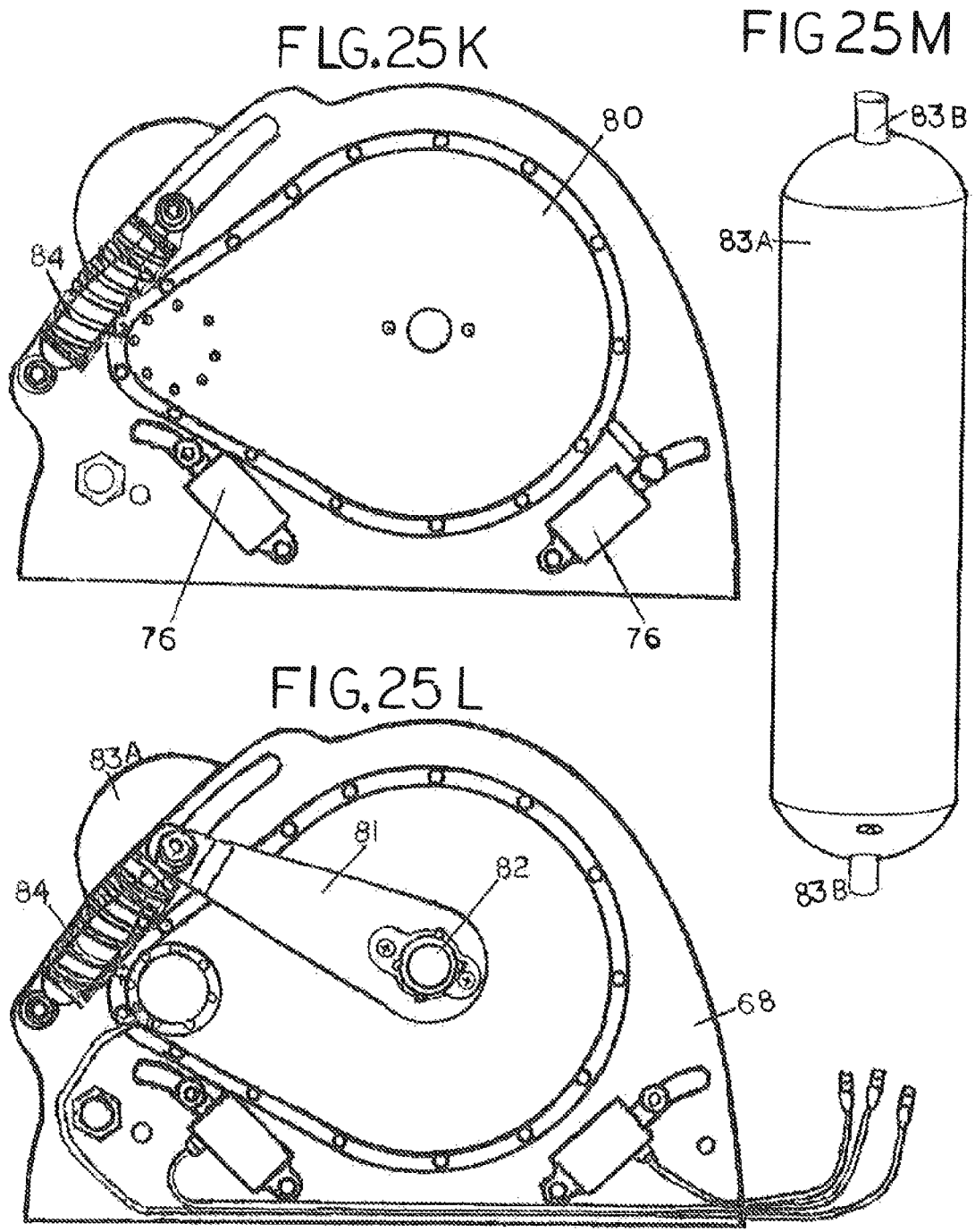

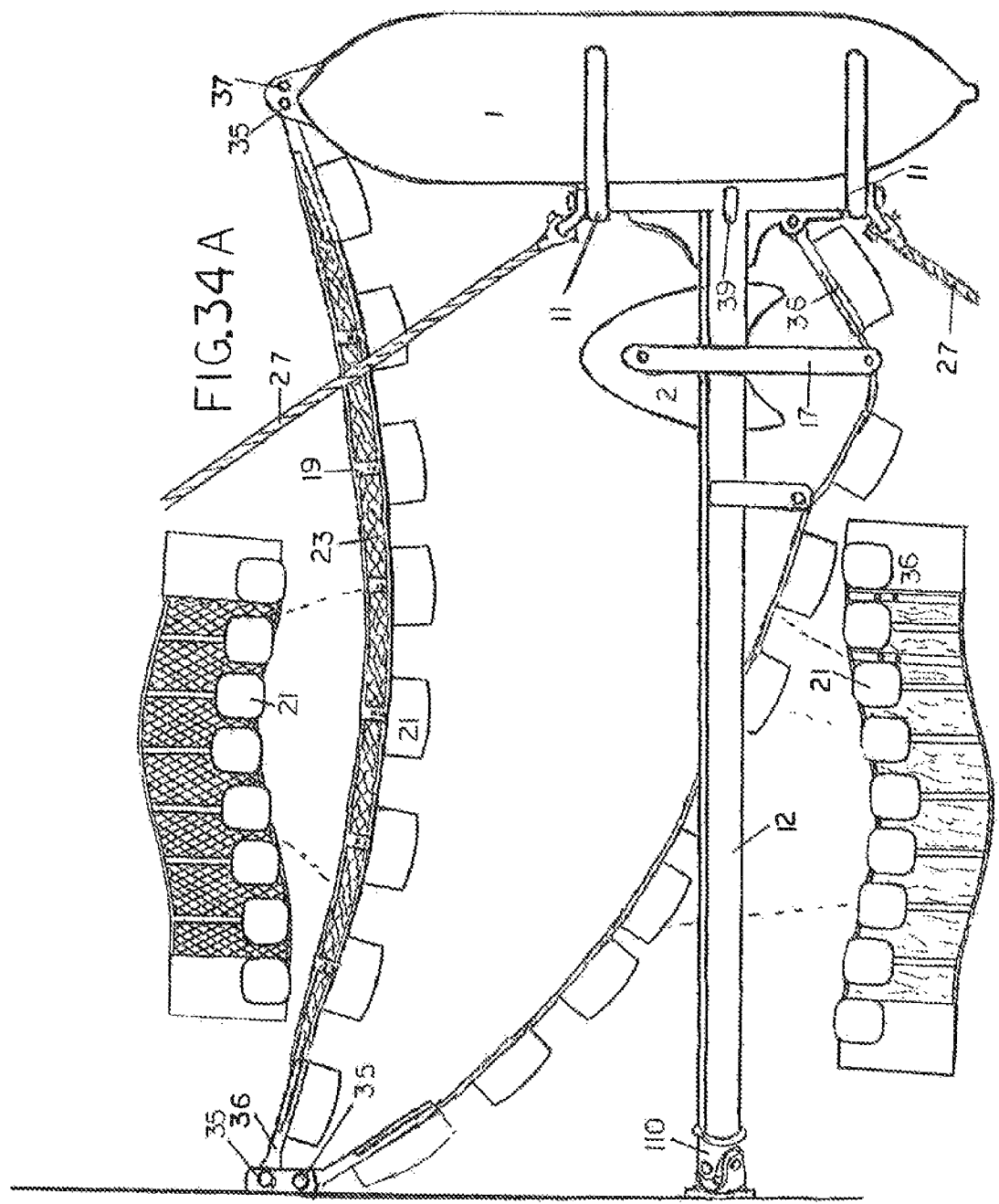

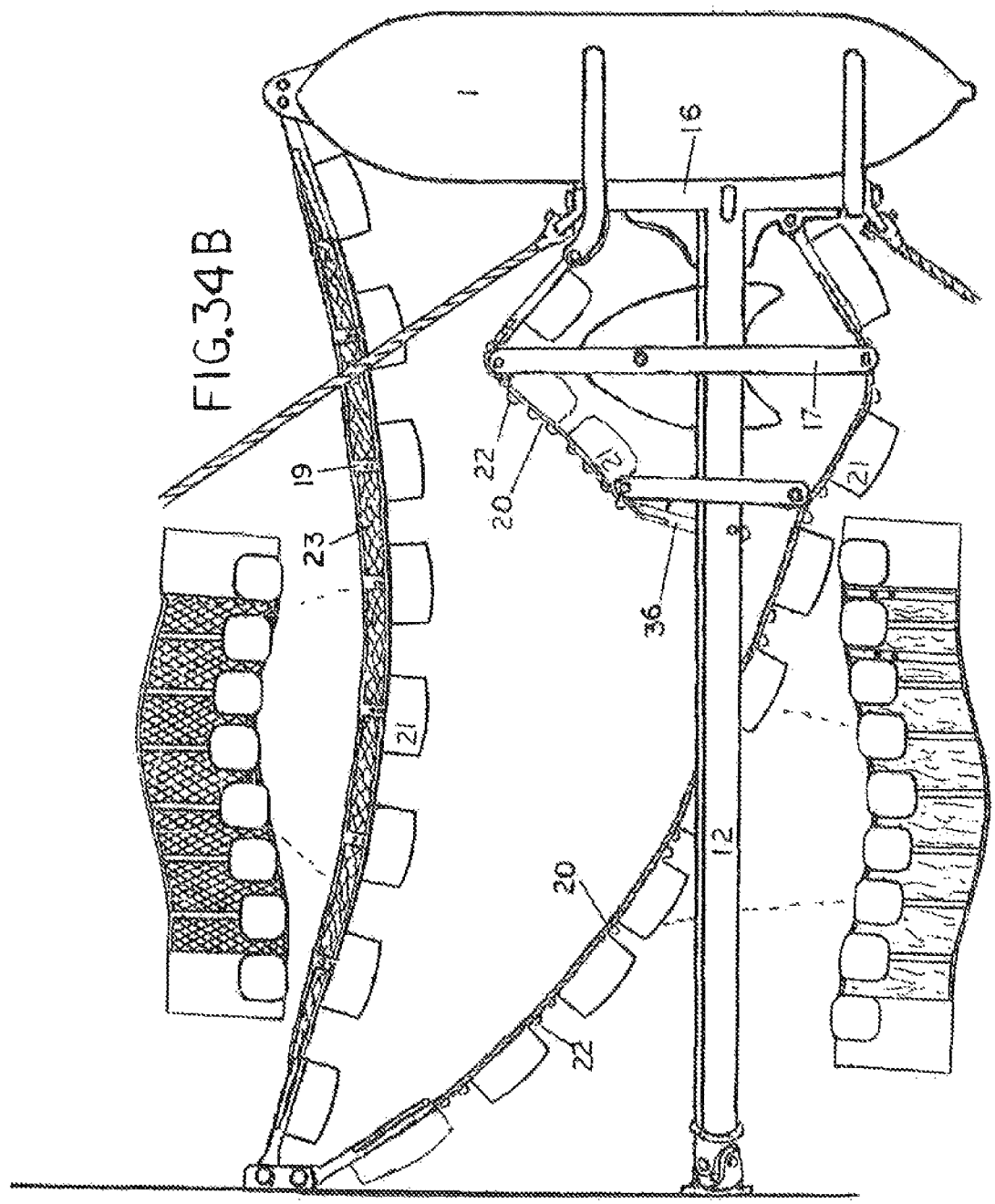

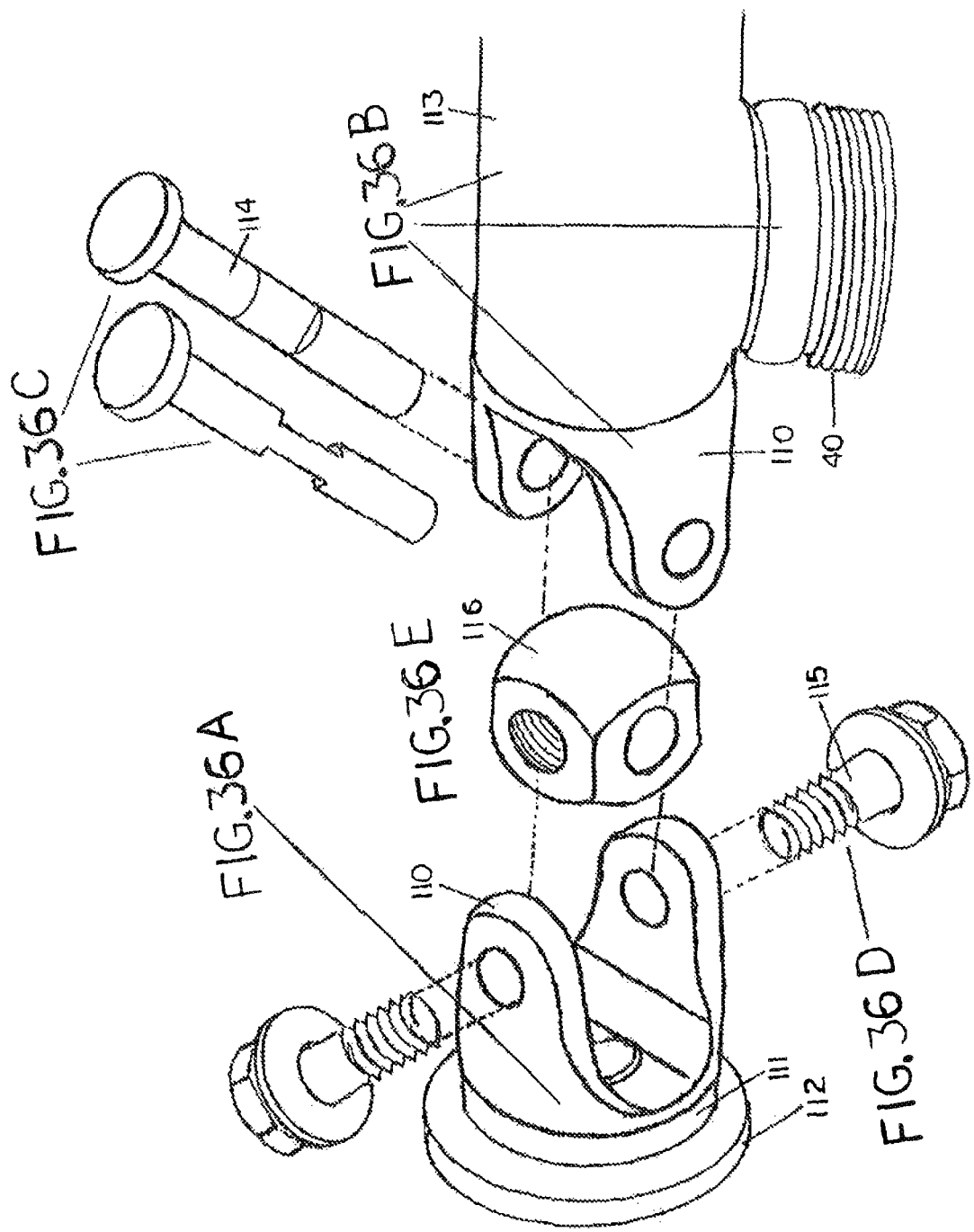

OIL SPILL CLEAN-UP AND RECOVERY SYSTEMS FOR MARINE VESSELS

CROSS REFERENCE TO RELATED APPLICATIONS

This application is a continuation of U.S. Utility patent application Ser. No. 17/010,813 filed Sep. 2, 2020, which claims the benefit of provisional U.S. patent application Ser. No. 62/318,716 filed on Apr. 5, 2016, as well as U.S. Utility patent application Ser. No. 15/473,192 file don Mar. 29, 2017, now abandoned, and the U.S. Utility patent application Ser. No. 15/728,198 filed on May 24, 2019, no U.S. Utility U.S. Pat. No. 10,808,370, and all the contents of each application are hereby incorporated by reference.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

This invention relates to the field of oil spill clean-up and recovery devices. More specifically, this invention is an oil clean-up and recovery device that attaches to the side of oil tankers that have been converted to or built as oil clean-up and recovery ships. Each ship would be equipped with two of these devices that would be attached and height adjusted on tankers on each side of ship. These devices would remove oil from surface of water and transfer it as well as a small percentage of water into tanks in hull of ship where water and oil would be separated. Then oil would be transferred and stored in tanks in the ship and water, once separated from oil, would be pumped out and returned to sea.

2. Description of Related Art

There are no conventional devices found that accomplish the task of this invention or that are similar in any way. Conventional attempts at oil spill recovery largely consist of simple floating booms which will not clean up large oil spills effectively or with any degree of efficiency like the present devices. Most of the oil clean up devices in use entail simple oil skimmers that consist of a tube that is a continuous loop that oil sticks to and floats out into oil spill and picks up a small amount on the sides of the tube and then screeds it off and collects it once it is returned to the machine. There are apparently several other devices and mechanical apparatuses that are being tested, but all of these devices are very slow and very limited in the amount of oil that they can possibly remove from a large oil spill. The instant invention mounts on the sides of large or small oil tankers or other vessels, and will effectively clean up and recover oil with the aid of two lead boats that are pulling the novel inventive apparatus and oil containment booms described herein at over 5 knots and cleaning a path of the oil spill at a half a mile to a mile wide at a time depending on how long the run of the oil containment booms are that are being towed behind these oil containment boom towing boats.

The current state-of-the-art fails to adequately address or combat the problem of large scale oil spills or catastrophic events such as the BP Deepwater Horizon or Exxon Valdez horrific disasters. Such disasters cause losses in the billions of dollars and damage the environment for decades on end.

It is, therefore, to the effective resolution of the aforementioned problems and shortcomings of the prior art that the present invention is directed. However, in view of the marine designs and oil recovery mechanisms in existence at the time of the present invention, it was not obvious to those persons of ordinary skill in the pertinent art as to how the identified needs could be fulfilled in an advantageous manner.

SUMMARY OF THE INVENTION

This invention is an oil spill clean-up and recovery device out at sea as well as a version for smaller vessels that could be used to clean up oil spills closer to shore around marinas, up water ways, etc., as well as out at sea. The design of this equipment works on the same principle that a sink drain works in that a raised tube in a sink drain pulls everything off the surface of the water into the drain from anywhere in that sink as the water starts pouring over the edge of that raised drain. Watching this principle in action, soap suds, floating particles and the like quickly float across the surface of the water from everywhere in the sink, and wondering how to apply that scientific principle led to the instant invention, which applies the principles of floating drains or pick-ups. These oil containment boom tow boats, have one end of the floating oil containment booms shackled to the leading edge of these floats, and they tow these oil containment booms out at an angle ahead of the oil recovery ship, and the oil containment booms along with the forward motion of the ship corral and channel the floating oil back to recovery devices that are mounted on each side of the ship. The oil containment or deflection boom are mounted on the front of this invention with the bottom skirting of the floating oil containment or deflection booms or panels hanging well below the surface of the water under the floats, channeling the floating oil to the back area of this invention where it collects between back oil containment booms and the back side of the floats, where the oil enters pick-up or drain tubes for recovery. The oil containment booms or panels also diminish and eliminate most of the chop and turbulence in the area around where oil enters the device.

The float assembly includes telescopic tubes that are mounted to height adjustment mechanisms, and are facing aft with pick-up or oil points of entry located on the back side of the floats and receive oil channeled to the pick-ups. The assemble avoids head currents created by forward motion of vessel, and can clean up and recover the oil in water with less surface turbulence and chop in a much more efficient manner, and in doing so collects a greater percentage of oil to water.

The novel oil recovery apparatus attaches to the sides of oil tankers that have been converted to or originally manufactured as oil clean-up and recovery ships, or smaller oil recovery vessels to clean up oil spills around marinas, up inland waterways, or out at sea either to recover smaller oil spills or to assist larger converted tankers.

Basic mechanical components of first engineering designs consist of a pivoting framework having one side that attaches to, and is height adjustable on, tracks that are integral to the side of the ship, with the other side of this framework attached to a float attached to both the top and bottom sections of the pivoting framework. The bottom section of this framework consists of a framed platform, that when in use, the lower section of framework would be underwater, and the flat design of the bottom section of the framework creates resistance as it raises and lowers when encountering wave action, giving the assembly added stability in heavy seas.

The framework and platform have pivot points at each end that attach to the bottom framework of the float and framework that attaches to and height adjusts on the tracks on ship. On the bottom of the platform is a tapered pipe or conduit that is integral to the platform. The tapered conduit has one or more extending or telescopic tubes, the bases of which are welded into or part of the top of this conduit. The top of the telescopic tubes are attached to and height adjusted on floats, which keep the top of these tubes at proper height, just below the surface of water. The floats are connected to each other with hinges or pins which are pivot points between each of the floats. On the front or leading edge of each float, there is a flexible curtain to keep oil from going between the floats during the recovery process. The floats pivot, rise and lower independently from each other on the telescopic tubes, with the aid of hinges between the floats, as well as with water tight bendable joints or flexible small sections of hose. The floats are given added stability with the aid of small cables or rods connected to the top and bottom sections of pivoting framework with toggles. These sections of framework remain parallel to each other as they pivot up and down, and each of the cables extend through eyed slides or blocks located just forward of the center of the floats. The top of the telescopic tubes are height adjusted on the floats to a proper height just below water level so oil as well as a small percentage of water enters the mouth or opening at the top of the tubes. The oil is pulled across the surface of the water from several feet or more away from the tube openings that are mounted just below the water line. It appears to include a phenomenon of surface tension of different fluids and has proven to work extremely well in tests with prototype components.

In various configurations, the instant inventive recovery platforms and booms would very effectively remove and clean up oil spill out at sea with these devices mounted on the sides of ship as described, oil spill could be cleaned up and removed in paths covering very large areas at a time as oil would be channeled and corralled into these recovery devices; as oil gets anywhere near the tube openings mounted on the floats just below water line, all oil with a small percentage of water is immediately and simply pulled down through the telescopic tubes. The oil moves down through a conduit or tapered tube that is integral to the bottom section of framed platform, through an electric or hydraulic valve. The valve would be used to shut down the apparatus when no oil is present, as well as to regulate flow when oil is present.

After oil moves through the valve, it travels down a flexible conduit and enters into the hull of a vessel at a bottom side of hull and into collection tank. Various pumps, sensors, oil/water separation and filters can be utilized within the vessel for the liquids and later processing.

Accordingly, it is an object of the present invention to provide oil spill clean-up and recovery systems for marine vessels that solve the aforementioned problems.

It is another object of the present invention to provide oil spill clean-up and recovery systems for marine vessels that provide an advantageous and superior platform, boom, float and collection assembly, and one having components which compensate for and withstand the impact of hydrodynamic forces of the open seas and a moving vessel.

It is another object of the present invention to provide oil spill clean-up and recovery systems for marine vessels which incorporate accessory features and components to enhance its operation and effects.

Still another object of the present invention is to provide oil spill clean-up and recovery systems for marine vessels that entail an extremely large area of operation and collection, enabling faster and more efficient collection of spilled oil, and mitigating deleterious effects on marine life and the environment.

Finally, it is an object of the present invention to provide oil spill clean-up and recovery systems for marine vessels which are cost effective and operational efficient, and incorporate all the above features and objects.

In accordance with these and other objects which will become apparent hereinafter, the instant invention will now be described with particular reference to the accompanying drawings.

BRIEF DESCRIPTION OF THE DRAWINGS

FIG. 2B is a top plan view of the framework and float assemblies of the instant invention on the port side of a vessel.

FIG. 3 is a bottom view of the float assemblies and recovery platform of the instant invention.

FIG. 4 is a front view of an oil recovery assembly, boom, net, framework and platform assemblies of the instant invention.

FIG. 8 is a rear view of an oil recovery assembly, boom, netting, float assemblies, framework and platform assemblies of the instant invention, with the oil containment boom removed depicting the floats with height adjustment tube sections for oil entry.

FIG. 9 is a perspective view of oil recovery components, float and height adjustable tube assembly of the instant invention.

FIG. 10A is a front view of a non-pivoting embodiment of the internal components of the housing and telescopic tubes attached to the respective floats of the instant invention.

FIG. 10B is an alternative front view of a non-pivoting embodiment of the internal components of the housing and telescopic tubes attached to the respective floats of the instant invention.

FIG. 11A is a front view of a pivoting embodiment of the internal components of the housing and telescopic tubes attached to the respective floats of the instant invention.

FIG. 11B is an alternative rear view of a second pivoting embodiment of the internal components of the housing and telescopic tubes attached to the respective floats of the instant invention.

FIG. 12A is a front view of an alternative pivoting embodiment of the internal components of the housing and telescopic tubes attached to the respective floats of the instant invention.

FIG. 12B is a rear view of an alternative second pivoting embodiment of the internal components of the housing and telescopic tubes attached to the respective floats of the instant invention.

FIG. 13A is a top plan view of a float, height adjustable tube, and related components of the instant invention.

FIG. 14A is a top plan view of an alternative embodiment of a float, height adjustable tube, and related components of the instant invention, which also illustrates interconnection with an adjacent float.

FIG. 14B is a top plan view of a further alternative embodiment of a float, height adjustable tube, and related components of the instant invention, also illustrating interconnection with an adjacent float.

FIG. 15A is a perspective view of the height adjustable tube of the instant invention.

FIG. 15B is a perspective view of one embodiment of the adjustment mechanism for the height adjustable tube of the instant invention.

FIG. 15C is a perspective view of a second embodiment of the adjustment mechanism for the height adjustable tube of the instant invention.

FIG. 16A is a top plan view of a float pivot and rotate assembly of the instant invention, providing for controlled movement of the float.

FIG. 16B is a top plan view of an alternative embodiment illustrating a float slide assembly.

FIG. 17A is a top plan view of a first hinge member which mounts between floats for interconnected alignment and pivotal movement.

FIG. 17B is an alternative view of a first hinge member which mounts between floats for interconnected alignment and pivotal movement.

FIG. 17C is a side view of a partial second hinge member which operates in conjunction with the first hinge member of FIG. 17A.

FIG. 17D is a side view of the second hinge member assembly operating which operates in conjunction with the first hinge member of FIG. 17A.

FIG. 17E is view of the apparatus shown in 17D with the attaching hardware removed.

FIG. 18A is a perspective view of mounting bases for flexible curtains used to prevent oil and water turbulence between floats.

FIG. 18B is a perspective view of a central section of the flexible curtains.

FIG. 18C is a perspective view of mounting bases with the central section of the flexible curtain installed.

FIG. 19A is a perspective view of an oil containment and deflection boom panel and associated components.

FIG. 19B is a perspective view of an oil containment and deflection boom panel and associated components, and cover plates.

FIG. 19C is a top plan view of the end panels of the oil containment and deflection boom panels, in conjunction with apparatus of FIG. 16A.

FIG. 19D is a perspective view of an alternative embodiment of the apparatus of FIG. 16A.

FIG. 21 is a front view of an oil containment and deflection boom panels attached to floats on the oil containment and defection booms.

FIG. 22A is front view of the battens for securing to a float and float pivot and rotate assembly of the instant invention.

FIG. 22B is a side view of the float pivot and rotate assembly of the instant invention.

FIG. 22C is a top plan view of the float pivot and rotate assembly of the instant invention shown in FIG. 22B.

FIG. 22D is a perspective view of an oil containment and deflection boom float to be secured to a deflection boom panel.

FIG. 23A is a front view of the battens and netting in the oil containment and deflection panels, and associated drive sprockets.

FIG. 23B is an alternative front view of the battens and netting in the oil containment and deflection panels, and associated drive sprockets, in an vertically flexible and offset configuration.

FIG. 23C is an assembly view for the batten shown in FIG. 23D.

FIG. 23D is a view of an individual batten as those utilized in the apparatus of FIG. 23A.

FIG. 23E is an exploded assembly view of the battens of the instant invention.

FIG. 23F is and an exploded view of an assembled batten of the instant invention.

FIG. 24 is front view of the tracks, framework and pivot points for the boom assembly of the instant invention.

FIG. 34A is an exploded top plan view illustrating details for the recovery apparatus shown in FIG. 33.

FIG. 34B is an alternative embodiment of the apparatus shown in FIG. 34A.

FIG. 36A is a perspective view of a swivel and rotatable joint member of the framework of the instant invention.

FIG. 36B is perspective view of a lower member and coupling of the lower frame of the oil clean-up and recovery equipment of the instant invention.

FIG. 36C are perspective views of custom clevis pins utilized in the joints and couplings of FIGS. 36A, 36B and 36E.

FIG. 36D is a perspective view of securing hardware utilized in the joints and coupling of FIGS. 36A and 36E.

FIG. 36E is a perspective view of a component of a universal joint utilized in the joints and couplings of FIGS. 36A and 36B.

DETAILED DESCRIPTION

The present invention may be understood more readily by reference to the following detailed description taken in connection with the accompanying drawing figures, which form a part of this disclosure. It is to be understood that this invention is not limited to the specific devices, components, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

NOTE: following these Detailed Descriptions with reference to the FIGURES, is also an INDEX OF SEQUENTIAL NUMERICAL COMPONENTS referenced in the FIGURES for further ease of reference.

Figure 1:
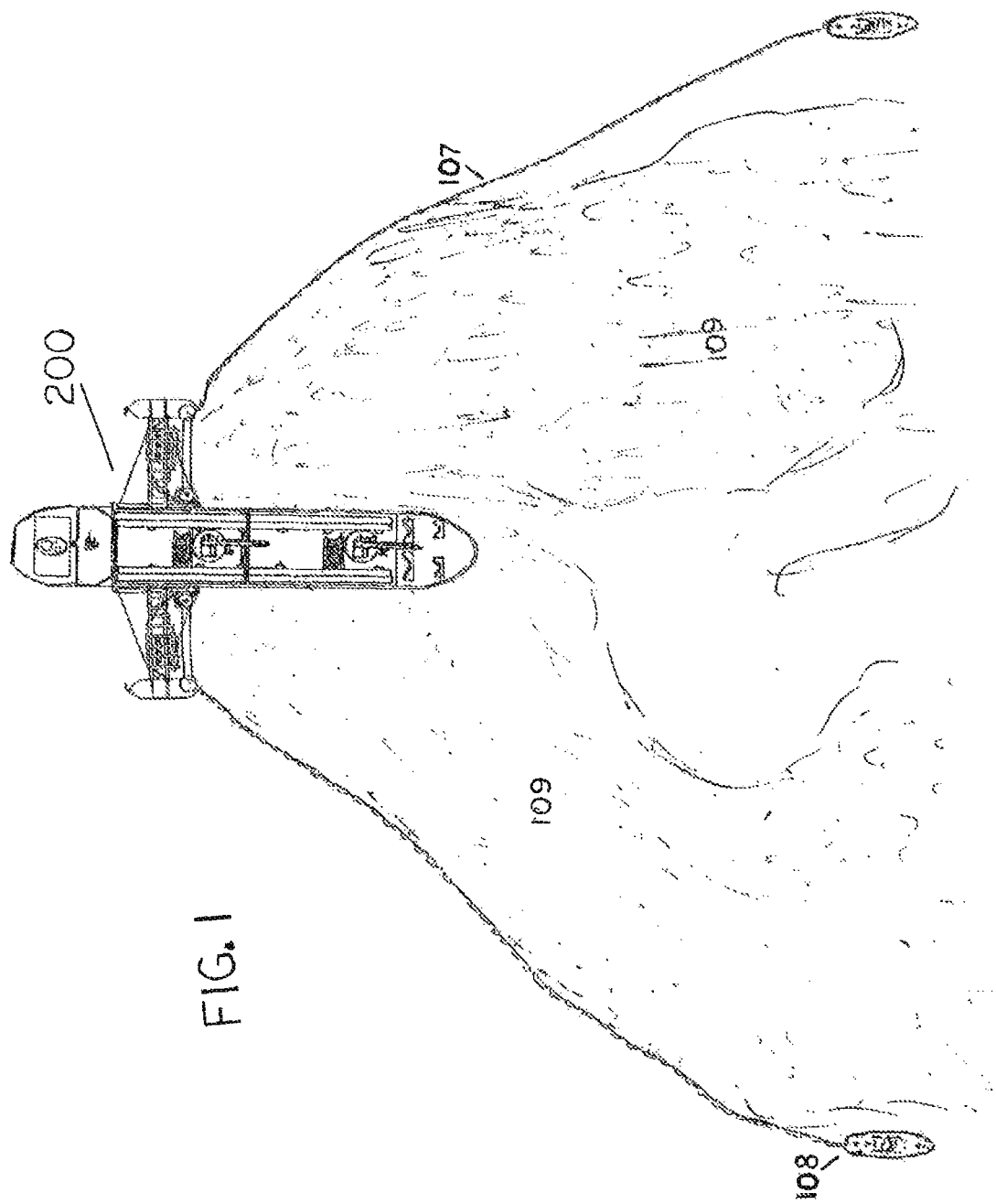
FIG. 1 is a top plan view of an oil tanker of the instant invention engaged in the oil clean-up and recovery process.

Turning now to the drawings, FIG. 1 illustrates an overhead view of the invention in a first embodiment oil cleanup vessel 200, which in most cases would be the larger of the three vessel applications of this invention that are illustrated herein. Shown is an oil clean up and recovery unit mounted on each side of the recovery vessel. The recovery vessel would be of the same approximate size as an island tanker and equipped with two oil containment boom tow boats 108, which travel ahead and outwardly to each side of the recovery vessel, and towing oil containment booms 107 that channel and corral the floating oil 109. This is accomplished by means of forward movement of the three vessels, wherein floating oil gathers and concentrates in the aft portion of the oil clean up and recovery units and the oil is pulled into intake tubes attached to floats, lead booms, and custom platform and recovery booms. They include depth level adjustment mechanisms that maintain the oil intake tubes barely under the surface of the water where the oil and a varying percentage of water is pulled down the intake tubes by means of oil corralling and in part by surface tension. The recovered oil is then, either pumped directly into a water and oil separation tank, or the oil and water would first flow into an oil and water receiving tank before the solution is pumped into a water and oil separation tank. All three basic embodiments of this invention operate on the same fundamental principles, as well as cleanup and recover of the oil in the same basic manner.

Figure 2A:
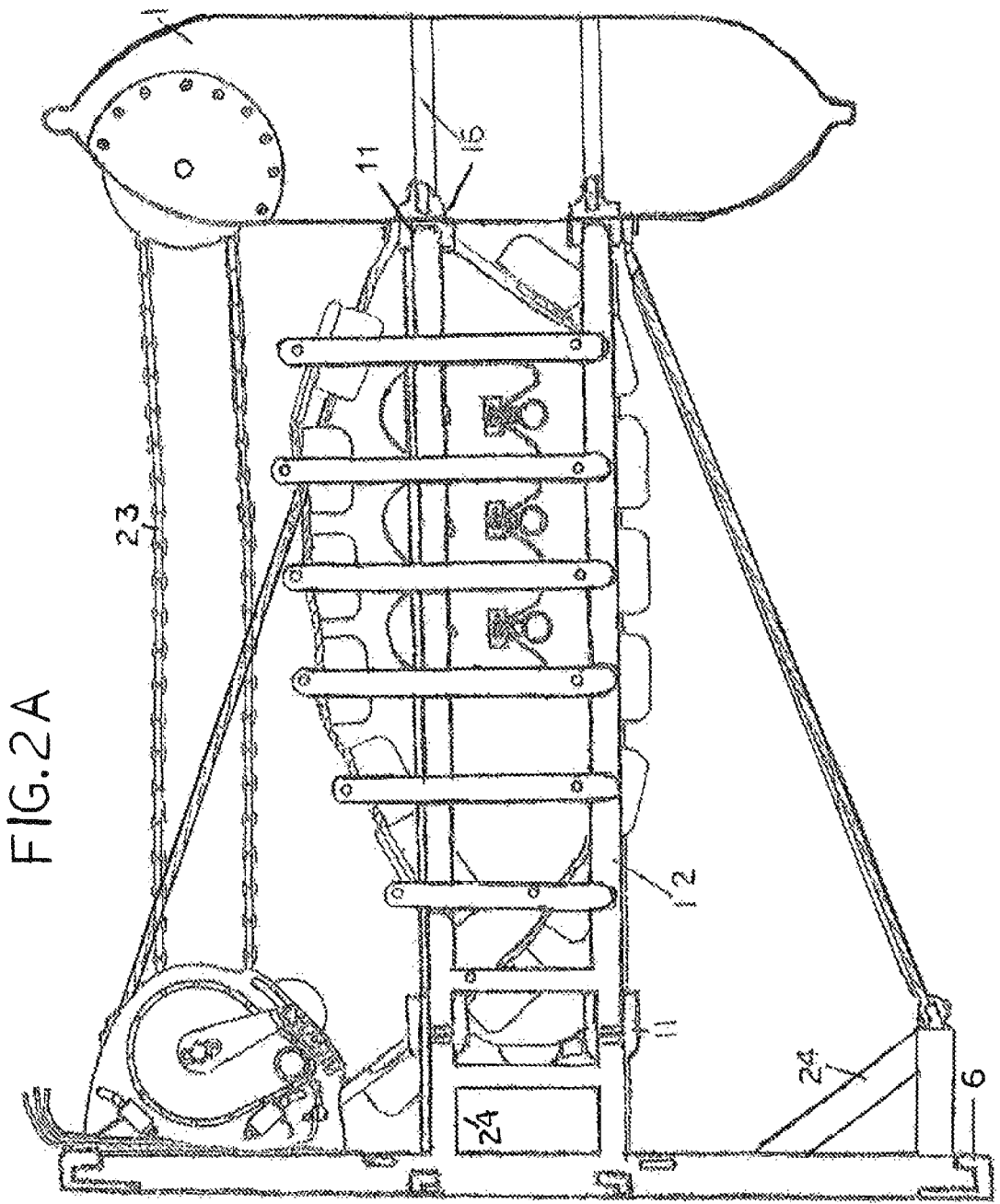
FIG. 2A is a top plan view of the framework and float assemblies of the instant invention on the starboard side of a vessel.

FIG. 2A illustrates an overhead view of the oil cleanup and recovery unit made in a configuration that would mount on the starboard side of oil cleanup vessel 200 as shown in FIG. 1. This recovery unit consists of three basic sections, the first being framework 24, that rides on and is height adjusted on tracks 6 that are an integral part of oil cleanup vessel 200. Framework 24 of the oil cleanup and recovery assembly is the section that the remaining components of the unit attach to and pivot from. The initial connection are pivot points 11, which the upper and lower sections of framework 12 attach to as seen hereinafter. The opposing end of the framework connects to a second set of pivot points 11, located on framework 16 of large float 1, at connection points located on the upper and lower portions of the large float framework 16. Main float 1 is the member of this device that carries the remaining load of this oil cleanup and recovery unit over waves encountered during the oil cleanup and recovery process. The additional components of the unit are either attached to, located between, or a combination of being attached to and located between, framework 24, main float 1, and the upper and lower sections of framework 12. Netting 23 is shown as described hereinafter.

FIG. 2B illustrates the oil cleanup and recovery device in the configuration that would be mounted on the port side of the oil cleanup and recovery vessel 200 as shown in FIG. 1, that would be simply made proportionally the same, but with all of the components reversed in an exact mirrored or reverse image of the oil cleanup and recovery device seen in FIG. 2A, that mounts on the starboard side of the vessel, including framework 24. Also depicted are floats 21 on the oil containment and deflection booms, described in detail hereinafter.

FIG. 3 is an illustration of the bottom of the oil cleanup and recovery unit where platform 31 is welded to, and an integral part of, lower section of framework 13, that connects to and pivots on framework 24, that rides on and is height adjusted on tracks 6. The lower section of framework and platform would also connect to and pivot on connection points 11, located on the lowermost section of framework 16, that is welded to and part of the main float 1. Platform 31 supports and is integral to a tapered tube 30, which is welded to a bottom portion of platform 31. Tapered tube 30 carries all of the recovered oil which is received from intake tubes that are housed in intake tube housings, which are part of pivoting tube housing bases described hereinafter. These pivoting tube housings are tied into this tapered tube by means of a series of holes that are formed in the upper side the platform 31. These holes have collets with threaded holes that are welded around the holes in the upper side of platform 31, where pivoting bases of tube housings are mechanically fastened to welded collets.

FIG. 4 depicts a front view of a first embodiment of the oil cleanup and recovery assembly, as it would be mounted on the side of a vessel, illustrated as an optional design of this invention. This optional design of for a receiving tank 139, as well as its inner components and functions, has been adopted from a third embodiment of this invention [[,]]. Receiving tank 139 and inner components are housed in a lower portion of the framework 24, located just under the main body of the oil recovery device. Inside receiving tank 139, is a set of three valves in line, or teed off of the intake line 128 of pump 145, which is the line inside this receiving tank that the flexible hose 40 couples to. The three valves work in conjunction with each other, to either direct the oil and water solution directly to the pump 145 by means of opening the center valve, and closing the two other teed off valves 142, 144, this action would enable this pump 145 and aid in the oil cleanup and recovery process. The option of letting the oil clean up and recovery process operate by gravity alone would remain available to the operator simply by closing a center valve, and opening the two valves 142 and 144, that are teed off of the intake line to the pump 128. This process redirects the oil and water solution directly into the receiving tank 139, and when the oil and water reach a certain level, a float switch would be activated which would turn on the pump. This would pull the oil and water through the opened valve 144, which would function as the intake for the pump. Tank 139 would be evacuated, and as the water level inside the tank recedes, the float switch would turn the pump off and this cycle would simply continue. All of the controls to open and close the valves and engage the pump would be on the control panel located on the vessel, as described with respect to the individual components of this invention. Pump 145 pumps the oil and water solution received from flexible hose 40 directly out of the pump through the tube that is coupled to the outlet of the submersible pump 137, to the oil and water separation tank and equipment. This tube is attached to a flexible tube at a point just above the receiving tank that carries this oil and water solution to the main deck of the vessel, where this hose is coupled to a deck fitting that is an inlet that leads to the water separation tank and equipment located in an inner portion of the hull of the vessel.

Figure 5:
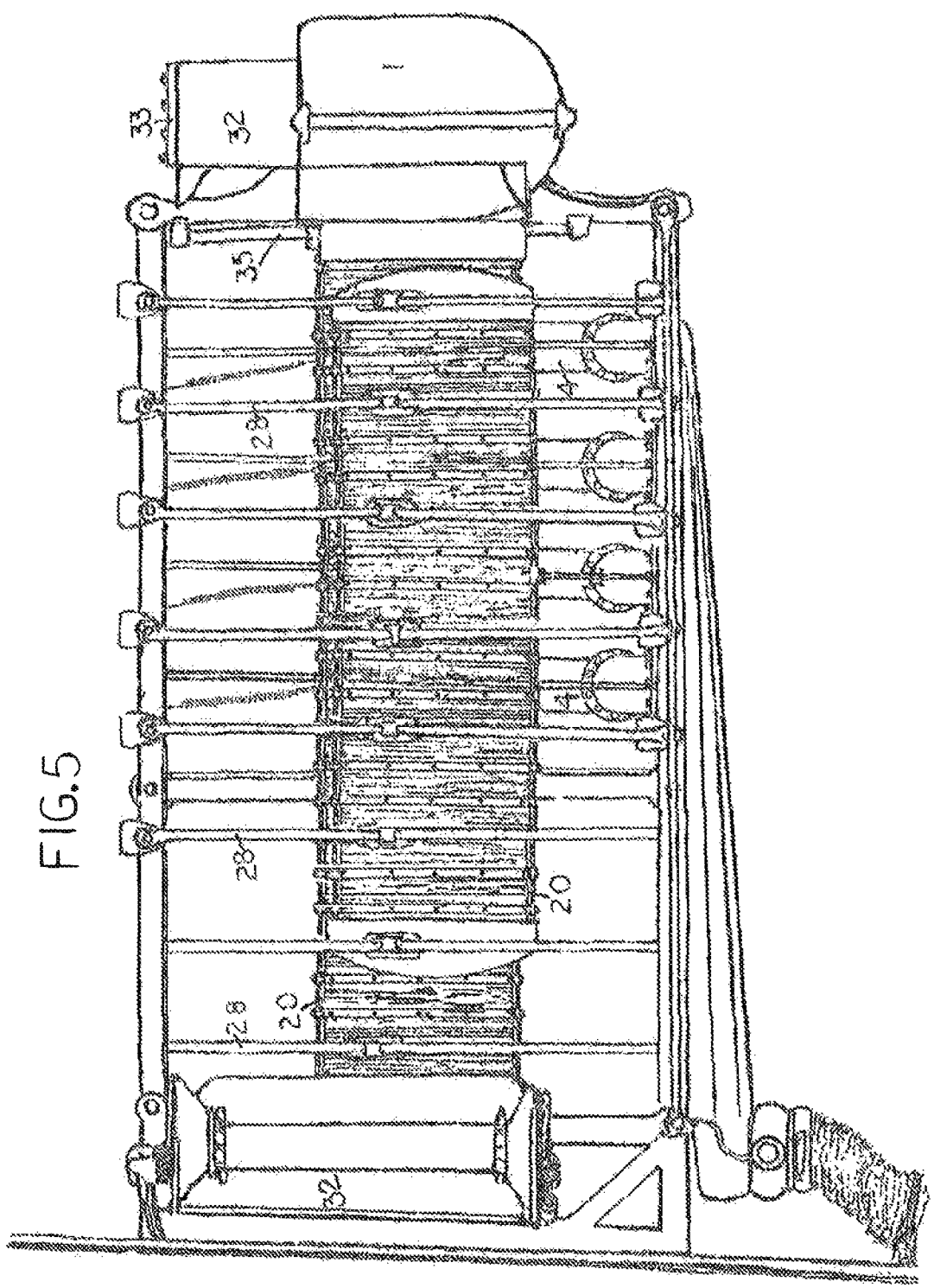
FIG. 5 is a front view of an oil recovery assembly, boom, framework, net spool, and platform assemblies of the instant invention with a net assembly removed.

FIG. 5 is an illustration of the front view of the oil cleanup and recovery device in a first embodiment with the net assembly removed, that runs on a continuous loop between the net assembly drive unit seen in FIG. 25A through FIG. 25M, and the netting spool that is within spool housing 32 and housing cover 33, located in an inner portion of main float 1. The netting for this illustration has been removed to view other components of this unit. Oil deflection and containment booms 20, as well as their end panels 35, rods or cables 28 that booms 20 ride up and down on vertically, as well as the blocks seen and described in FIGS. 22B and 22C. Housings 4 house telescopic tubes 5 as seen in FIG. 12A.

Figure 6:
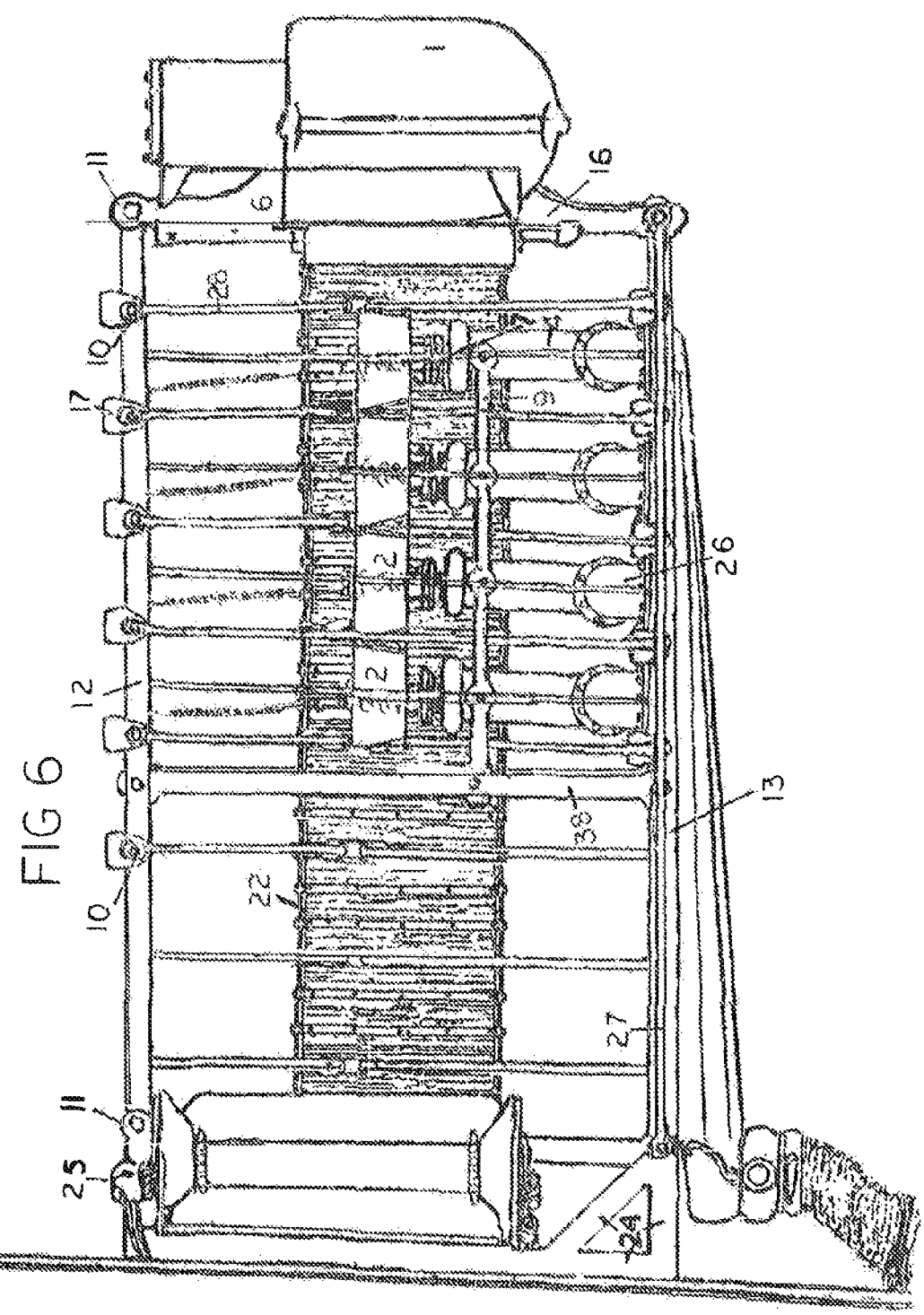
FIG. 6 is a front view of an oil recovery assembly, boom, framework, net spool, and platform assemblies of the instant invention with the net assembly and oil deflection boom removed.
Figure 7:
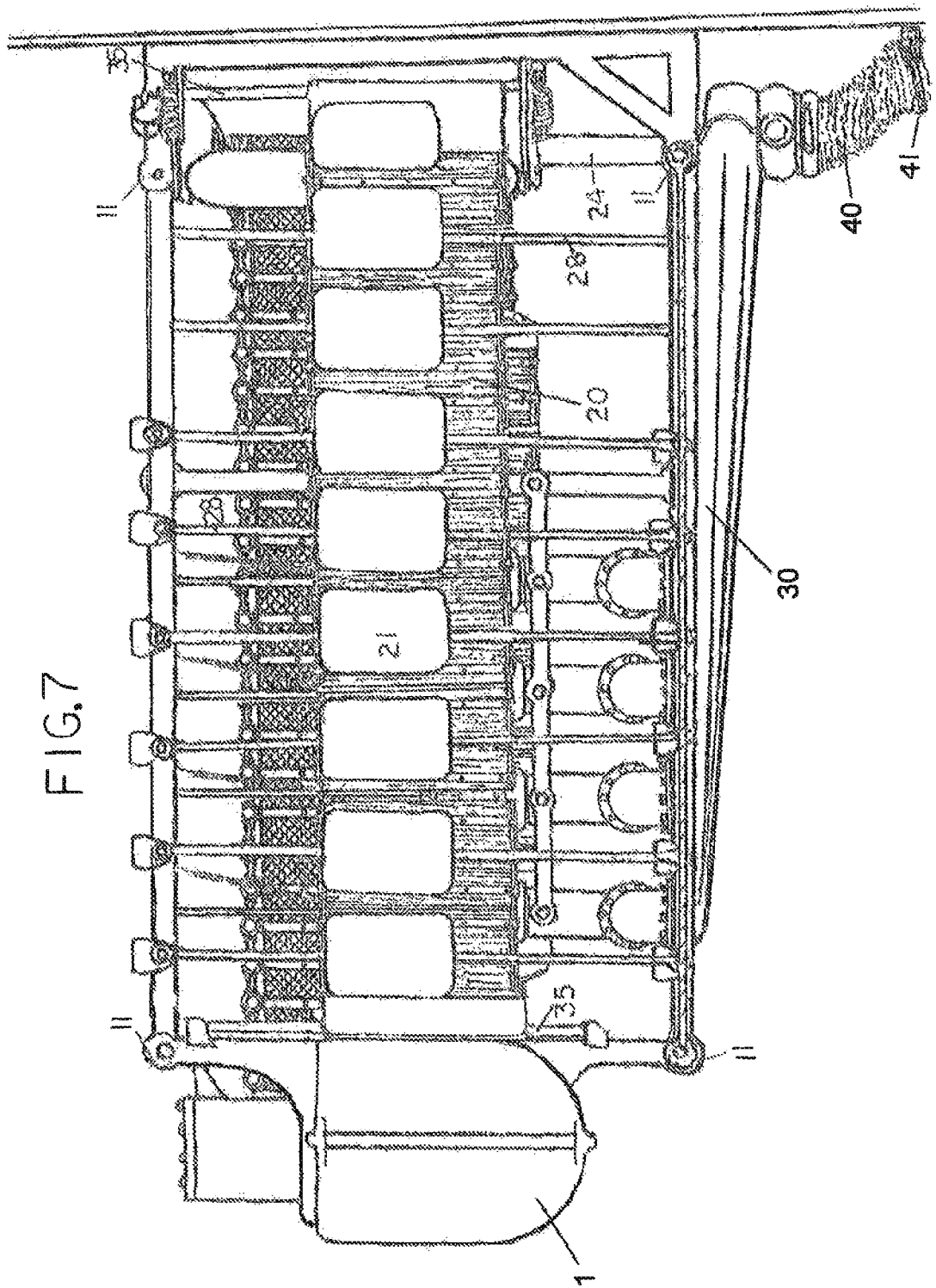
FIG. 7 is a rear view of an oil recovery assembly, boom, netting, oil containment boom, float assemblies, framework and platform assemblies of the instant invention.
Figure 13B:
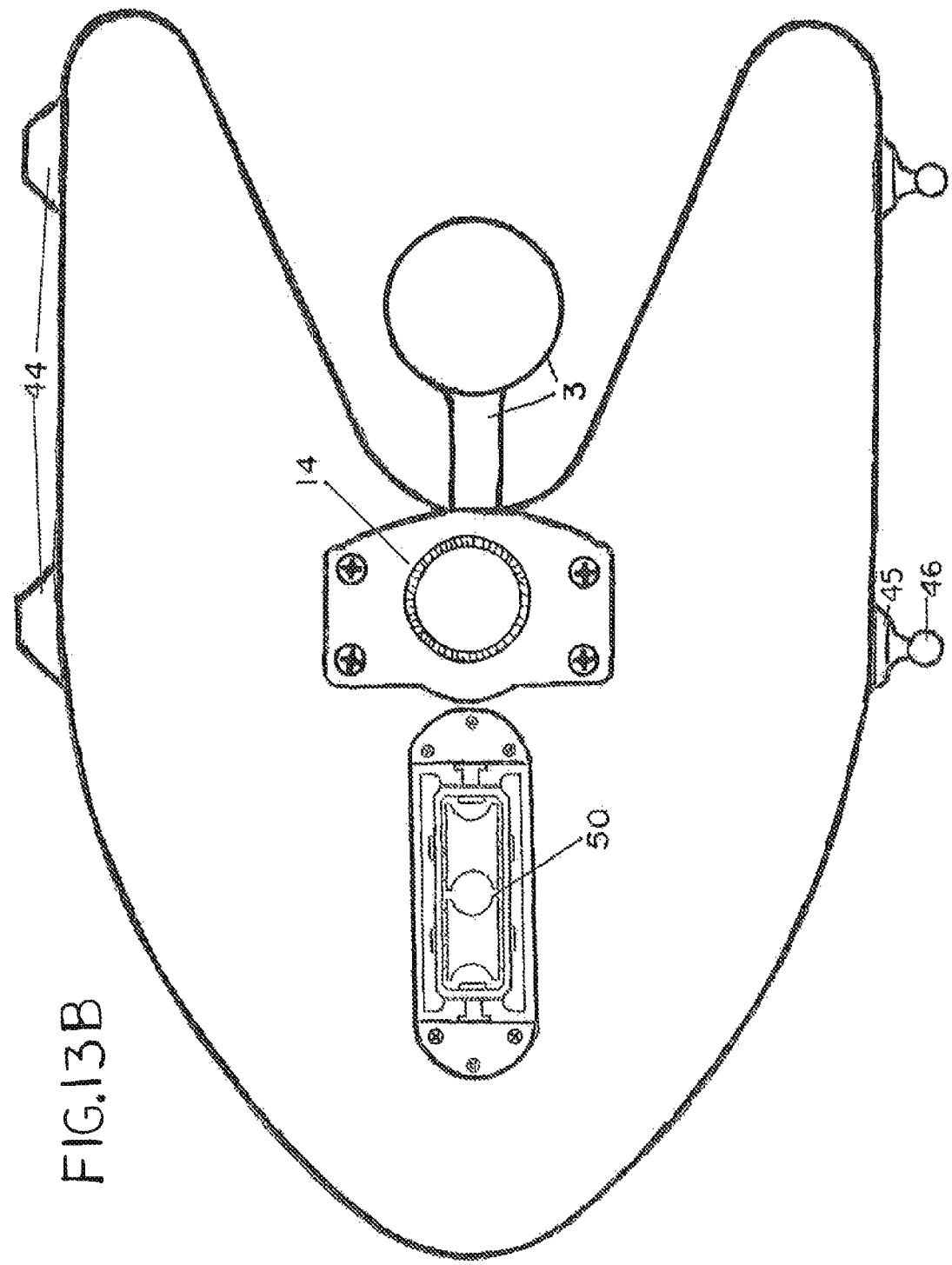
FIG. 13B is a top plan view of an alternative embodiment of a float, height adjustable tube, and related components of the instant invention.
Figure 20:
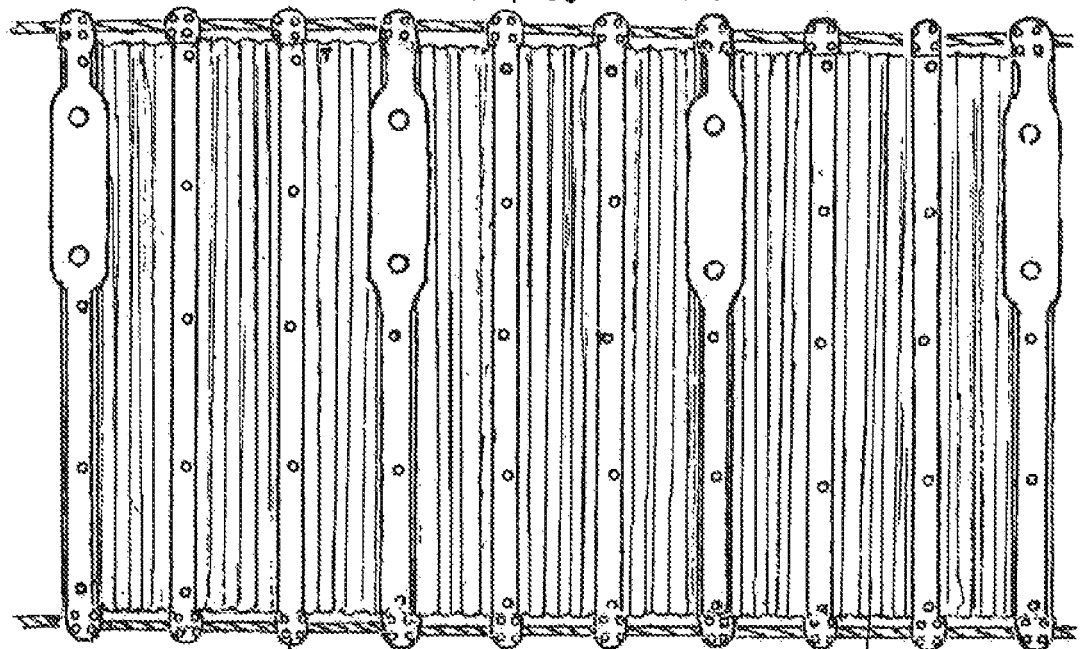
FIG. 20A is front view of the oil containment and deflection boom panels and associated components.
FIG. 20B is rear view of the oil containment and deflection boom panels and associated components.
Figure 20:
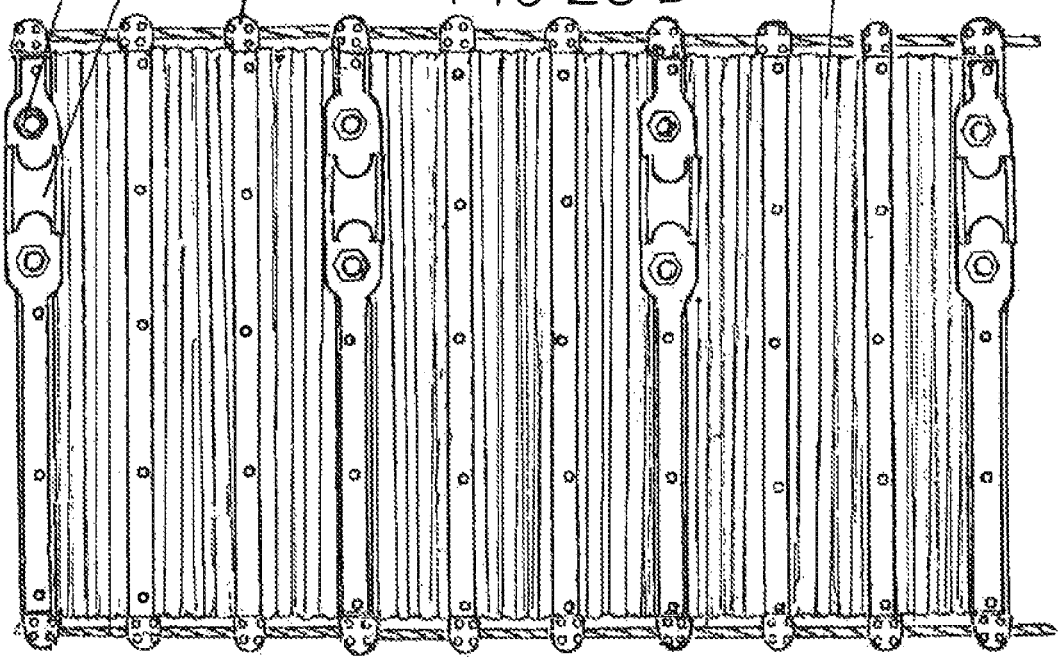
Figure 35A:
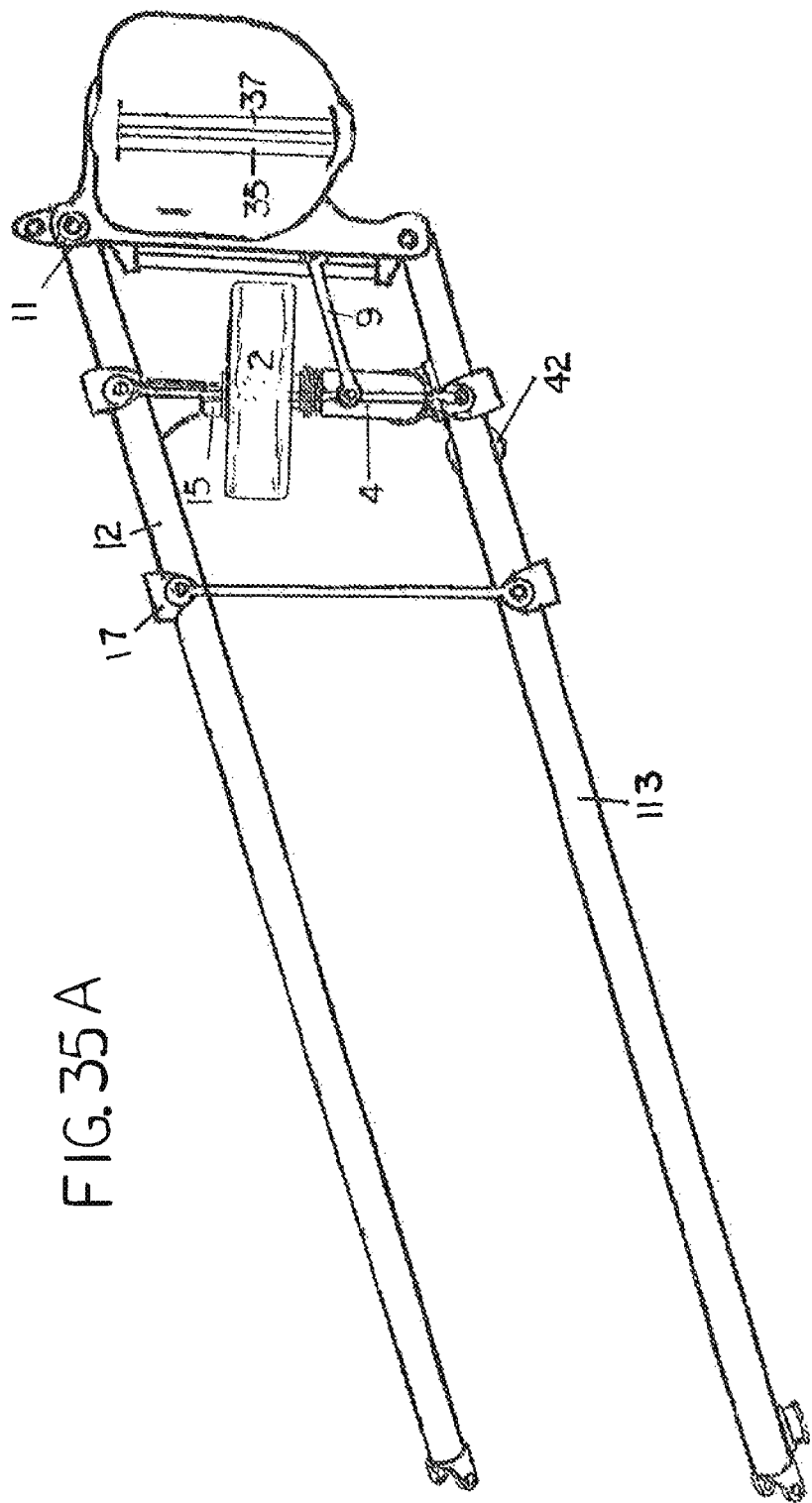
FIG. 35A is an exploded side view perspective of select apparatus of FIG. 34A removed from the vessel, from a forward vantage point.
Figure 35:
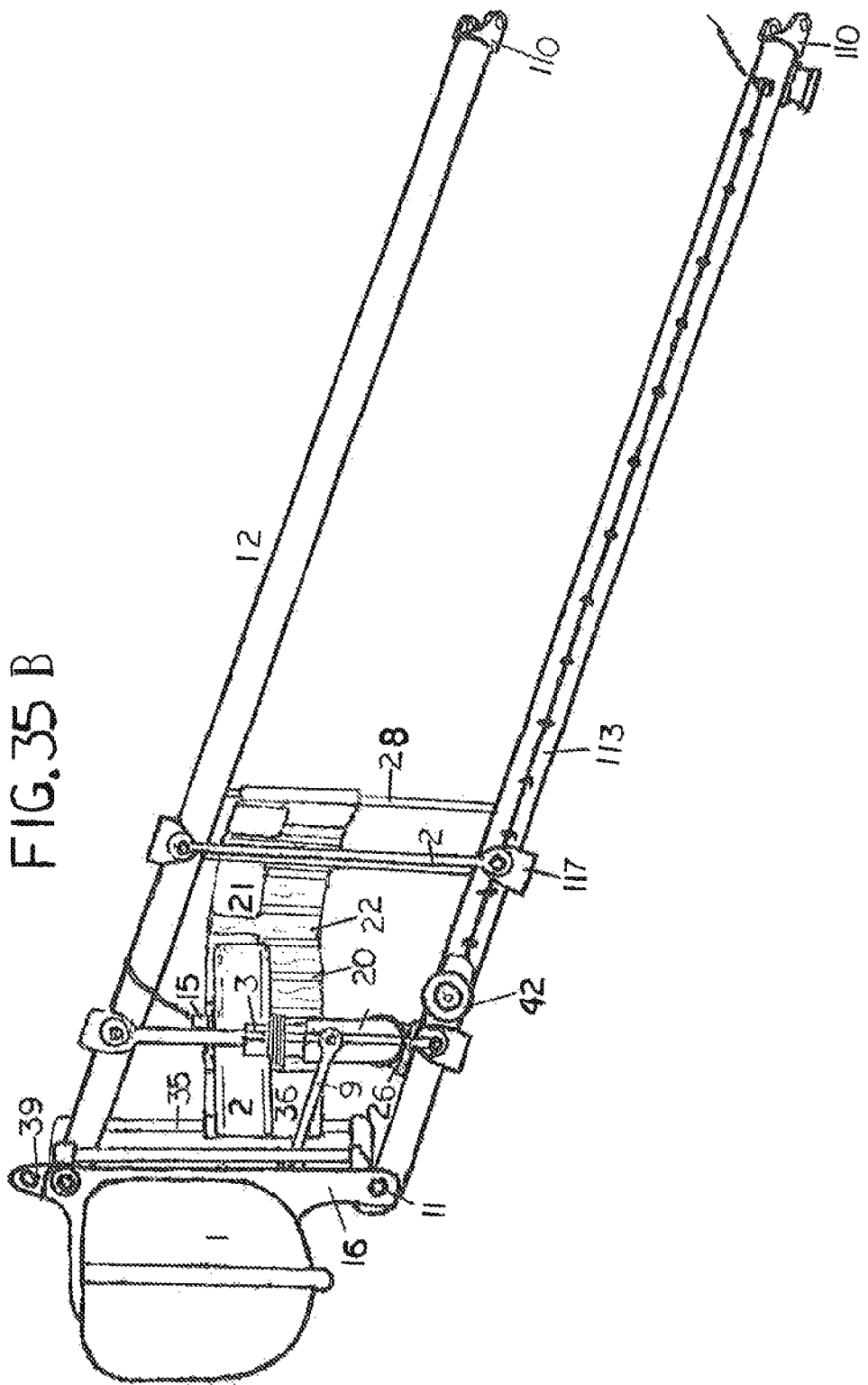
FIG. 35B is an exploded side view perspective of select apparatus of FIG. 34A removed from the vessel, from an aft vantage point.

FIG. 6 is an illustration of the front view of the oil cleanup and recovery device in its first embodiment, with the net assembly and the oil deflection boom removed, so the front portion of the floats 2, as well as the smaller ringed floats 7, that are added to the tops of the additional telescopic tubes when more than one extending or telescopic tube is being employed in the design are visible. Tube housings 4 and their pivoting bases 26, as well as the compression post 38, and the armature 9, that is connected at connection and pivot points, both on the compression post 38, and the tube housings 4, that in turn keep the tube housings and assemblies vertically parallel with the recovery vessel and the main float 1. The armature is also illustrated in FIGS. 7, 35A and 35B, and connects to one or more tube housings 4, to either the compression tubes 38, or the framework 16, that is integral to the main float 1. The connection points of this armature are holes in the armature that fit over rods or pins that would be welded on the sides of compression post 38, or the framework 16, of main float 1, and this armature would be kept on these pins that they would pivot thereon by means of a washer and cotter pin or the like.

Pivot points 11, battens 22, framework 24, drive unit 25, stabilizing cables 27, and rods 28 are also depicted for the assembly.

Toggles or eyes 10 are positioned at the bases of rods that the float and oil containment and deflection panels or booms ride up and down on. The toggles 10 would be the connection points of the rods to framework 17, as well as 12, 13, so they could pivot thereon. Compression post 38 is connected to a side portion of the upper and lower frames as well as by a pin or rod for a pivot.

FIG. 7 is an illustration of the rear view of the oil cleanup and recovery device in its first embodiment, showing the back side of the oil containment boom 20, floats 21 attached thereto, as well as their end panels 35 and rods 35 floats ride on, and the rods or cables 28 that the rest of the oil containment boom ride up and down vertically. Also shown are the blocks seen and described in FIGS. 22B and 22C that attach to floats 21 by means of threaded studs 53 that extend through batten sections 22 seen in FIG. 22D and FIG. 22A This illustration also illustrates tapered tube 30 that carries the oil and water solution to extendable hose 40 and the valve that engages or shuts down the oil cleanup and recovery unit.

Floats 21 are components of the oil containment and oil deflection booms, as illustrated in several FIGS. including FIGS. 3, 7, 8, 21, 22D, 34A, 34B. Floats 21 are mechanically fastened to a number of batten sections, one end of the fasteners attaching pivoting, rotatable blocks with internal sheaves that ride up and down on rods 28, as seen in FIGS. 22B and 22C.

Pivot points 11 or hinges and hinge pins, as seen in the illustrations including FIGS. 6, 35A, 35B, connect top and bottom sections of framework that connect to float and part of framework that rides on tracks on hull of ship; the hinges allow float 1, to traverse the waves.

Framework collars 41 attach to the hose 40 and are equally spaced at intervals that ride in center section of tracks, keeping hose stable and attached to ship's hull.

FIG. 8 depicts a rear view of the oil cleanup and recovery device in its first embodiment, with the oil containment boon removed to attain a view of the floats 2 that carry height adjust the tube section 3 where the oil and water solution initially inter the device. Flexible boot or hose section 34 clamped between the height adjustable tube section 3 and the first telescopic or extending tube in this flexible tube or boot 34 enables the float 2 (shown in FIG. 9 and later FIGS.) and the height adjustable tube section 3 mounted to this float 2 pivot at any angle as it rides over waves while maintaining the mouth of this tube section 3 point of entry at its precise height adjusted level which would be just below the surface of the water at its position of maximum efficiency. This flexible boot or hose would also act as a dampener between these two sections of tubing as well. The back side of the oil deflection booms 20, battens 22 and floats 21 (as seen in FIG. 21) are constructed in the same manor and of the same materials as the oil containment booms; the only real difference would be in their position, use and end attachment points. The oil containment booms are provided to channel and coral the oil back to a point where the height adjustable tube sections 3 can easily draw floating oil by means of surface tension onto these tubes. The oil deflection booms aid in knocking down surface chop as well as deflecting the floating oil and current around to an area between the oil containment booms and the mouths of the height adjustable tube sections 3 where this oil is recovered by means of surface tension and oil corralling.

FIG. 9 depicts the assembly component of this device that actually recovers the oil. Float 2 and height adjustable tube 3 is adjusted by means of a reversible motor and a set of reduction gears 15 that turn threaded rod 8 that is within a threaded receiver of the height adjustable tube 3 that rides in an inner track portion of float 2. Height adjustable tube 3 and float 2 remain at the same angle as the seas at all times by means of the flexible hose or boot section 34 connected to both height adjustable tube 3 and the upper most end portion of a tube 5 (shown FIGS. 11A and 11B); tubes 5 are housed inside the tube housing 4, which pivots in order to remain vertically parallel to the vessel and thus to the seas by means of a pivotable pipe type joint 26 that pivots from side to side. Pipe joint 26 works in conjunction with armature 9 that is pivotally coupled both to this tube housing 4 and a compression post 38 seen in FIG. 6.

FIGS. 10A, 10B, 11A, 11B, 12A and 12B, and components referenced therein, are referenced here together and common components variously described below, and illustrate the internal works of housings for the telescopic tubes that are attached to floats. These tubes initially recover oil and a percentage of water during recovery process, which flow down to the recovery tank, and from there to the oil and water separation process. Water is pumped back over board and recovered oil is pumped into storage tanks. Tubes are illustrated as viewed through tube housing 4, depicting additional progressively smaller tubes 5 are nested one inside the other within housing 4. Housing 4 has a pivotal base 26 as seen in FIGS. 11B, and 12A. The base is employed in the first and second embodiment of this device that work in conjunction with a compression post and pitman arms 81 (shown in FIG. 25L) that maintain the tube housings vertically parallel to the vessels hull at all times.

FIGS. 10A and 10B illustrate a non-pivoting version of the same section of this device that actually recovers the oil as seen in FIG. 9. This non-pivoting component would be employed in an alternative design of this invention. This embodiment of the oil cleanup and recovery apparatus is not required to be pivotable. This is because, in this version of this oil cleanup and recovery device, all of these portions of this device that actually recover the oil, as well as the main floats, would remain vertically parallel to the vessels hull at all times. This is accomplished by means of the positioning of the main pivot joints and pivoting armatures in this embodiment, that are all positioned between the main floats and portion of this device that actually recovers the oil, and the hull as seen in FIGS. 10A and 10B, illustrate the inner workings of the tube housings. Also illustrated is drive motor with reduction gear 15.

FIGS. 11A and 11B are illustrations of two pivoting versions of the portions of this oil cleanup and recovery device that receive the oil having a design with only one extending or telescopic tube housed in tube housing 4. There are two different types of pivoting bases on these two devices. The pivoting base illustrated in FIGS. 11A, pivots by means of a larger flexible boot or hose 34, located between tubes 3 and 5. In embodiment 11A, an alternative control knob 14 is shown for adjustable height.

FIGS. 11A through 12B include hinge mechanisms 44, 45 and 46 as further described below, as well as flexible curtain mounting bases 62 as shown and described in FIGS. 18A and 18C.

FIGS. 12A and 12B illustrations of the portion of the device as seen in the four previous illustrations. FIG. 12A shows this section of the device where the tube housing 4 contains two extending or telescopic tubes 5, and FIG. 12B shows this device housing three tubes 5. FIGS. 11B through 12B also show this device as having a pivoting base 26 and tapered tube 30. Also shown are small ringed floats 7 located on the top of the telescopic tubes 5 and housing 4. The small ringed floats are only added when there are two or more of the telescopic tubes within tube housing 4. These floats make the additional tubes neutrally buoyant. Other illustrations show the tubes that are connected to these floats as only being one tube instead of multiple extending tubes. When only one tube is attached to float 2, there is no need for this tube to be neutrally buoyant in that its buoyancy is compensated by float 2.

Housings 4 that contain telescopic tubes 5 which extend in and out of these housings as floats 2 encounter and travel over waves. These housings contain one or more progressively smaller tubes within. The tubes are the component for recovered oil and a percentage of water to flow to a recovery tank. Seals 65 are located around the perimeter of the lower portions of tubes 5. Just above the seals is ring 64, which is a raised portion integral to the tubes that would extend around the outer surface of tubes 5. Ring 64 would function as a stop, if fully extended, as it would encounter spacers or slides 63. Spacers 63 would work as slides that keep the upper portion of the tubes stable and sliding easily inside the housing and between each of the additional tubes. Slides 63 would come into contact with rings 64 that are integral to a lower portion of the tubes, just above the seals acting as a stop, at its maximum length of extension. Spacer 63 could also be removable for easy assembly and disassembly of this portion of the invention for assemblage and servicing purposes. These spacers/slides would also allow water and oil solution between these tubes to pass through between the slides with no resistance to aid in the smooth, easy insertion and extension of these tubes in nesting configuration. In FIGS. 12A and 12B, where tube housing 4 contains more than one tube, these tubes are shown as having small ringed floats 7 on the tops of each of the additional telescopic tubes. This is to make these additional tubes neutrally buoyant. FIGS. 10A and 12A show the tubes that are connected to these floats are seals 65 located around the perimeters of the lower portions of these tubes. Just above these seals 65, would be ring 64. When only one tube is attached to float 2, there is no need for this tube to be neutrally buoyant in that its buoyancy is compensated by float 2.

With reference to FIGS. 13A through 16B, FIGS. 13A through 14B are various overhead views of float 2 and height adjustable tube 3, and their basic components. FIGS. 15A through 15C depict the mechanism that raises and lowers the height adjustable tube 15, seen in illustrations 15A through 15C.

Floats 2 provides the structure that telescopic tubes are attached to and are height adjusted on, as seen in FIGS. 13A, 13B, 14A and 14B, such that they ride over waves and keep the entry point or opening of the tubes at the proper level, just below water line. As oil flows into the tubes, the oil actually flows over the surface of water, from several feet or more away from tube openings by means of oil corralling and surface tension. The height adjustable upper tube 3 is the initial point of entry of the oil illustrated in FIGS. 15A and C. This tube section is part of an armature that is also part of a threaded member that rides in an inner track or housing located in a section of the float 2, and is height adjustable by means of a threaded rod that threads into a receiving inside member of height adjustable tube 3. By means of turning the threaded rod clockwise and counter clockwise the adjustable intake tube rides up and down in the inner track of float 2. The threaded rod is operated manually or with an electric motor and reduction gear mechanism, illustrated in FIGS. 15A and 15B, that would be controllable on the vessel. As this threaded rod is turned either clockwise or counter clockwise, it height adjusts the combination slide, arm, and initial tube opening 3, the initial point of oil entry, which connects to telescopic tubes 5 (as seen in FIG. 12A), by means of flexible coupling 34. The threaded member is integral to an armature that extends outward from float 2, where it is an integral part of a tube section that is the initial point of entry and recovery of oil and water solution, illustrated in FIG. 15C. FIGS. 14A and 14B also illustrate flexible curtains 67 mount upon bases 62

FIG. 15A depicts alternative knob 14 that turns threaded rod 8 to height adjusts mouth or opening 3 of telescopic tubes 5 to proper level just below water line.

FIG. 15B includes drive motor with reduction gear 15 that turns threaded rod 8 to height adjusts mouth or opening 3, which connects to telescopic tubes 5 by means of flexible coupling 34.

Referring to FIGS. 16A, 16B, 13A through 14A, 22B and 22C, are two different devices that would enable floats 2 to ride or slide up and down cables or rods 28 (as seen in FIG. 7), while maintaining a full range of pivotability, with little or no resistance, and maintaining the floats in proper forward orientation. The first of these devices being a block which houses two sheaves in alignment to each other. The blocks are engineered in a way that allow a pivot from side to side, as well as to pivot fore and aft, while maintaining the sheaves at the exact distance from each other. This is accomplished in two ways. First, the base plate of the block is rotatable by means of a pin similar to a clevis pin with a collar or flat end section on each end thereof, that attach to both the base plate and the block housing 59 together, but not solidly secured to either one or the other, so as to allow block housing 59 to rotate freely on the block base plate. The second pivot point is created by the radiused slots 54 that the sheave axels, as shown in FIG. 22B that is the same type of block with a different type of mounting base. These radiused slots maintain the sheaves at the same distance from each other while allowing the block to pivot on rods 28, without binding or breaking the blocks. The second device offered as a much simpler option is illustrated best in FIGS. 13A and 16B. This alternative is a smooth rounded donut shaped slide 49 with a mounting base 48. The slide would ride or slide up and down on rod or cable 28 as waves are encountered and would maintain full range of pivotability as well as maintaining the float pointing forward when in service. This slide is offered as an alternative because the loads that would be encountered where these are mounted during operation would be much less than loads encountered elsewhere on the device, such as the oil containment or oil deflection booms, and may not require a block assembly.

Rotatable axle 55 or rivet connecting block housing 59 to the block, which enables the block to experience lateral pivoting or rotation.

Also illustrated in FIGS. 11A through 14B are hinge components 44 and 45, which are members of a type of hinge that would connect floats 2 together while enabling them to maintain their ability to pivot in any direction or angle independently of each other. The first component of this hinge 44 are the base track portions of the vertical and horizontal pivotal hinges or rotating flexible joints, seen best in FIGS. 17A through 17E, as well as between FIGS. 14A and 14B, and in 13A, 13B, 12A and 12B, that would be mountable between floats 2, in multiple float applications allowing the floats to remain attached and lineally parallel to each other, but also allowing them to ride over waves independently with these pivoting joints between floats. The hinges or joints would also offer stability to the floats, maintaining them the same distance from each other and help them operate as one unit. The multi-positionable and pivoting hinges consist of two basic components; the first being base inner track 44; the second being a ball and post, as these two components are connected to each other they make up a vertical and horizontal pivoting hinge best seen in FIGS. 17C, 17D, and 17E, as well as FIGS. 14A and 14B, 13A and 13B, and 12A and 12B. The hinge assembly procedure would be as follows: the post of the ball and post portion 45, would be inserted through the back portion of the center slot 44, and attachable to the ball and post base plate 46, by means of a machine screw 47, so that the base track and ball and post assembly would become one unit, with the ball 45 sliding and pivoting inside of the track 44. Two of these would be mounted between each pair of floats spaced in a manner that if the radius in the tracks in base track portions were to continue their arc, they would perfectly intersect the other track's radius as to create a circle, and these would be mounted on a flat side portion of float 2 at that preferred distance apart from each other to do so. This would keep the floats parallel to each other while allowing the floats to pivot fore and aft, as well as pivot from side to side, as well as any combination of thereof.

Referring now to FIG. 16A, block 50 pivots both vertically and horizontally, and sheaves or pulleys 52 are housed in the block, and is of the same basic type of block that is illustrated in FIGS. 22B and C, that mount to the oil containment and deflection booms, the difference being that this block is attached by pivot pins to a block housing and flush mounts instead of on a base plate. All of these blocks pivot or rotate on loosely fitting pins or rivets 55. The two sheaves in these blocks stay parallel to each other and the same distance apart from each other as they pivot back and forth lineally as the tracks for these sheave pins or axles slide in radiused tracks in the block housing that allow these blocks to pivot both lineally and laterally, which allow the sheaves to remain in their precise position as they ride up and down rods 28, such that when the blocks are mounted inside of floats 2 this enables the floats to have a full range of movement when encountering waves.

FIGS. 18A through 18C illustrate another accessory that mounts to, and works in conjunction with, floats 2. Flexible curtains 67 mount upon bases 62 as shown in FIGS. 18B and 18C, as well as between FIGS. 14A and 14B. The flexible curtains and their mounting bases mount between floats 2, in applications where more than one of these floats are deployed. The flexible curtains keep oil and water turbulence from going between floats before it enters openings at top of telescopic tubes and is recovered, and are added to maximize efficiency.

FIGS. 19A through 19D, depict a perspective view of an oil containment and deflection boom panel and associated components, a perspective view of an oil containment and deflection boom panel and associated components, and cover plates, and a top plan view of the end panels of the oil containment and deflection boom panels in conjunction with apparatus of FIG. 16A, respectively. Similarly, FIGS. 20A through 24 and/or the respective structural components have been referenced above and are set forth in the INDEX.

As illustrated in FIGS. 19A through 23C, plastic coated or standard oil containment boom material 20 is compressible and secured between the batten sections 22. The first section is mechanically attached to a cable that runs the length between the two end sections of the oil containment and deflection booms, consisting of panels 36 that the ends of these cables are compressibly and mechanically secured to. The oil containment boom material is secured between the battens with a little bit of extra material between each one to allow panel flexibility as it encounters top to bottom lateral angle movement as the invention rides over waves.

In reference to FIGS. 19A through 22D, battens 22 and material 20 are illustrated. The battens give panels additional vertical rigidity as well as compressibly secure the oil containment boom material between the two sections of these battens as discussed above. Floats 21 are also mechanically fastened through the batten sections by means of threaded studs that extend through both batten sections where these studs additionally extend through the bases of the rotatable, pivotable blocks seen in FIGS. 22B and 22C. The outer most portions of the battens also have a small portion thereof that has a recessed portion in both batten sections that is the same shape of one half of the cable but slightly smaller located at both the top and bottom, which cables would lay in and be secured to the batten, that would mechanically compress the two batten sections around these cables, and would function as a cable clamp as these batten sections are fastened to each other.

Cover plates 51A, 51B are located on the inner portion of oil containment and oil deflection boom panels located at the ends of both the oil deflection and oil boom panels, which are the panels that attach to and ride up and down rods. The cover plates compressibly secure both the cable ends and the oil containment and deflection boom material to the panels. The panels are connected to the cables as well as the end portions of the panel material itself, with the inner most plate having a molded shaped inner section that receives slightly less than one half of each end of the cable with an additional identical cable shaped, molded in the outer surface of the panel, so that as the outer plate 51A is mechanically fastened back into place it compresses and secures each cable like a cable clamp between these two surfaces. An additional removable plate 51B, is also provided on the outermost portion of this plate.

FIG. 23A is a front view of the battens 19 and netting 23 in the oil containment and deflection panels, and associated drive sprockets.

FIG. 23B is an alternative front view of the battens 19 and netting 23 in the oil containment and deflection panels, and associated drive sprockets, in an vertically flexible and offset configuration.

FIG. 23C is an assembly view for the batten shown in FIG. 23D.

FIG. 23D is a view of an individual batten as those utilized in the apparatus of FIG. 23A.

FIGS. 23E and 23F depict component 58 of the chain consisting of two chain links located adjacent to each other on the outer portions of a large portion of a center chain link, the center raised portion of which is inserted through the eye or ring located at both ends of netting batten 19, and mechanically fastened with machine screws therein to an outer collar section 58, such that the eye or ring located on both ends of batten 19 sections is loosely sandwiched between 57, 58. This allows these links and the battens they are connected to, to pivot or raise and lower in relation to each other. Additionally, these outer smaller chain links that are an integral part of 57, that are connected to additional batten sections in succession by means of chain links 61, which enable these batten sections to have free lateral movement between each other. Chain link 61 is a split link. This type of link is two halves of a link that is either penned or welded together, the type of link used to connect two chains together. Ribs 56 are raised areas on the inside portions of the inner and outer batten sections.

Battens 19 consists of two parts; the first having an eye or opening at each end. This eye makes up the center portion of a chain link that is sandwiched between an inner and outer portion that mechanically fastens and is connected to each other through the center portion of this eye. These additional portions make up a pivotable chain link that work in conjunction with sprockets located on the upper and lower parts of the inner spool. The chain links are connected to each other by means of additional smaller links, so all of these battens 19, once connected create a flexible chain around the upper and lower perimeters of the netting assembly that are driven by these sprockets. These battens consist of two parts that are mechanically fastened to each other by means of machine screws that extend through one batten portion and are threaded into threaded holes in the other batten portion so that the first part that compressibly fastens the netting material between both sections of batten. Battens 19 also have slightly raised areas or ridges running lineally on their inner portions that aid in compressing and securing the netting material to the battens.

Referring to FIG. 24, holes 6 depicted in tracks and framework that can be pinned and lock invention to tracks once invention is height adjusted. The entire invention is height adjustable on these tracks so as the ship fills up full of oil and lowers in the water, the apparatus can be raised to the proper height in accordance to achieve maximum efficiency. The equipment would be raised and lowered on this track by means of the ship's crane, electric chain fall or other type lift that would be connected to the lifting rings on the top inner portion of framework 24, and be raised and lowered from a point of attachment for the lift directly above these eyes on the upper portion of the track platform. Lifting pad eyes 39 are shown adjacent pivot points 11. Framework 24, drive unit 25 and tracks 60 are depicted once again.

Referring now to FIGS. 25A through 25M, drive unit 25 (as shown in FIG. 6) is illustrated for the rotating, self-cleaning net previously described. The drive unit operates the netting that extends laterally between the drive unit mechanically fastened to the framework 24, and the main float 1, on a continuous loop. The drive unit is powered either electrically or hydraulically, rotates and cleans net 23, and powers both drive motor that rotates the main spool members 71, 72, as well as sprockets 75. This action rotates net 23 on a continuous loop. There is an inflatable cylinder similar to a boat fender that rotates on an axle that extends through the center portion of the cylinder. The cylinder spans between the upper and lower inner portions of the drive unit housing 68, and spring hydraulic cylinders, much like non-ferrous automotive shock absorbers that would apply continuous pressure up against the inner portion of the net, maintaining net and chain tension at all times for the smooth operation of this device. Additionally, shields or panels 73, 74 are provided that seal oil from escaping around drive unit 25 during the oil recovery process. Shields or panels 73, 74 extend the length between the top and bottom of spools 71, 72. Panels 73, 74 are an integral part of a rod that extends through holes in the drive unit spool housing 68, on an upper and lower side end portions thereof, making up the pivot points of the panels, located directly beside the pivot point for the inner panel 73. An additional rod 35 (as shown in FIG. 5) extends through the length of the inner span of the spool housing of this netting drive unit 68, and attaches to the outer portion thereof. Oil containment boom panel 36 rides up and down on rod 35, and is positioned at a close tolerance to the back outer portion of the pivot point of panel 73, so that the back outer rounded portion of oil containment boom panel 36 creates a relatively tight seal between oil containment boom panel 36 and panel 73. Panels 73, 74 have neoprene seals on the outer portions thereof. The panels compressibly seal net 23 up against the outer perimeter of the spools 71, 72 by means of cylinders 76 that operate the panels. Cylinders 76 are also powered either electrically or hydraulically. The cylinders are located on the outer portions of spool housing 68 that are opened and closed. The panels seal between the outer portions of both the inner and outer perimeters of the spool. All of the controls for both this sealing process of the drive unit as well as all of the other electrical or hydraulic controls, such as valve controls and intake height adjusting controls, etc., would be controllable with controls all centrally located on a control panel. The control panel would be located on the vessel where these controls would be connected during the installation process of the invention to the side of the vessel by means of an electrical harness and/or mechanisms with hydraulic lines. The operation of this device that rotates and cleans the net 23, would be accomplished by opening the panels 73, 74, at the control panel that would accomplish two functions: first, it would allow the net to turn freely on the spool; and second, as panel 73 is opened and the seal is released, a brush that also runs the length of the panel is engaged. The brush is mechanically fastened on the outer portion of a secondary panel that is an integral part of the first panel. The brush on the secondary panel lays up against the netting, and seals oil from passing through the device during the cleaning operation, as well as brushing off all of the floating debris, sargasso weed, or other debris that could be stuck to the net that would hinder the smooth operation of the invention. The debris is removed from the netting and dumped behind the invention during this process. When the panels are pulled back, with the cylinder drive units 76, the drive unit is once again completely sealed from any oil that could escape around it.

Figure 25:
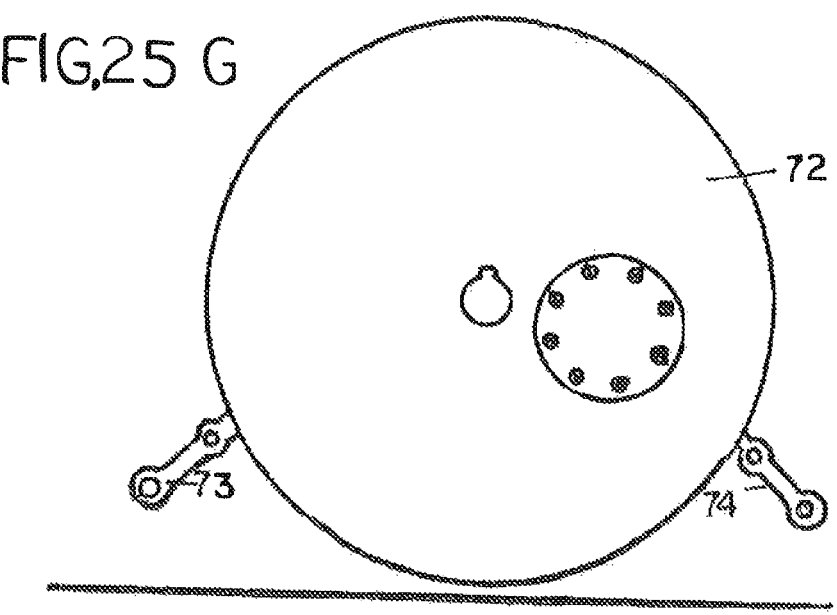
FIG. 25A is a perspective view of a drive unit housing for the rotating, self-cleaning net of the instant invention.
FIG. 25B is a perspective view of an axle for the netting drive unit spool, and the inner keys for the axle shaft, of the instant invention.
FIG. 25C is a top plan view of a main net spool along with the respective shields or panels of the instant invention.
FIG. 25D is an exploded view of the components shown in FIG. 25C.
FIG. 25E is a top plan view, and associated perspective component view, of the main spool of the instant invention.
FIG. 25F is a top plan view of a sprocket and sprocket assembly for the main spool of the instant invention.
FIG. 25G is an alternative view of the apparatus shown in FIGS. 25E and 25F.
FIG. 25H is an end view of the apparatus shown in FIG. 25A.
FIG. 25I is a view of the apparatus shown in FIG. 25F, as installed in the drive unit housing of FIGS. 25A and 25H.
FIG. 25J is a side view of the hydraulic ram, main drive sprocket and chain assembly within the drive unit of the instant invention.
FIG. 25K is an alternative view of the apparatus shown in FIG. 25J, along with an associated tensioning member.
FIG. 25L is an alternative view of the apparatus shown in FIG. 25K, along with associated tensioning components.
FIG. 25M is a perspective view of a tubular cushion and axle for the netting assembly of the instant invention.
Figure 25:
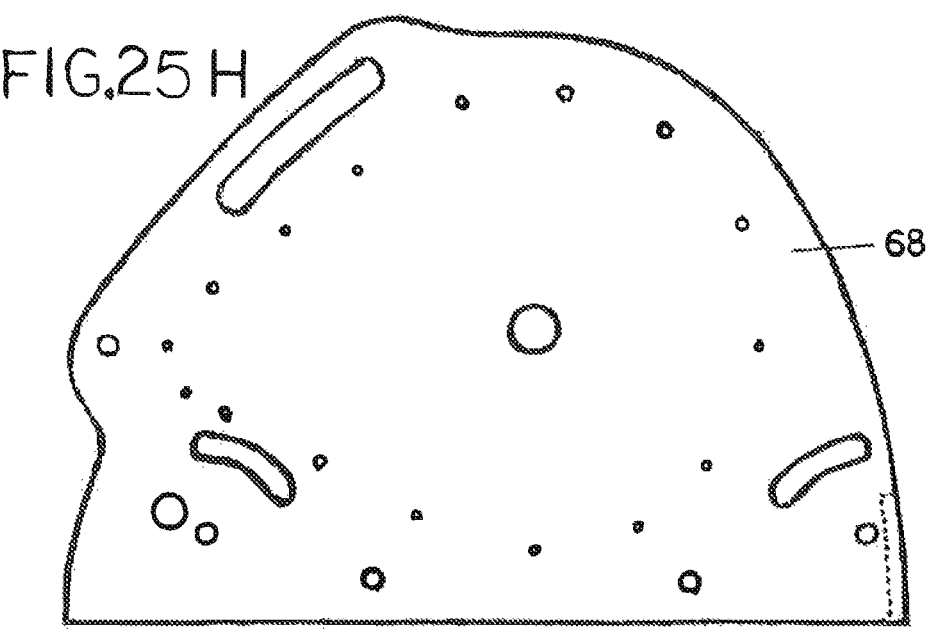
Figure 25:
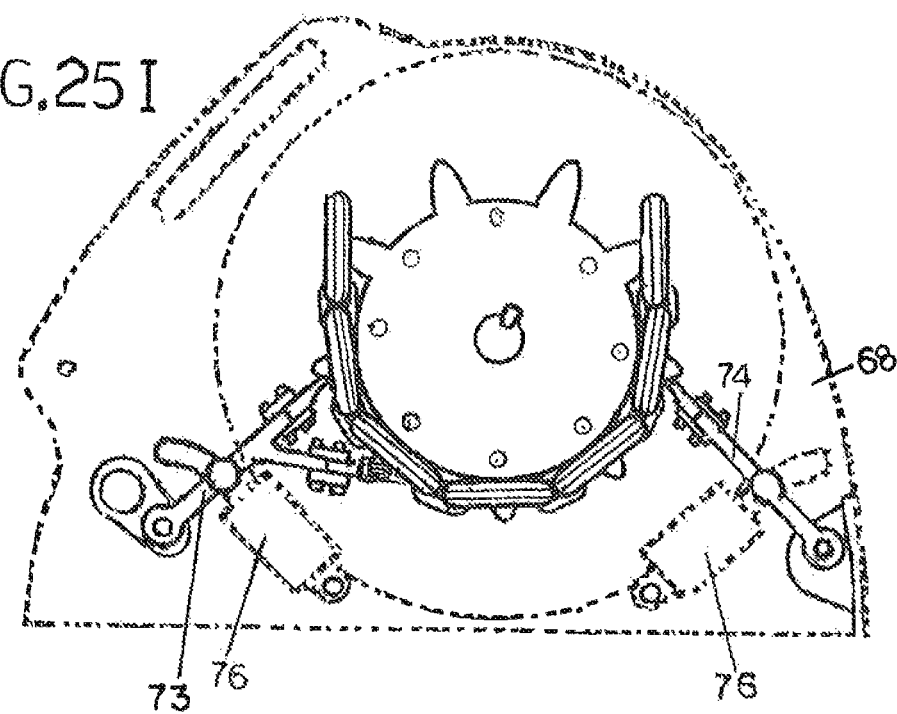
Figure 25:
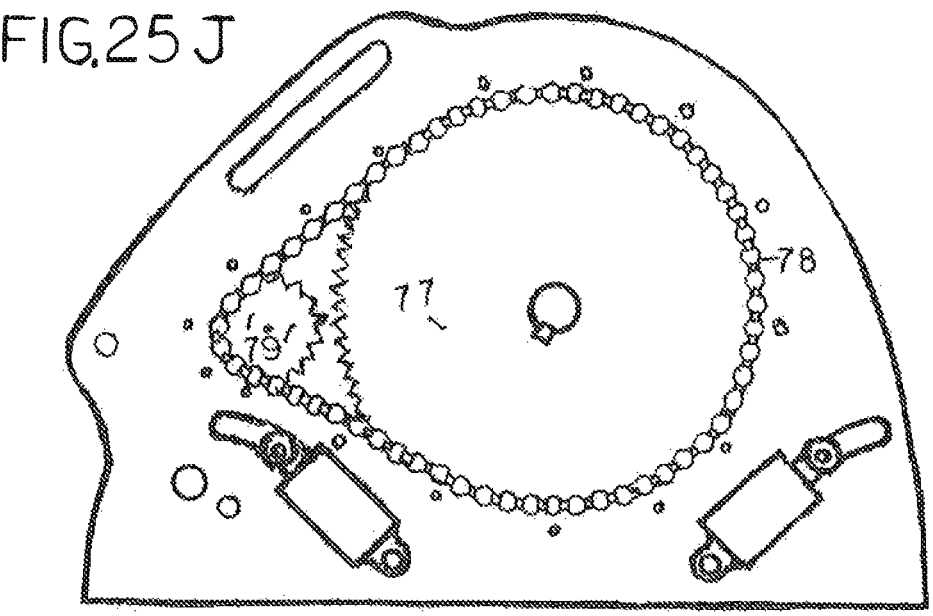

With reference to FIG. 25A and FIG. 25H, netting drive unit spool housing 68 mounts all of the components of netting drive unit 25.

Main axle 69 for the netting drive unit spool is seen in FIG. 25B. An additional shaft 69 would be the axle that the outer spool rides on, within spool housing 32.

Keys 70, set forth in FIG. 25B, are inset into the spool axle shaft such that one-half of the thickness is inset into axle shafts 69, and the other half being inset into spools 71, 72, as well as drive sprockets 75. The smaller key would lock sprocket 77 to spool axle 69.

FIGS. 25C and E 25F illustrate inner center portion 71 of netting spool that mechanically fastens to the outer or upper portions of the spool 72.

FIG. 25E depicts upper or outer sections 72 of the netting spool. The outer or top surfaces thereof have a removable inspection plate that is used to access the inner portion of upper or outer spool section 72, and mechanically fasten upper spool portion 72 by means of bolts or machine screws. They would extend through the inside inner portion of the upper spool section 72, and additionally through holes in the surface around the inner perimeter of sprockets 75, to be threaded and secured into threaded holes on the inner perimeter of the top portion of spool 71.

FIGS. 25C and 25D reference panels 73, 74, which extend the entire length between the inner fascia portions of spool drive unit housing 68, where a threaded hole at the base of these panels is fastened by means of a bolt with a smooth upper surface, that fastens to and secures the panels in place. The bolt, being the pivot point of these panels from their point of attachment. Extending inward is an additional threaded hole that becomes the point of attachment as well as the pivot point for the extending arms of electrical or hydraulic drive units 76. From this point, these arms extend inward at an angle parallel to the inner mitered portion of the upper portion of the spool assembly 72, where, at a point, panels 73, 74 angle back horizontally to where an end portion of these panels engage the outer surface of the inner section of the spool assembly, where a neoprene seal compressibly seals the netting between the outer portion of the inner spool assembly 71. The seal is a removable end portion of panels 73, 74 that are mechanically fastened between two plates, with machine screws, through the end portion of panels 73, 74, as well as the side portions of the seals. The panels are used to seal the oil from escaping around the back portion of the spool housing and spool assembly during oil recovery process and are mechanically operated by means of two hydraulic or electric ram-type drive units 76, which are used to pivot these panels in and out of their opened and sealed positions, and are also used to maintain the seal during the rotation and cleaning of the net assembly. The process includes the two arms being opened up by means of ram-type drive unit 76. The panel arm 73, has an additional side panel that is an integral part of panel 73. The side panel angles off at a particular angle to where a brush extending the length of this panel engages the net and the outer portions of the inner section of the spool assembly, where the brush portion reseals, as well as brushes off any debris stuck to the net that could possibly escape back into the inner portions of the net assembly between the outer portions of panel 73, between the spool assembly and framework 24, and in turn escapes by drifting off behind the vessel. Once the netting has been rotated one half of a complete rotation with the clean inner portion of the netting on the outside and the cleaned outer portion of the netting back on the inside. As mentioned, the panels are pulled back with these electric or hydraulic rams 76 into their sealed position. All of this process taking place while the vessel is underway, without slowing down or hindering the oil recovery process.

Turning now to FIG. 25F, drive sprockets 75 are illustrated. The drive sprockets are mechanically fastened between the upper and lower spool portions 71, 72. The teeth on the sprockets are round at the base and tapered out, to a rounded point. The teeth engage the pivotable large center chain links, made up by sections 57, 58, and smaller link 61 as seen in FIGS. 25C, 23E and 23F, so that as the large chain links on the ends of the battened portions of the net assembly is pulled up into the tapered portion of the inner spool, it engages the rounded narrow end portion of the sprocket teeth. As the spool is rotated, the chain links are pulled down these tapered rounded teeth on the sprocket, that when fully engaged they are centered thereon, and in the precise position for the teeth to engage the next round chain link as it slides up into position on the tapered inner portion of the upper spool section 72. No matter what angle the netting enters this drive unit, it always engages the teeth on the sprocket in the same manner, without disengaging or fouling in any way.

FIGS. 25J, 25K, and 25L depict electrical or hydraulic rams 76. The rams are connected to the outer portion of the netting drive unit spool housing 68, by means of a bolt or pin that extends through the outer portion of this ram and is mechanically fastened to the outer portion of the netting drive unit spool housing 68, where the ram is pivotable thereon. On the end of the extendable ram portion is an additional eye that extends through the outer skin of netting drive unit spool housing 68, where the ram is connected to a threaded end portion of panels 73, 74, which is both the pivot point and the connection point of the ram arm of 76. Rams 76 are mounted on both the upper and lower outside portions of this hydraulic netting drive unit spool housing 68, and are connected to both the upper and lower sides of panels 73, 74 where they both operate in conjunction with one another.

With reference to FIG. 25J, main drive sprocket or crown sprocket 77 is illustrated. and fastened to an outer portion of the main axle 69. The sprocket is attached by means of the small key section seen in FIG. 25B, as well as set screws that extend through the inner collet section of this sprocket, that engage a portion of axle 69. Chain 78 extends around the larger sprocket 77, and an outer portion of a smaller sprocket 79. This chain connects the main drive sprocket to a smaller sprocket 79 that would be fastened to the shaft on the electric or hydraulic drive motor that rotates the spool, which in turn rotates the netting section. Smaller pinion sprocket 79 is attached to the electric or hydraulic drive motor.

Turning now to FIGS. 25K, 25L and 25M, sprocket and chain cover 80 mechanically fastens to an outer portion of the netting drive unit spool housing 68. This cover has a hole therein that the end portion of shaft 69 extends through. Pitman arms 81 work in conjunction with tensioning device 84, as well as high density foam or air filled pressure applying device 83A, 83B. These three components work in conjunction with each other to maintain tension to the netting assembly as well as the chain links 57, 58, located on the outer perimeters of this netting assembly so that these outer chain links properly slide up inside the mitered inner portion of the spool assembles 72, and are brought into alignment to the teeth on the sprockets 75, in that a minimum amount of tension needs to be maintained at all times to this netting assembly to insure that everything functions properly in heavy seas.

Inflatable or high density compressible foam tubular cushion 83A is enclosed on each end and would contain a long tube in the center incorporated into its design where an axle 83B would be housed therein. Components 81, 82 of a Pitman arm, with one end thereof connected to the end portion of main axle of the netting drive unit 69, by means of bearing 82, that is attached to and pivots on the end of this axle 69, by means of the bearing that is mechanically fastened at the base of these Pitman arms by means of counter sunk set screws. Set screws extend through the threaded upper portion of the collet of a cheek bearing and are compressibly secured to shaft 69. The bearing is fastened to the Pitman arms by means of machine screws that thread into threaded holes at the base of these Pitman arms. The other end of the arm is rotatably attached to the end of shaft 83B, by means of a bolt with a smooth upper portion there of this bolt would extend through a fender washer then through the end portion of the Pitman arm with a bearing surface located therein. The bolt would extend through an additional fender washer or spacer and additionally through a bearing surface located in the outer most portion of a tensioning device, then threaded into the threaded ends of this axle 83 to a point where these bolts would reach the end of their threaded portion with only their smooth upper portions extended through the bearings surface at a point where the bolt would still turn freely inside these bearings, where these bolts would be set in thread lock. These tension applying devices could include gas filled or other type of shock absorbers like those used in the automotive industry that would either be made out of nonferrous metals such as stainless steel, or be regularly changed because of the highly corrosive environment that they would be operating in.

Figure 26B:
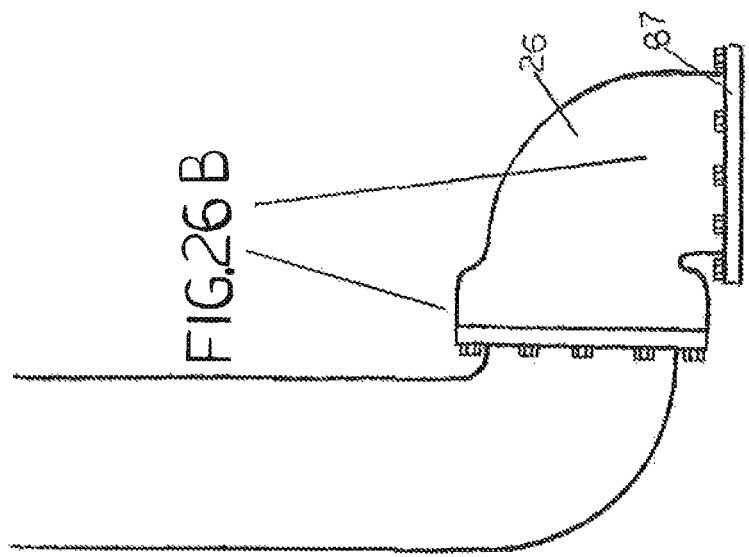
FIG. 26B is an alternative embodiment of the apparatus shown in FIG. 26A.
Figure 26A:
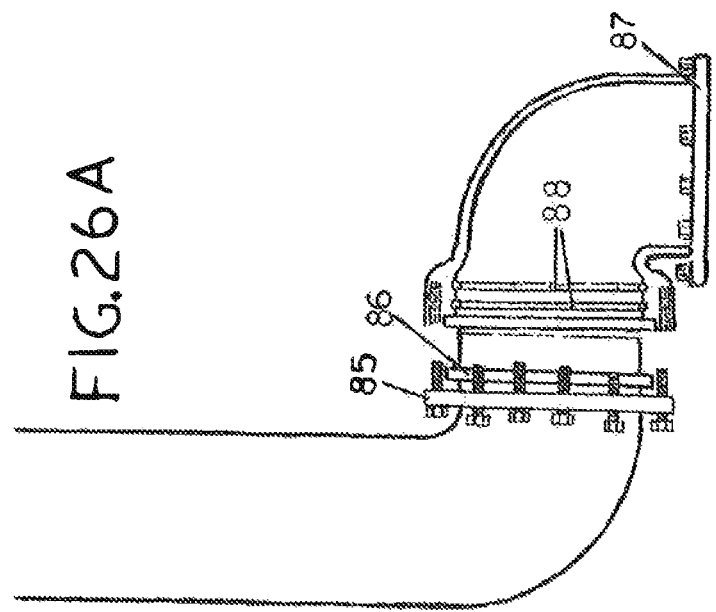
FIG. 26A is a side view of a pivoting or rotating pipe joint utilized in the platform and frame member for collecting oil and water in the oil clean-up and recovery process of the instant invention.

FIGS. 26A and 26B depict pivotable or rotatable pipe joint 26 consisting of three main components, the first part being a 90 degree pipe joint that mechanically fastens and couples to a second part, an additional 90 degree pipe joint. These joints are coupled together by means of a separate removable pipe flange that fits over the outer surface of the first part and rests up against a ridge 86, that is part of and extends out around the outer perimeter of this pipe section several inches from the end thereof. The end section is inserted inside the bell or end section of the second 90 degree pipe joint which internally houses one or more O-rings or cup seals 88, that are housed in grooves in the inner portion of this bell that compressibly seals around the outer perimeter of the end portion of the first pipe joint that is inserted into this bell, which is long enough to be inserted past all of the O ring or cup seals 88 but not bottom out in the bell section, so they turn freely in each other once the two sections are mechanically coupled together by means of the flange 85, that is mechanically fastened into the bell of the second section. The outer perimeter of the first part of this joint that is inserted into the bell would be polished to a very smooth surface and the bell section between these O rings or cup seals 88 could also have a Zerk fitting where grease or other lubricant could be injected for lubrication purposes. This same type of joint would be used both in the bases 4, which is the housing for the telescopic tubes 5 as previously described. When this pivotable or rotatable joint is used as the base portion of 4, this joint would have an additional flange that is an integral part of this belled base joint 87, located on the other end of the 90 degree joint that would be sealed by means of a gasket and/or sealant and would be mechanically fastened by means of bolts or machine screws that would be threaded into a threaded collet that would be welded to the upper portion of the platform 31, in this inventions first embodiment, directly over and around a hole, cut through the platform 31. This allows recovered oil passing through this coupling to enter the tapered tube 30, integral part of the bottom of platform 31 as shown in FIG. 3.

This same pivotable fluid joint is used in the second embodiment of this invention and is attached basically the same way, in that this integral flange at the base of this pivotable pipe joint would be attached to a matching flange that would be a welded integral part of the lower frame of the structure, that doubles as the tube that the oil and water mixture runs through during the oil recovery and cleanup process.

The pivotable pipe joints are used in an alternative embodiment, but in a completely different manner in that the telescopic tube housings 4, have no need to, and do not pivot at the base, in that the framework in this third embodiment of this invention is engineered in a way that tube housing 4 would remain vertical to the vessels transom at all times and in all seas, but the joints are actually used at least four times in this embodiment of the invention. One joint in perfect alignment with each pivot joints of the framework section located between the section of framework that attaches to the transom and houses the receiver tank, and the portion of the framework that houses the main, and the rest of this embodiment of the invention. The first two pivoting joints, being in the line that carries the oil and water solution between the float 2, and either tank 139 shown in FIG. 4, or the pump that pumps this solution into the separating tank located inside the vessel's hull. The other two pivoting joints 26 described in reference to FIG. 9, would be in the line that transfers the separated water from the oil and dumps it behind the invention, back into the sea, in this design of this invention.

Figure 27:
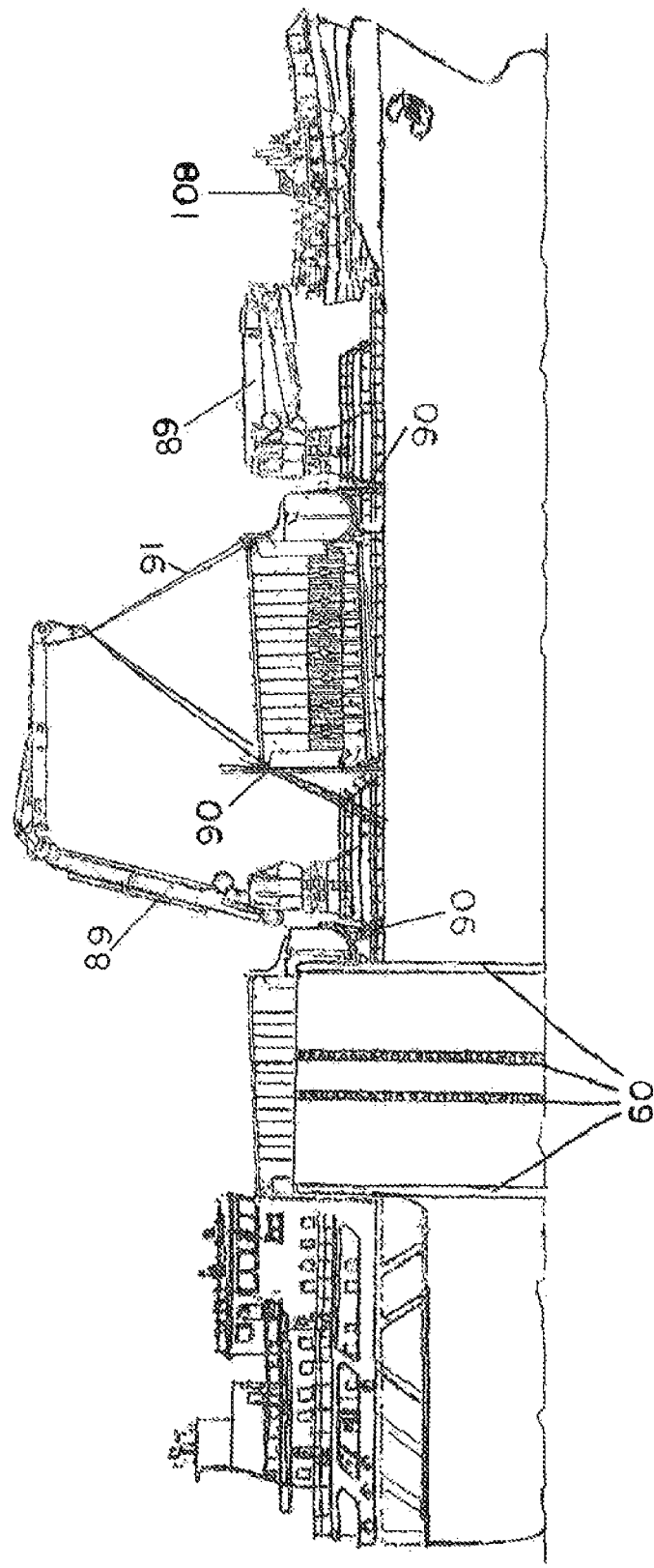
FIG. 27 is a side view of a marine vessel preparing for the oil clean-up and recovery process of the instant invention.

FIG. 27 is an illustration of a side view from the starboard side of a larger oil clean up and recovery the vessel as it initially arrives to oil spill and clean up area. This is the beginning process of the mounting and installation of the oil clean up and recovery equipment onto the tracks 60 located just aft of mid-ship both on port and starboard side of the vessel. This is the location where the base of the aforementioned framework 24 is mounted on tracks 60. The oil containment boats 108, as well as oil containment booms, are lowered into the water by the forward hydraulic crane or lift 89. Cables 91 connect to eye pads located at various lifting points as desired. Cradles and storage mounting brackets 90 are stored on deck of the oil tanker, when not in service or in route to an oil spill.

Figure 28:
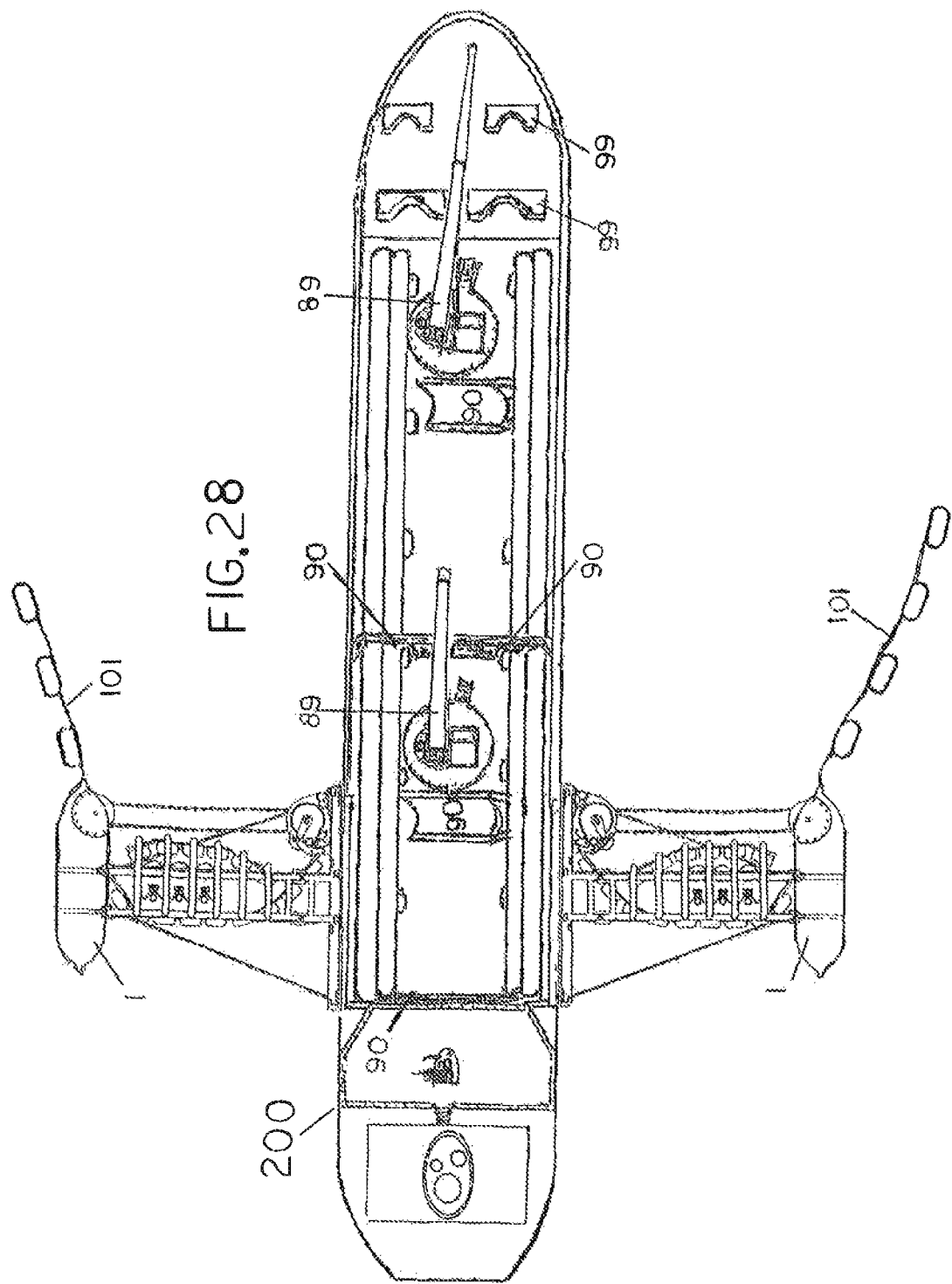
FIG. 28 is a top plan view of a large tanker utilizing the oil clean-up and recovery equipment of the instant invention.

FIG. 28 is an overhead view of FIG. 27 with the larger oil recovery and clean up vessel 200, with the oil clean up and recovery equipment mounted on each side of the vessel and put into operation. Oil containment booms 101 are extending out and to each side of the vessel to collect and channel the floating oil by means of forward motion of the vessel and oil containment boom tow boats, to its very-aft portion where the oil is recovered by the oil containment and recovery equipment. Cradles 99 store oil containment boom towing boats, and are stored on the main deck of the vessel when not in use or when in transit to an oil spill.

Figure 29:
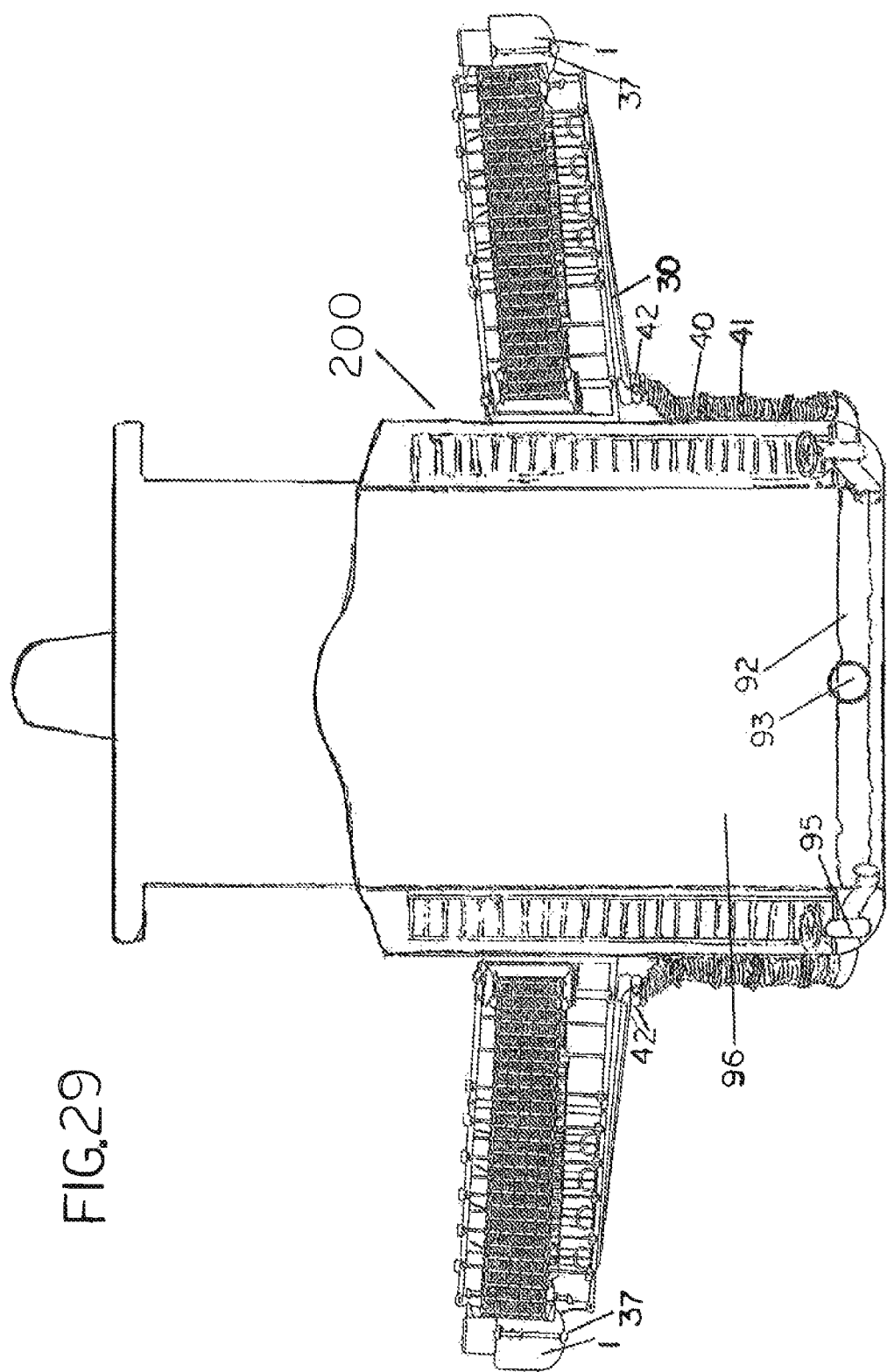
FIG. 29 is a front view of a large tanker utilizing the oil clean-up and recovery equipment of the instant invention, and illustrating the recovery boom on the starboard and port sides of the vessel.

FIG. 29 is a front view of the larger vessel with the oil clean up and recovery equipment mounted and in operation on each side of the vessel 200. Rods 37, extendable hose 40, collars 41, collection tank 92, pickup pipe 93, and oil collection tank 96 are shown. Floats 1 traverse waves and maintain the equipment at the proper water level for the equipment to operate in a full range of use. This s illustrated as if you could see through the forward portions of this vessel to view the initial oil recovery tank located in the lower portion of the hull where valves 95 are located. The valves allow the intakes of this tank to be opened or closed for operation. Additional electric or hydraulic valve 42 located at the base of tapered tube 30 allows floating oil to build up to a mill thickness floating on top of the water where oil to water concentrations would be recovered at a higher percentage of oil to water recovery, or to put these oil recovery and clean up equipment in and out of operation, when oil is present.

Figure 30:
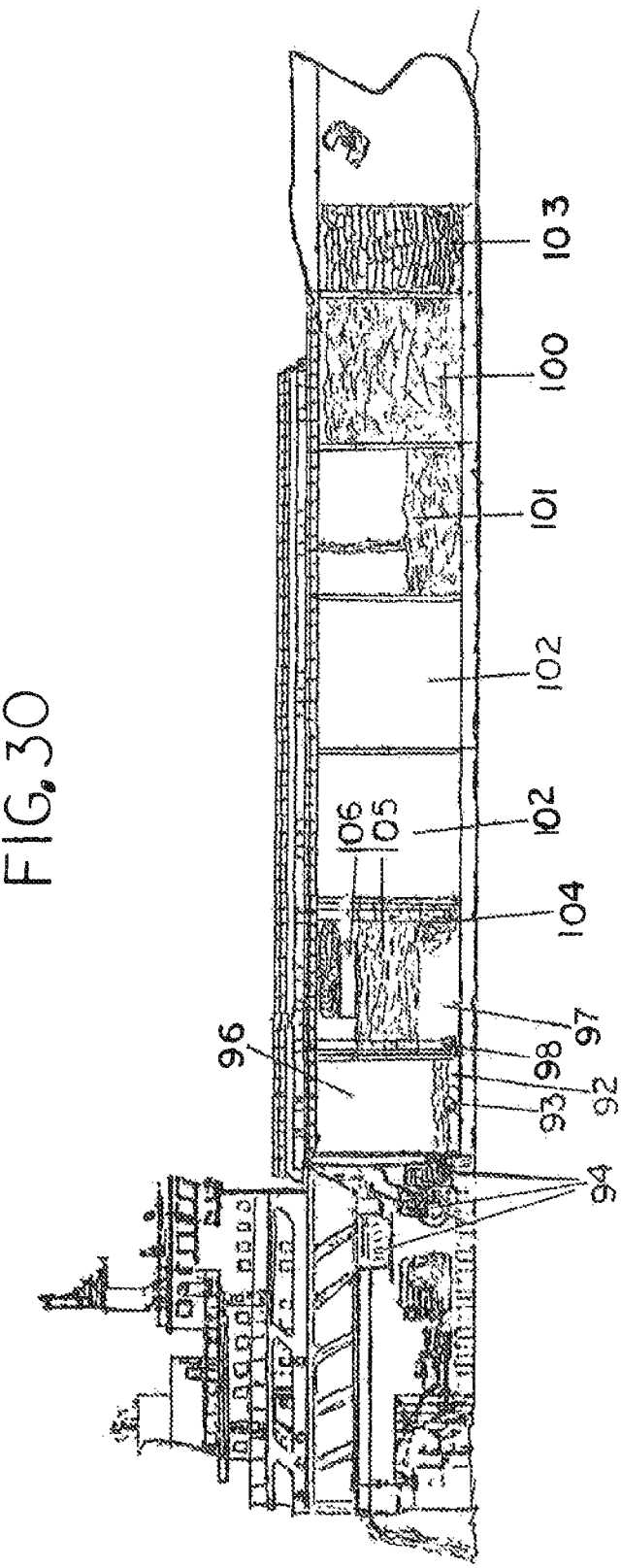
FIG. 30 is a side view of a large tanker utilizing the oil clean-up and recovery equipment of the instant invention, and illustrating recovery, collection, and separation tanks of the vessel.

FIG. 30 is a side view of the larger oil recovery and clean up vessel shown in FIG. 29, as if the hull was transparent to depict the inner workings of the boat. Collection tank 96 is where the oil first enters the hull before the oil and water is separated. From this point, the water is pumped into tank 97, which would be the oil and water separation tank. The oil and water would be pumped into tank 97 through conduit 104, where oil 105 and percentage of water initially enters oil separation tank with oil and water being hydroponic to each other as well as oil being much lighter than water, the oil and water separation process is accomplished by means of gravitational separation with the oil floating to the top of the tank. The oil would be pumped into the various storage tanks in the vessel and pulled off the surface of the water by means of a pickup consisting of a tube mounted on float 106, and mounted in a position with the end just below the surface of the oil, where the float would maintain this pick up at the very top of the tank where the oil would be located. Another pick up would be located at the very bottom of this tank and is illustrated as pick up tube 98 where the water would be pumped out of the bottom of this tank and returned to the sea, either out of the stern of the vessel or out of an outlet in the forward part of a vessel, so that the possibility of any residual oil in the water would simply go back through the oil clean up and recovery process. This oil separation tank would be equipped with various types of equipment to completely automate this process. This includes such as oil thickness probes that would be mounted on the float 106, that would be connected to time delay pump relays that engage and disengage the pumps that pump the oil into the storage tanks, as well as sensors that detect oil and water that would also send the signal to pump relays that would engage and disengage pumps to remove the water from the bottom portion of the oil separation tank and returned overboard. This process could be automated or accomplished by means of all of the monitors to these various types of oil depth and concentration probes and water detectors, as well as the controls to all the valves that would direct the oil into the various storage tanks being monitored and operated from a control room below decks. Oil containment booms 103 could be stored in a separate compartment below deck. Separated oil 100 is stored in one of the various storage tanks in the hull of the vessel. Oil storage tanks 101 are being filled with freshly separated oil, and empty tanks 102 are waiting to be filled. Also shown are pumps, lines in equipment 94, used to pump the oil into the various tanks, as well as the water back overboard.

This same process would be accomplished in the hull of the smaller recover vessel, as illustrated in FIGS. 31 through 36D, on a smaller scale, where the controls, gauges, sensors, etc., could either be located on the bridge of the vessel or a control station at deck level where to be monitored and controlled or automated in the same manner as could be done in the larger vessel.

Figure 31:
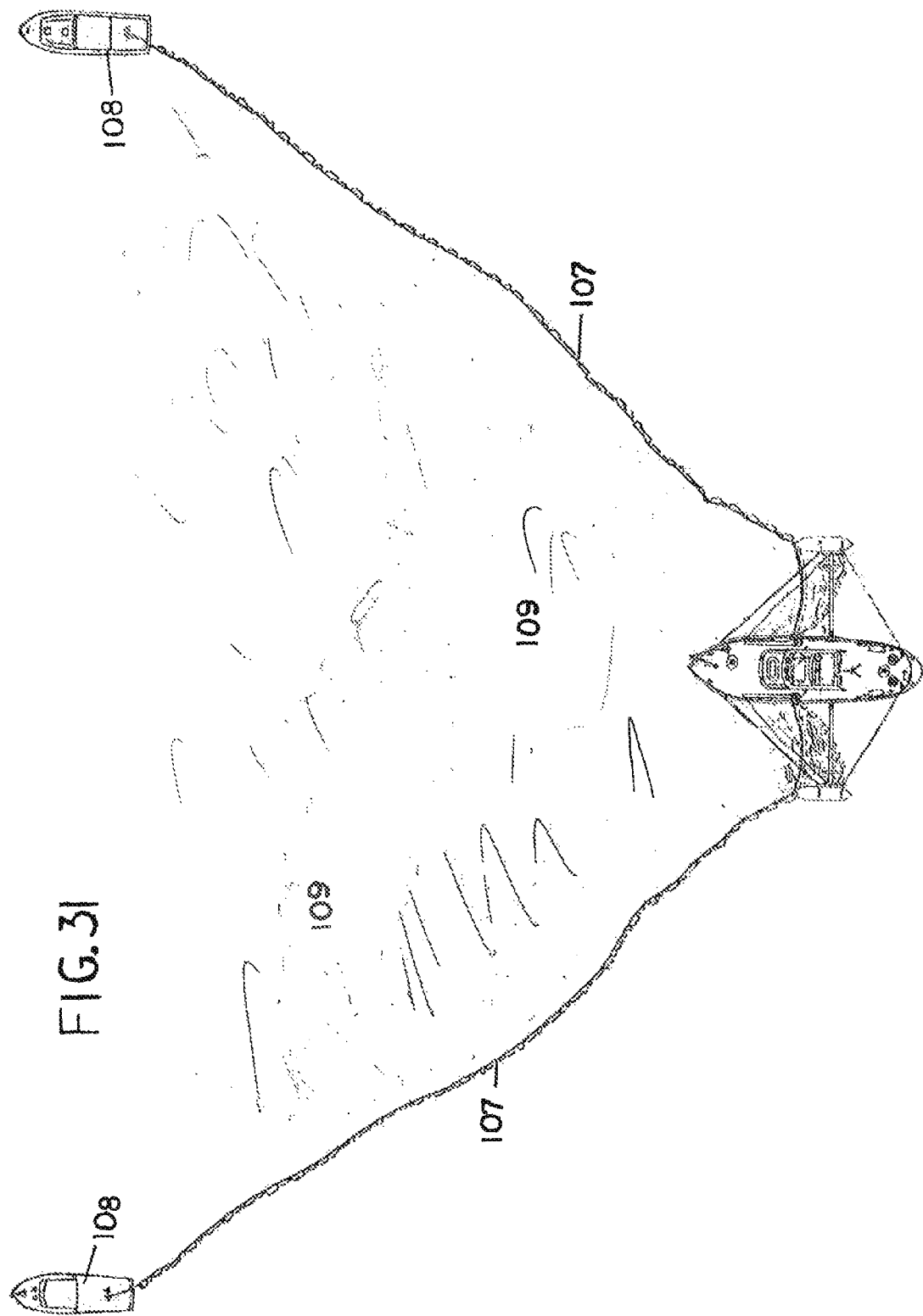
FIG. 31 is a top plan view of a smaller vessel utilizing the oil clean-up and recovery equipment of the instant invention.

FIG. 31 references an overhead view of a design of a smaller oil clean up and recovery vessel that could be used out at sea to clean up smaller spills and would also lend itself well to clean up oil spills around inland or intercostal water ways, marinas, etc. Oil containment boom tow boats 108, towing the oil containment booms 107 to corral oil 109, that are connected both to rods on an end portion of main floats 1 as shown in FIGS. 2A and 3. The end section of this oil containment boom would slide up and down the rods, sealing the ends to floats 1 and maintaining the booms floating at the right level at their point of attachment. The opposite end section of the booms would be attached to a Samson post or towing bit on the boats. The length of the booms as well as the width of the path that the vessel can clean up at one time is regulated solely by the length of the booms and the power of the tow boats. The oil is corralled and channeled to the oil clean up and recovery equipment located at the very aft portion of the oil containment boom, such that by means of the forward motion of these vessels, floating oil is channeled back to the portion of the oil recovery unit as described above. This process working in conjunction with the corralling and channeling process created by the forward motion of these vessel radically enhances speed and volume of oil collection.

Figure 32:
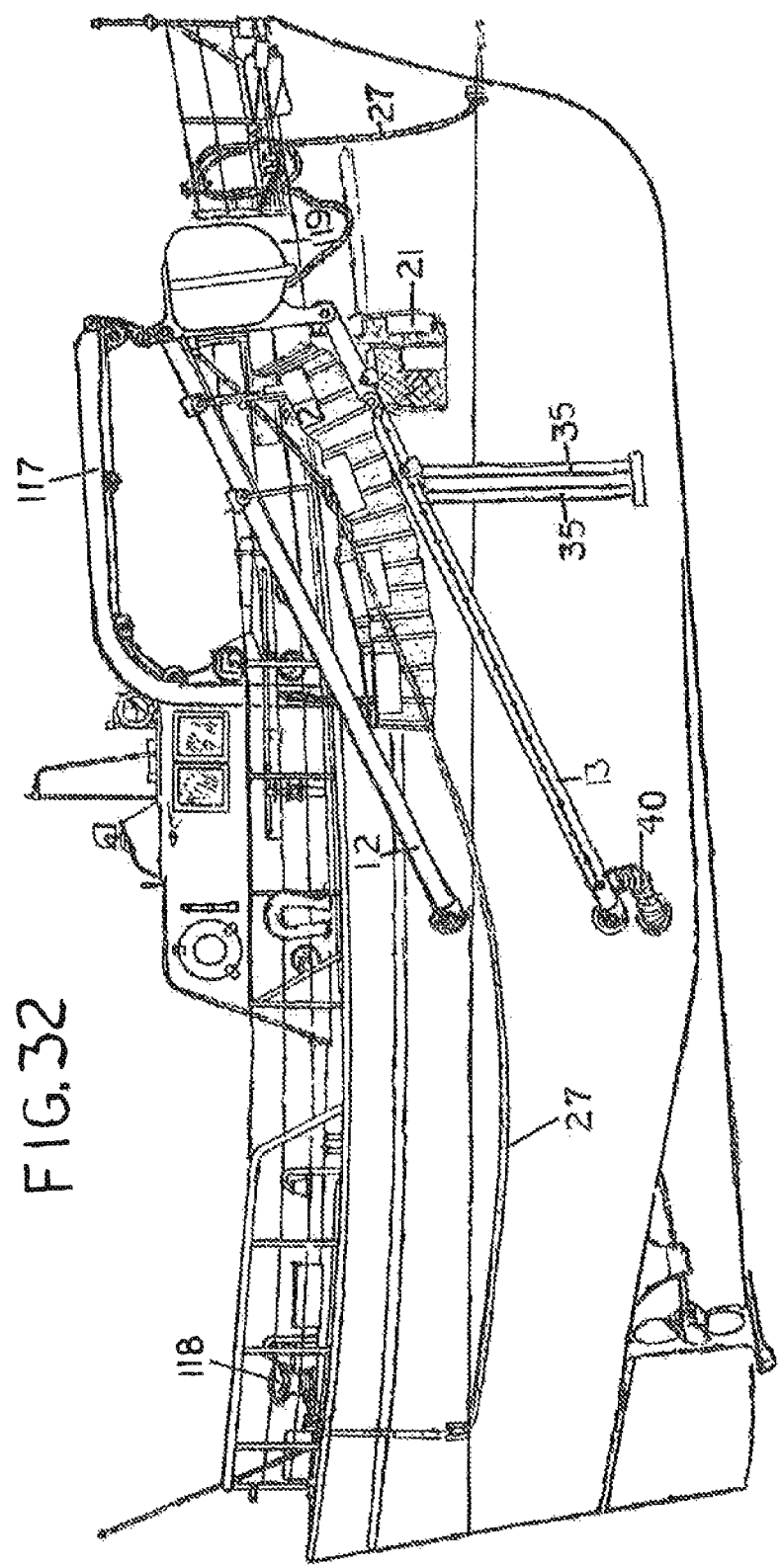
FIG. 32 is a side view of a smaller vessel utilizing the oil clean-up and recovery equipment of the instant invention, when the equipment is in the retracted transport configuration.

FIG. 32 is a side view of the smaller oil clean up and recovery vessel in its position of non-use or transport which is accomplished by means of loosening the cable 27 that is controlled by means of a deck winch or capstan 118, and is pulled in and raised and installed into the cradles for floats 1, located on the foredeck of the vessel by means of a winch located on a pivoting boom 117. The cable to this winch is attached to a pad eye that is an integral part of the framework of the main floats previously described. The cable would remain attached to float 1 during deployment and operation of the oil clean up and recovery process, and left loose in a position of for rapid and easy deployment and non-deployment configurations.

Boomed lift 117 pivots at its base and is located just forward of mid-ship on each side of the vessel on the main deck. The boom is equipped with a winch and cable as illustrated. The end of the cable is attached to lifting pad eye 39 previously described, located on the upper most part of the upper framework 12. This pivotable boomed lift is used to put this oil recovery device in its second embodiment, in and out of operation by both pulling float 1 out of cradle 119, then swinging the float 1 outward away from the hull and lowering the device into the water. This is followed by pulling the aft cable in and locking the device into a position of operation, and oil boom tow boats hooking up oil containment booms and feeding them out as required.

Also shown are bottom framework section 13, floats 21, oil containment panel rods 35 and extendable hose 40

Figure 33:
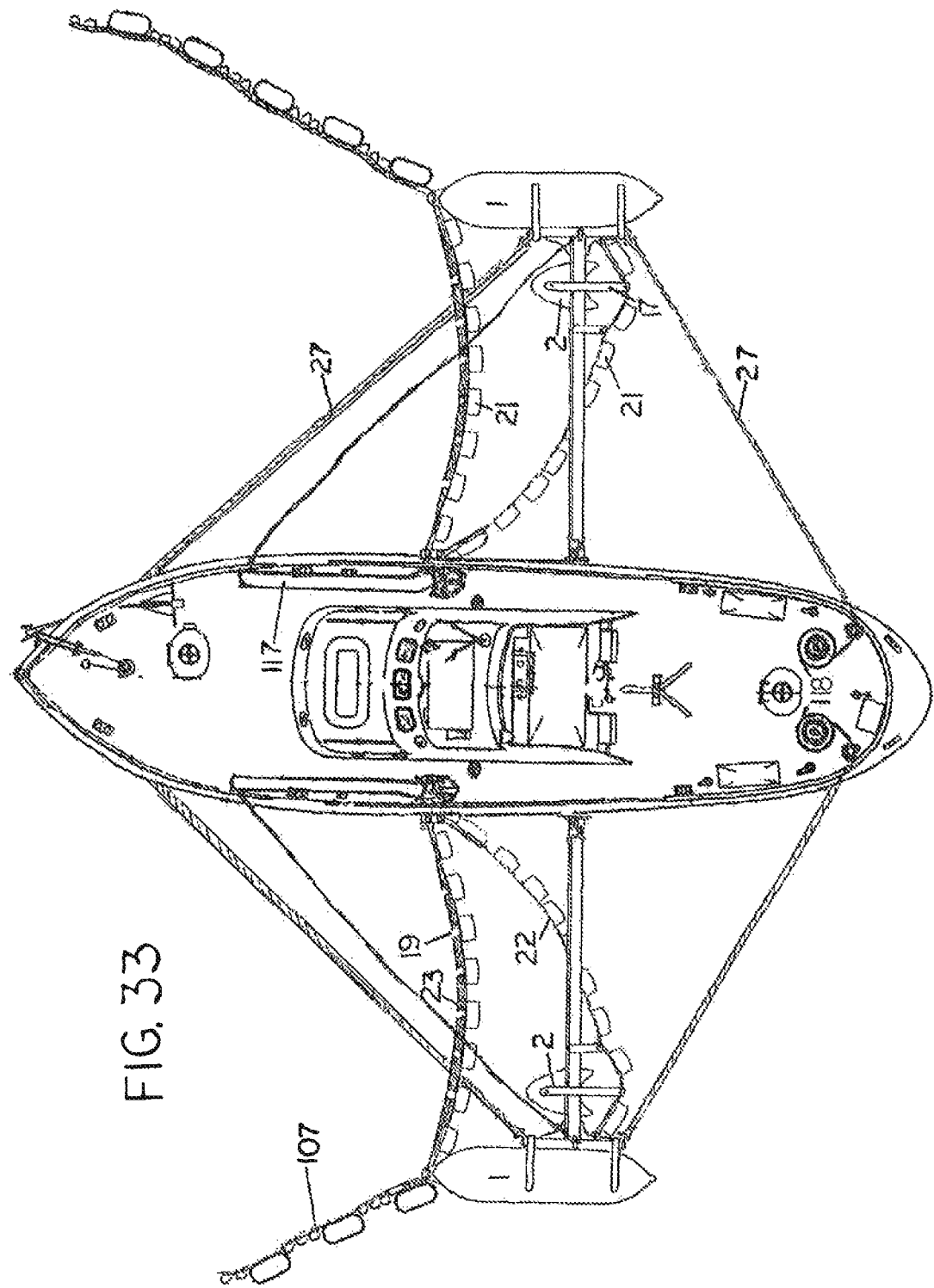
FIG. 33 is a top plan view of a smaller vessel utilizing the oil clean-up and recovery equipment of the instant invention, with the equipment, deck boom, lead oil containment boom, recovery oil containment boom and framework, in the extended and deployed configuration.

FIG. 33 is an overhead view of this smaller oil clean up and recovery vessel in operation. Illustrated are the oil containment boom 20, that extends between the hull of the vessel and slides up and down rods located on the freeboard of the vessel, and between the framework 17, as well as located on the aft portion of the framework of float 1, that aids in the corralling and channeling of the floating oil back to its point of pick up and recovery, and the end portion of the net assembly 23, that rides up and down on an additional rod on the very forward portion of float 1. The other end thereof is connected to and sliding up and down on an additional rod located just forward of the oil containment boom rod on the freeboard of the vessel. Stabilizing cables 27 are connected to a pad eye on the forward portion of the bow of the vessel with an additional one extending through a block located on the aft portion of the vessel. The cable would extend through and additional block mounted on the outer portion of the rub rail of the vessel to provide a fair lead to the capstan or deck winch 118. The winch pulls aft cable 27 back into position of use or where the cable is loosened to be pulled forward and up into its cradle by means of winch and deck boom 117. The attachment point and block on these cables are set in parallel alignment of the pivot point located at the base of boom 12. Further depicted as previously described are the floats 2 with telescopic tubes attached, battens 19 for the net assembly, floats 21 for booms, battens 22 for the oil panels, and oil containment boom 107.

Referring now to FIG. 34A, working components of the oil recovery system are enlarged with swivel joint 110 being much like a universal joint that swivels at its base or point of attachment to the hull. Boom 12 is hollow, and is where the oil and water solution flows between its point of recovery, located at an aft portion of float 2, and from this boom section through a lower portion of the hull by means of a flexible tube that connects to a spicket on a lower portion of the boom as well as a spicket that is welded to and extends through the hull, just below this flexible joint 110. In addition to the overhead view, also illustrated are related side views of the oil containment boom and net assembly 23, appearing as removed from the assembly. Also illustrated and previously described are the floats 1 and 2, pivot points 11, framework 17, battens 19, floats 21, stabilizing cables 27, rods 35 located at the ends of the oil containment panels or booms, panels 36, and rods 37, and lifting pad eyes 39.

FIG. 34B shows an overhead view of this oil clean up and recovery equipment from the same vantage point as FIG. 34A with a slight difference in the length and configuration of lateral armatures 17, and the assembly acting in the same manner as the oil deflection boom in the larger version of the invention described above. Also illustrated and previously described are battens 19, framework 16, coated boom material 20, battens 22, and panels 36.

FIG. 35A is a side view of the oil recovery and clean up equipment for the smaller vessels, and is illustrated with the equipment removed from the vessel and the oil containment booms and net assembly was removed. Depicted with a forward vantage point float 2 includes the tube or initial point of entry for oil, and is mounted and height adjusted as previously described. Armature 17 has a swivel joint on each end portion that doubles as its point of attachment to framework of main float 1, and an outer portion of the tube housing 4. The rod maintains the tube housing 4 and its contents parallel to float land the hull of the recovery vessel. Also illustrated and previously described are pivot points 11, top framework section 12, drive motor with reduction gear 15, framework 17, rods 35 for the oil containment booms, rods 37, electric or hydraulic motor and valve 42, and lower frame 113.

FIG. 35B is a side view of the oil recovery equipment from an aft vantage point, with the equipment in the same configuration as seen in FIG. 34B, with the smaller oil deflection boom mounted on the forward portion of the armature 17. This illustration shows the upper intake height adjustable portion of the tube that attaches to and height adjusts on float 2, and is flexibly coupled by means of a flexible joint that connects both tube member 3, and telescopic tube member 5, that extends in and out of tube housing 4. This figure also offers a better vantage point of the electric or hydraulic valve 42 that regulates the flow of oil and water between its initial point of entry and the vessel. Also illustrated and previously described are armature 9, pivot points 11, top framework section 12, drive motor with gear reduction 15, framework 16, coated oil containment material 20, battens 22, pivotable pipe joint 26, rods 28 with eyes or toggles, rods 35 located about the oil containment panels or booms, panels 36, lifting pad eyes 39, universal joints 110, lower frame 113, and boomed lift 117.

Turning now to FIGS. 36A through 36E are illustrations of the lower section of the framework or armature that connects to the main float 1 and the recovery vessel. The same type of connection is located at both the upper and lower points of connection between the upper and lower frameworks or armatures and the vessel. The only difference between the lower connecting point seen in this drawing, is that the upper armature or framework does not have the oil and water solution flowing through it, or the flexible hose and coupling 40 attached as seen in FIG. 36B.

FIG. 36A includes swivel or rotatable joint 111 that would be located between the base plate, and this universal type joint, as well as base plate 112 that would be welded to the hull. Universal type joint 110 is shown, and as the two halves of this joint come together, they house joint member 116, which connects the halves of this universal type joint 110 together. These two halves of joint 110 also pivot independently of each other about joint 116, and are connected to each other by means of bolts 115 with a smooth upper shank seen in and illustrated as FIG. 36D. The bolts are used to secure the two halves of this universal joint together by extending these bolts through the holes in the extruding portions of the other one half, and threading these bolts into the threaded portions of block 116, where they would be tightly secured into the milled flat portions of the clevis pin 114, tightly securing both the bolts and the clevis pin in at the same time.

FIG. 36B consists of the lower portion of the lower frame 113 of the invention in its second embodiment. This lower frame is tubular in design and also carries the water and oil solution to the flexible hose 40. At the end portion of this tube or lower armature is the connections to the two halves of the joint. At the bottom portion of this tube 113 is a flange integral to this tube that would either be threaded or similar to a fire hose connection or coupling, that would be an integral part of a flexible accordion-like tube that would make the connection between this coupling and an additional flange that would be welded to and extend through the hull of the vessel, directly below this pivoting joint.

FIG. 36C is clevis pin 114 with a milled out portion on two sides of the center. Both the front and the side view of the clevis pin is seen in FIG. 36C. The clevis pin is inserted through both sides of the extruding portions of one half of this universal type joint as shown in FIG. 36B, as well as the non-threaded side of the block 116, which finishes the connection of the two halves of this universal type joint. The bolts would be securely tightened and set with a thread lock until their desired time of removal, where the entire oil recovery and clean up device could be easily removed and re-installed to the side of the vessel.

FIG. 36D depicts bolts 115 with a smooth upper shank. The bolts are used to secure the two halves of this universal type joint together by extending these bolts through the holes in the extruding portions of the other one half of this universal type joint, and threading these bolts into the threaded portions of block 116. They are tightly secured into the milled flat portions of the clevis pin 114.

FIG. 36E illustrates block 116 holes therein that intersect each other in the center, one hole being threaded all of the way through and the other hole being a clean smooth bore. This portion of the joint is the portion that the two halves of this joint are both connected with, as well as the portion of this joint that the two halves pivot on.

INDEX OF SEQUENTIAL NUMERICAL COMPONENTS

For further ease of reference, the following are structural components:

1—Float 1 that framework of invention 12 and 13 connects to and pivots off of, as invention rides over waves.
2—Floats 2 that telescopic tubes are attached to and are height adjusted on.
3—Height adjustable tube 3.
4—Housings 4 that house the telescopic tubes 5.
5—Telescopic tubes 5 that extend and retract in and out of the housings 4 as floats 2 traverse waves.
6—Tracks 6.
7—Small ringed floats 7.
8—Threaded rod 8.
9—Armature 9.
10—Toggles or eyes 10.
11—Pivot points 11.
12—Top section of framework 12.
13—Bottom section of framework 13.
14—Alternative knob 14.
15—Drive motor with reduction gear 15.
16—Framework 16.
17—Framework 17.
19—Battens 19 for the rotating, self-cleaning net assembly.
20—Plastic coated or standard oil containment boom material 20.
21—Floats 21 on oil containment and oil deflection booms.
22—Battens 22 in oil containment and deflection panels.
23—Netting 23.
24—Section of framework.
25—Drive unit 25 for the rotating, self-cleaning net 23.
26—Pivotable or rotatable pipe joint 26.
27—Stabilizing cables 27.
28—Rods 28 with eyes or toggles.
29—Cables or rods 29.
30—Tapered tube 30.
31—Platform 31.
32—The net spool housing 32.
33—Cover 33 for outer net spool housing.
34—Flexible section 34 of hose or water tight flexible coupling.
35—Rods 35 located at each end of the oil containment panels or booms.
36—Panels 36.
37—Rods 37.
38—Compression post 38.
39—Lifting pad eyes 39.
40—Accordion-like or extendable hose 40.
41—Collar 41.
42—Electric or hydraulic motor and valve 42.
44—Component 44, one half of hinge.
45—Component 45, one half of hinge.
46—Pivoting ball and post base plate 46.
47—Machine screws.
48, 49—Shaped slide 49, mounting base 48, alternate block assembly.
50—Block 50 that pivots both vertically and horizontally.
51A, 51B—Cover plates 51A, 51B.
52—Sheaves or pulleys 52 that are housed in a block.
53—Threaded studs 53.
54—Radiused slots 54.
55—rotatable axle 55 or rivet connecting the block housing.
56—Ribs 56 raised areas located on the inside portions of the inner and outer batten sections.
57, 58—Component link 57, outer collar section 58.
59—Block housing 59.
60—Tracks 60 on vessel.

61—Smaller chain link that ties larger pivoting chain links on netting chains together on the first embodiment as described in 57 and 58.
62—Flexible curtain mounting bases 62.
63—Spacers 63 act as slides for tubes 5.
64—Ring 64 integral to tubes 5.
65—Seals 65 around the perimeters of the lower portions of tubes 5.
67—Flexible curtains 67 that mount on mounting bases 62.
68—Netting drive unit spool housing 68.
69—Main axle 69 for netting drive unit spool.
70—Keys 70 inset into spool axle shaft, spool and sprockets.
71—Inner center portion 71 of netting spool.
72—Upper or outer sections 72 of netting spool.
73, 74—Panels 73, 74, which extend the entire length between the inner fascia portions of spool drive unit housing.
75—Drive sprockets 75 mechanically fastened between the upper and lower spool portions,
76—Electrical or hydraulic rams 76 connected to the outer portion of the netting drive unit spool housing.
77—Main drive sprocket or crown sprocket 69.
78—Chain 78 that extends around sprockets.
79—Smaller pinion sprocket 79.
80—Sprocket and chain cover 80.
81—Pitman arms 81, work in conjunction with tensioning device.
82—Component 82 of Pitman arm.
83A, 83B—Compressible foam tubular cushion 83A, axle 83B.
84—Tensioning member 84.
85—Coupling flange 85.
86—Pipe flange ridge 86.
87—Belled base joint 87.
88—O-rings 88.
89—Crane or hydraulic lift 89.
90—Cradles and storage mounting brackets 90.
91—Cables 91 that connect to pad eyes located at various lifting points.
92—Water and oil in the collection tank, as seen in FIGS. 29 and 30, where recovered oil and water initially enters before being pumped into the oil separation tank.
93—Pipe or pick up, seen in FIGS. 29 and 30, that runs to pump that pumps water and oil into separation tank where oil and water are separated.
94—Pumps, lines and equipment 94. used to pump the oil into the various tanks, as well as the water back overboard.
95—Valves 95.
96—Collection tank 96.
97—Oil and Water separation tank 97.
98—Pipe or pick up 98.
99—Cradles 99 that stores oil containment boom towing boats.
100—Separated oil stored in tank of vessel, as seen in FIG. 30.
101—Oil storage tank 101 for separated oil.
102—Empty storage tanks.
103—Oil containment booms 103 stored below deck.
104—Conduit pipe 104 for oil and separation tank.
105—Oil in tank.
106—Float 106 on top of oil in separation tank.
107—Oil containment booms 107.
108—Oil containment boom towing boats 108.
109—Oil floating 109 in water being contained and channeled to recovery devices.
110—Universal type joint 110.
111—Swivel or rotatable joint 111.
112—Base plate 112.
113—Lower frame 113.
114—Clevis pins 114.
115—Bolts 115.
116—Block 116 component of universal joint.
117—Boomed lift 117.
118—Capstan or deck winch 118.
119—Cradle 119 for the main float.
128—Pump and intake line 128.
137—Submersible pump and line 137.
139—Receiving tank 139.
142, 144—valves 142, 144.
145—Pump 145.
200—Vessel 200.

While specific embodiments have been described in detail in the foregoing detailed description and illustrated in the accompanying drawings, those with ordinary skill in the art will appreciate that various modifications and alternatives to those details could be developed in light of the overall teachings of the disclosures. Accordingly, the particular arrangements disclosed are meant to be illustrative only and not limiting of the invention, which is to be given the full breadth of the appended claims, and any and all equivalents thereof.

What is claimed is:

1. A system for cleanup and recovery of contaminant from a body of water, the system comprising:
    a marine vessel comprising a hull having a first side;
    a framework disposed on the first side of the hull;
    at least one recovery module disposed within the framework, each recovery module comprising a float, a tube housing, and a tube having an inlet;
    wherein the float comprises a hollow inner track such that the tube is disposed within the inner track.

2. The system of claim 1, wherein tracks are disposed on the first side of the hull, and the framework engages the tracks, such that the framework is height adjustable relative to the hull.

3. The system of claim 1, wherein the tube of a first recovery module of the at least one recovery module is height adjustable such that a height of the inlet of the tube is controllable.

4. The system of claim 1 wherein the tube of a first recovery module of the at least one recovery modules is a telescopic tube capable of vertical movement within the tube housing.

5. The system of claim 1 further comprising a first oil containment boom capable of being connected to a first tow boat such that the first oil containment boom is extendable from the framework, away from the marine vessel, to the first tow boat such that contaminant floating between the first tow boat and the vessel is funneled towards the framework.

6. The system of claim 5 further comprising an inner containment boom extending from the framework to the first side of the hull, the inner containment boom capable of containing contaminant and funneling same to the at least one recovery modules.

7. The system of claim 5 further comprising:
    a second framework disposed on a second side of the hull that is opposite the first side;

at least one recovery module disposed within the framework, each recovery module comprising a float, a tube housing, and a tube having an inlet;

a second oil containment boom capable of being connected to a second tow boat such that the second oil containment boom is extendable from the second framework, away from the marine vessel, to the second tow boat such that contaminant floating between the second tow boat and the vessel is funneled towards the second framework.

8. The system of claim 7, further comprising a second inner containment boom extending from the second framework to the second side of the hull, the second containment boom being capable of containing contaminant and funneling same to the at least one recovery modules of the second framework.

9. A system for cleanup and recovery of contaminant from a body of water, the system comprising:

a marine vessel comprising a hull having a first side;

a framework disposed on the first side of the hull;

at least one recovery module disposed within the framework, each recovery module comprising a float, a tube housing, and a tube having an inlet;

wherein the at least one recovery module comprises a first recovery module that further comprises gears and a threaded rod, wherein in the gears are capable of turning the threaded rod to effectuate a height adjustment to the tube.

10. The system of claim 9 wherein the tube of the first recovery module comprises an extension having a threaded hole that receives the threaded rod.

11. A system for cleanup and recovery of contaminant from a body of water, the system comprising:

a framework capable of being disposed on a hull of a marine vessel;

at least one recovery module disposed within the framework, each recovery module comprising a float, a tube housing, and a tube having an inlet;

wherein the at least one recovery module comprises a first recovery module that further comprises gears and a threaded rod, wherein in the gears are capable of turning the threaded rod to effectuate a height adjustment to the tube.

12. The system of claim 11, wherein the framework comprises a track that is capable of engaging a receiving track on the hull of the vessel, such that the framework is height adjustable relative to the hull.

13. The system of claim 11 wherein the tube of the first recovery module comprises an extension having a threaded hole that receives the threaded rod.

14. The system of claim 11 wherein the tube of the first recovery module of the at least one recovery modules is a telescopic tube capable of vertical movement within the tube housing.

15. The system of claim 11 further comprising a first oil containment boom capable of being connected to a first tow boat such that the first oil containment boom is extendable from the framework, away from the marine vessel, to the first tow boat such that contaminant floating between the first tow boat and the vessel is funneled towards the framework.

16. The system of claim 15 further comprising an inner containment boom capable of extending from the framework to the hull of the marine vessel, the inner containment boom capable of containing contaminant and funneling same to the at least one recovery modules.

17. A system for cleanup and recovery of contaminant from a body of water, the system comprising:

a framework capable of being disposed on a hull of a marine vessel;

at least one recovery module disposed within the framework, each recovery module comprising a float, a tube housing, and a tube having an inlet;

wherein the float comprises a hollow inner track such that the tube is disposed within the inner track.

18. The system of claim 17, wherein the tube of a first recovery module of the at least one recovery module is height adjustable such that a height of the inlet of the tube of the first recovery module is controllable.

* * * * *